United States Patent
Rawlinson

(10) Patent No.: US 9,641,048 B1
(45) Date of Patent: May 2, 2017

(54) RENEWABLE ENERGY LEVERAGE GENERATOR SYSTEMS, APPARATUS, AND METHODS

(71) Applicant: Neil Rawlinson, Cambria, CA (US)

(72) Inventor: Neil Rawlinson, Cambria, CA (US)

( * ) Notice: Subject to any disclaimer, the term of this patent is extended or adjusted under 35 U.S.C. 154(b) by 0 days.

(21) Appl. No.: 14/668,731

(22) Filed: Mar. 25, 2015

(51) Int. Cl.
*H02K 7/18* (2006.01)
*F03G 7/10* (2006.01)

(52) U.S. Cl.
CPC ............ *H02K 7/1807* (2013.01); *F03G 7/10* (2013.01); *Y10S 74/09* (2013.01)

(58) Field of Classification Search
CPC ............... F03G 3/00; F03G 7/10; Y02E 10/20
USPC ........................................ 290/1 A; 74/DIG. 9
See application file for complete search history.

(56) References Cited

U.S. PATENT DOCUMENTS

| | | | | |
|---|---|---|---|---|
| 237,851 A * | 2/1881 | Foskett | ............ | F03D 5/06 416/132 R |
| 2,465,285 A * | 3/1949 | Schwickerath | ......... | F03B 17/06 416/162 |
| 4,612,768 A * | 9/1986 | Thompson, Jr. | .... | F03B 13/1815 60/506 |
| 5,009,571 A * | 4/1991 | Smith | ............ | F03D 5/06 416/79 |
| 2003/0123983 A1* | 7/2003 | Bolduc | ......... | F03B 17/06 416/6 |
| 2003/0168098 A1* | 9/2003 | Sclease | ............ | F16K 1/12 137/219 |
| 2008/0148723 A1* | 6/2008 | Birkestrand | ............ | E02B 9/00 60/327 |
| 2009/0058091 A1* | 3/2009 | Douglas | ............ | F03B 17/062 290/53 |
| 2009/0224551 A1* | 9/2009 | Williams | ............ | F03D 5/06 290/55 |
| 2010/0096860 A1* | 4/2010 | Regis | ............ | F03G 7/10 290/1 R |
| 2010/0181777 A1* | 7/2010 | Grigg | ............ | F03D 3/002 290/55 |
| 2013/0192216 A1* | 8/2013 | Berlin, Jr. | ............ | F02C 6/16 60/327 |

* cited by examiner

*Primary Examiner* — Tulsidas C Patel
*Assistant Examiner* — Charles Reid, Jr.
(74) *Attorney, Agent, or Firm* — Michael W. Caldwell

(57) ABSTRACT

A leverage generator apparatus for generating electricity from energy transferred from a one or more partially rotating levers each operating on one or more triangular weighted swivel devices that are propelled over a center point on the partially rotating lever by one or more piston switches and actuators and each supported by a triangular support structure operating as a fulcrum at a center-point of the one or more partially rotating levers, such that the energy transferred from the leverage generator turns a crankshaft linked to a generator device. A renewable energy vertical leverage generator apparatus generates electricity from energy transferred by one or more pairs of rotating triangular weight car harness structures travelling on a track system operating as a receptacle to capture weighted car devices such that the triangular weight car harness structures rotate three hundred sixty degrees to produce forces sufficient to turn an axel of a generator device.

31 Claims, 32 Drawing Sheets

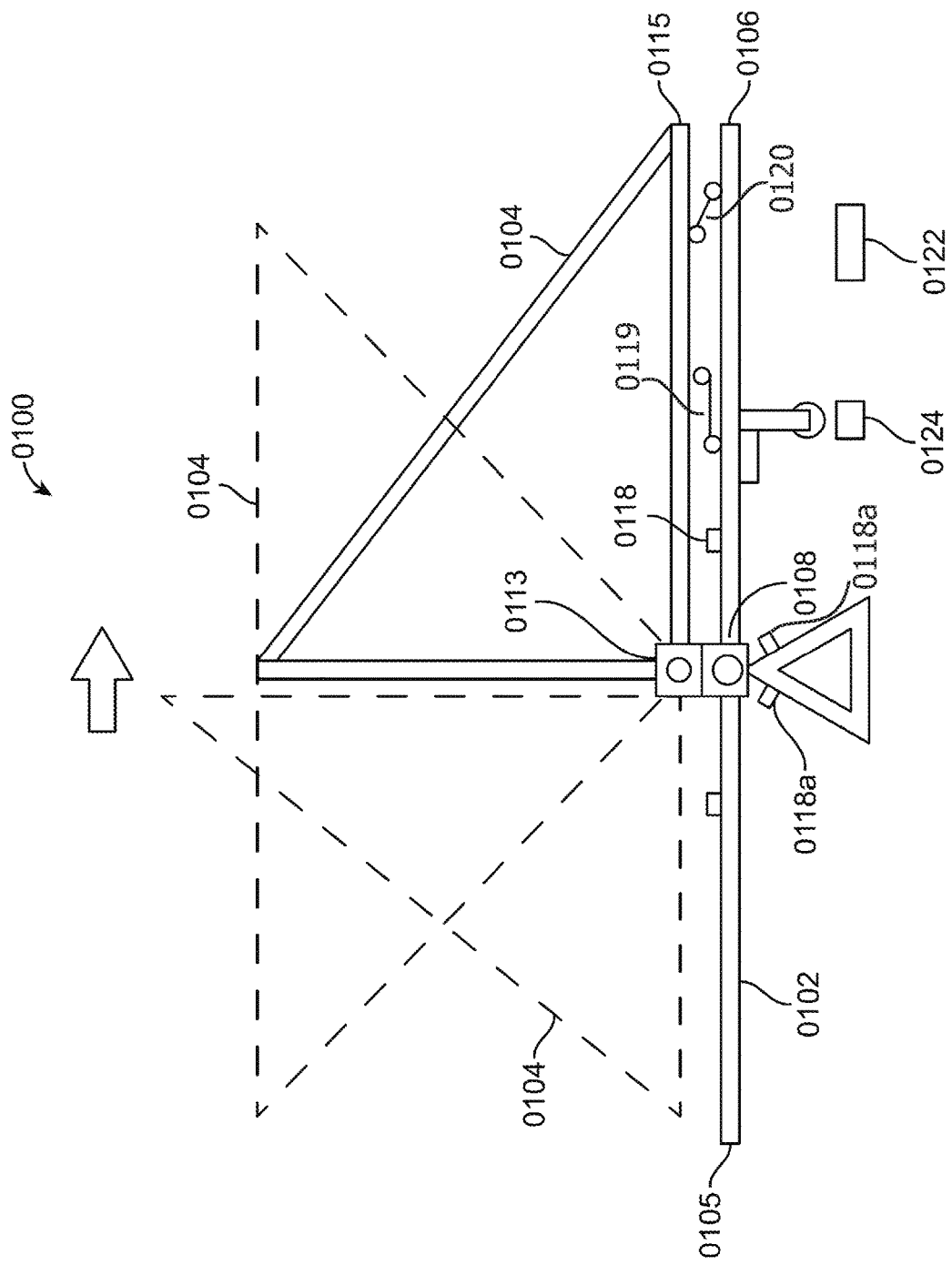

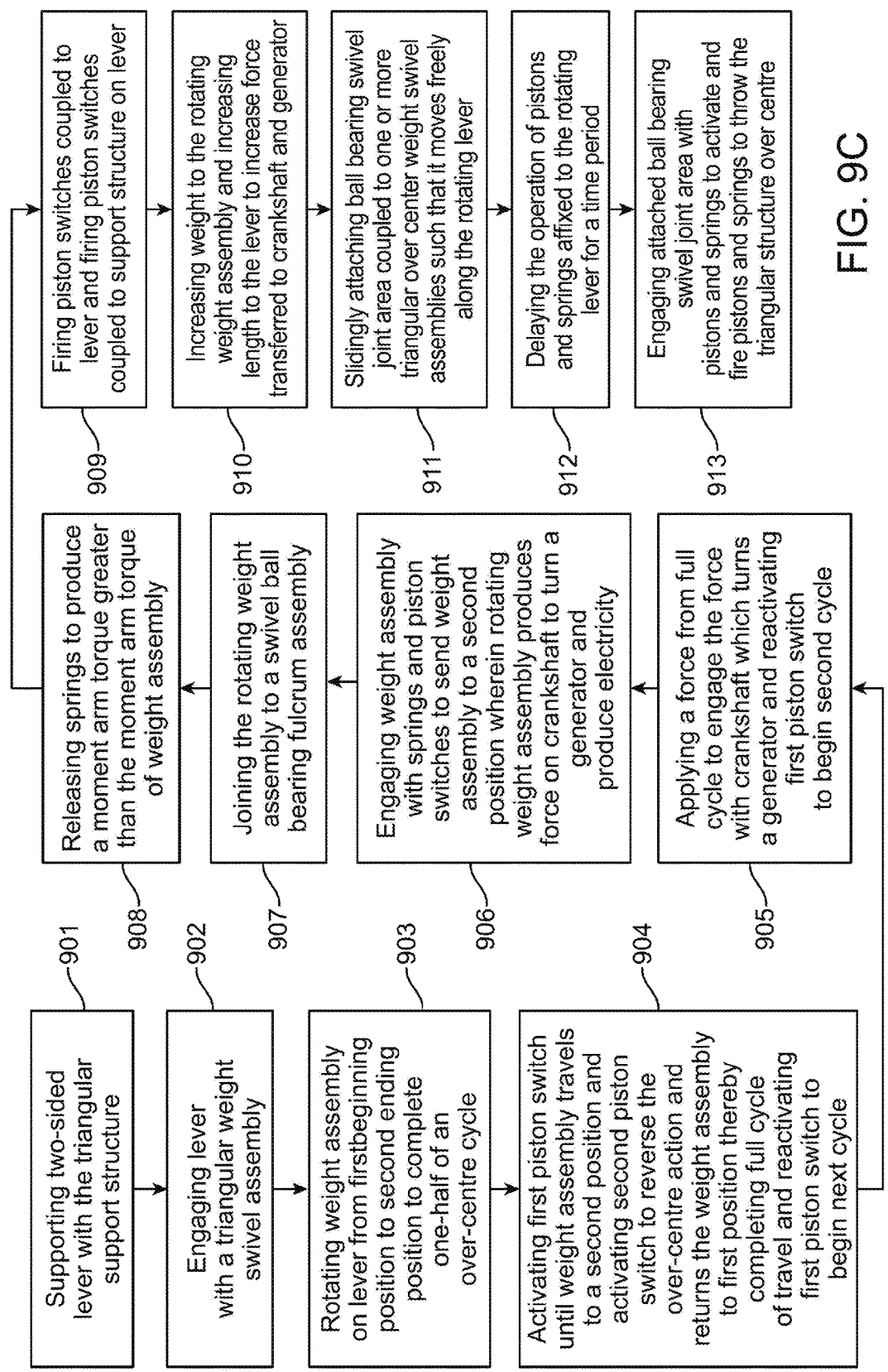

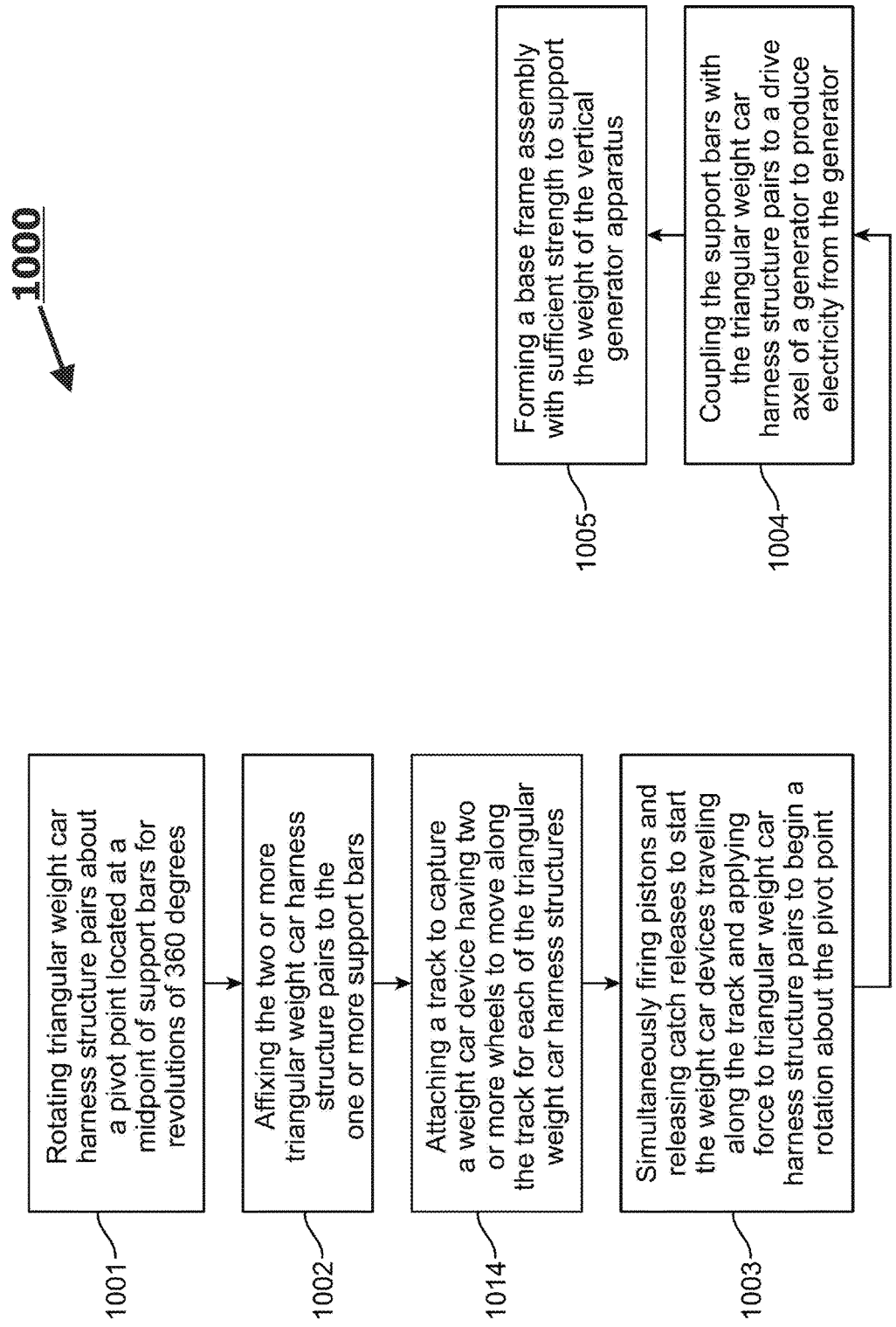

RENEWABLE ENERGY LEVERAGE GENERATOR SYSTEMS, APPARATUS, AND METHODS

RELATED APPLICATIONS

There are no previous applications filed by the Applicant that are related to the disclosure herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 20130-2014, Neil Rawlinson, All Rights Reserved.

TECHNICAL FIELD

This patent document pertains generally to tools (systems, apparatuses, methodologies, computer program products, etc.) for leverage energy generators.

BACKGROUND

There exist several technologies that can produce electricity on a premises, whether a residential or commercial building. Among these are photovoltaic panels (e.g., solar panels), small scale natural gas turbines (also known as micro-turbines), small-scale wind turbines (in contrast to the large turbines used in grid connected wind farms), low pressure water turbines, high-pressure low flow water turbines, and fuel cells using hydrogen, natural gas, and potentially other hydrocarbons. These technologies are herein referred to as "distributed energy sources." Distributed energy sources have been deployed only to a very limited extent for reasons of cost, convenience, and a lack of harmonized grid inter-connection standards. Historically, power storage and supply devices typically involve the charging of batteries that store energy in the event of a power failure of a home or business' main source of electricity, which is normally provided from a utility power grid connected to the home or business and are designed to support the entire or selected electrical load of the home or business. As a result, residential and commercial power storage and supply devices are typically very large and cumbersome. Some power storage and supply devices use alternative energy sources, such as the ones listed above. The power storage and supply devices store the electric power produced by an alternative energy source and may even supply power to a utility power grid, in essence operating as a small, distributed power generation plant. Many local, state, and federal government agencies, as well as private utility companies, are encouraging this practice as evidenced by the changing regulatory environment and passage of such distributed power and energy storage policies as AB970, SB412, SB 14 and AB44. Further, rule makers such as FERC, CASIO, and the CPUC are making priority changes (e.g., CEC Integrated Energy Policy Report, CAISO implementation of FERC Order 719, etc.), which encourage or mandate the use of distributed energy storage and power generation. Unfortunately, the use of alternative energy sources in conjunction with such power storage and supply device systems has been limited primarily because of cost and convenience and communications standards.

In recent years, however, the costs associated with adopting and using alternative energy sources has decreased substantially as distributed energy power and storage technologies have been refined, sales have increased due to the creation of new markets (e.g., plug-in electric hybrid vehicles and the globalized adoption of solar technologies), and more suppliers have entered the market resulting in greater manufacturing capacity and market competitiveness for both photovoltaic and battery manufacturers. The cost barriers to distributed electrical technologies are also eroding due to factors such as real and/or perceived increases in the cost of electricity and other forms of energy, the widespread adoption of time-of-use pricing (TOU) or real-time pricing (RTP) by utilities, favorable terms for the utilities' purchase of power from such distributed sources, and government financial incentives (e.g., The federal business energy investment tax credit available under 26 USC §48 was expanded significantly by the Energy Improvement and Extension Act of 2008 (H.R. 1424), enacted in October 2008, etc.) which encourage investment in distributed and environmentally more benign electrical technologies.

Adoption of distributed energy power and storage technologies is also increasing due to the widespread implementation of an Advanced Metering Infrastructure; commonly referred to as AMI. Advanced metering systems are comprised of state-of-the-art electronic/digital hardware and software, which combine interval data measurement with continuously available remote communications. These systems enable measurement of detailed, time-based information and frequent collection and transmittal of such information to various parties. AMI typically refers to the full measurement and collection system that includes meters at the customer site, communication networks between the customer and a service provider, such as an electric, gas, or water utility, and data reception and management systems that make the information available to the service provider. With AMI utilities are now better able to manage installed devices within the homes of participating consumers that, under utility control, selectively disable energy-consuming devices (e.g., hot water heaters or air conditioning units) in response to peak loading conditions. Furthermore, utilities are now able in certain cases to remotely activate and aggregate distributed power and energy supplies to increase the supply of electricity to constrained parts of the electricity grid.

There has been an increasing emphasis in recent years on energy conservation. Electric utilities have also come under increasing pressure to reduce the need to fire up polluting power plants to serve peak demands, such as during hot summer days. With the enactment of current legislation and rulemaking (e.g., AB970, AB32, and FERC Order 719, etc.), electric utilities also have an incentive to "smooth out" energy demand to minimize the need to install new power transmission and distribution lines; further negating environmental and land use issues. Examples of a few of the ways in which utilities can perform these tasks are referred to as "demand side management" and "supply side management." Demand side management refers to the selective reduction of energy demand in response to peak loading conditions. For example, utilities have for years installed devices in the homes of participating consumers that, under utility control, selectively disable energy-consuming devices (e.g., hot water heaters or air conditioning units) in response to peak loading conditions. As another example, utilities are able in certain cases to remotely activate energy supplies to increase the supply of electricity to parts of the electricity grid. It would be advantageous to provide more sophisticated control mechanisms to permit electric utilities and others to effectively monitor and control distributed energy resources, such as storage units capable of storing electricity and reselling it to the grid on command. It would also be advantageous to provide more sophisticated demand side management tasks using aggregated resources to manage localized constraints on the utility grid (e.g., substation, feeder-line, residence, etc.).

Conventional systems do not configure a leverage generation apparatus and energy management system that create ratios of force output to force input within a range of from 7:1 to 22:1 depending on losses in the system. The unique combination of elements in the various embodiments disclosed herein, enable distributed, localized, aggregated, and virtualized control of renewable energy that can be conditioned as suitable for the electric utility grid or a customer specific grid or array. The system can deliver power to utilities and energy consumers in ways that maximize avoided costs, ensure energy reliability, and accelerate the integration of renewable energies and electric vehicles.

The remaining barriers to market adoption of distributed power storage and supply devices are convenience. At present there are significant challenges to an individual's or building owner's installation of renewable energy technologies. In typical installations the component parts must be purchased from multiple vendors and integrated in a custom installation using new designs that currently do not exist to create the high degree of force ratios and leverage contemplated herein. Moreover, buying the component parts requires knowledge of the market for and the technical aspects of the different energy technologies, the construction required to install the technologies in accord with local codes, regulatory requirements, and guidelines imposed by industrial liability insurance companies. In addition, if the power generated in excess of requirements on the premise is to be resold, utilities impose additional requirements for connection of such systems to the utility's power grid. Another hindrance to implementing the use of distributed power storage and supply devices is that many local industrial engineers and electricians do not yet know how to engineer and design the disparate components as much of this technology is new or not widely used. As a result of such errors and/or lack of know-how by the engineers, designers, and installers, the attendant mechanical and electrical actuators can be intimidating for new applications and lead to concerns and issues regarding safety, strength and reliability in addition to aesthetics. Further, the typical industrial business owner is not qualified or certified, and the associated expense too high, to provide adequate maintenance or replacement of many of the high performance devices such as servo-motor controls for the electrical actuated drive devices and related gears. This adds cost to the upkeep of any distributed power storage and supply devices.

The measured consumption of energy will be multiplied with the number of operating hours and extrapolated to the real need during a year. In our calculation 6000 hours per year have been taken as a basis. The need of energy of an air cylinder is 8380 kWh per year. A hydraulic cylinder uses 3602 kWh per annum. The electro mechanical alternative has just 816 kWh per year. The $CO_2$ consumption of the pneumatic system is 5.3 tons per year and 2.3 tons for the hydraulic actuator compared with 525 kg for the electro mechanical one. That is a saving of 90 percent compared to the pneumatic cylinder and 77 percent compared to the hydraulic one. The calculated energy consumption per year multiplied with the average industrial energy cost of 0.1 €/KWh defines the cost of each system. The evaluation of the $CO_2$ emission is based on the German carbon emission/energy formula of 644 gr($CO_2$)/(kWh). A comparison that is based on the energy consumption of the electro mechanical actuator brings us to the result that the hydraulic actuator needs for the same duty cycle 4.4 times more energy. The pneumatic cylinder needs even ten times more energy.

A leverage generator apparatus for generating electricity from energy transferred from a one or more partially rotating, two-sided levers each operating on one or more triangular weighted swivel devices that are propelled over a center point on the partially rotating, two-sided lever by one or more piston switches and actuators and one or more high spring constant primary and secondary spring mechanisms and each supported by a triangular support structure operating as a fulcrum at a center-point of the one or more partially rotating, two-sided levers, such that the energy transferred from the leverage generator turns a crankshaft linked to a turbine generator device. A renewable energy vertical leverage generator apparatus generates electricity from energy transferred by one or more pairs of rotating triangular weight car harness structures travelling on a track system operating as a receptacle to capture weighted car devices such that the triangular weight car harness structures rotate threehundredsixty degrees to produce forces sufficient to turn an axel of a turbine generator device. In other configurations one or more pairs of rotating triangular weight car harness structures travel on a track system in a time delayed, phase shifted manner from one another to continuously apply force via one or more gearing mechanisms to a common axel sufficient to turn the axel at a continuous angular velocity. Various methods provide processes to generate electricity from energy created through mechanical leverage produced from one or more partially rotating, two-sided levers or one or more rotating triangular weight car harness structures that are coupled to various devices to provide configurations of mechanical advantage devices working synchronously with one another. In further applications, industrial control software provides an interface between the leverage device equipment and the renewable energy generation devices. In other embodiments, an energy cloud monitors the operation of the leverage generator devices in communication with the renewable energy generation equipment to aggregate energy resources.

A software platform controls one or more leverage generator systems to form a site management system for real-time energy and information to the system. The software platform also aggregates systems together in a real-time network for the delivery of aggregated energy and information. Software services pool and dynamically scale energy resources across the customer, domain specific grid or array upon demand. Multiple applications are delivered to multiple customer segments from this single platform. A Renewable Energy Leverage Generated Cloud platform, in conjunction with a site management leverage generated integration system enable utilities, energy consumers, and third parties to buy and sell energy each according to their interest. Customers are served by adopting a cloud-services delivery model for energy. Each engineered Leverage Generated Apparatus array provides power generation, power storage, and energy services (via a gateway controller and the Renewable Leverage Generated Energy Cloud software platform, at the site where it is deployed. In the physical sense, energy services specific to the customer reside at the local deployment site but in a virtual aspect, the customer's energy services data are partitioned in a customer specific instance of the Leverage Generated Software Platform. At the same time, reserve energy from each and every leverage generated apparatus unit and array under management is pooled in the cloud. From this virtualized pool, customers can reserve energy in advance, and can also request energy in real-time. Remaining available energy reserves, both to $3^{rd}$-party aggregators and into open markets for ancillary services.

An energy management system with integrated solar and storage applicable to a home in certain aspects, but it will be appreciated by those of ordinary skill in the art that the energy management system is equally applicable to office buildings and other structures such as warehouses, manufacturing facilities, factories, small-businesses, storefronts, department stores, shopping centers, restaurants, malls, single family or one or more multi-family dwellings and the like. In one configuration, one or more alternate energy sources are connected to a power storage and supply device which is integrated into a pre-existing customer power system. The pre-existing customer power system is connected to a common power array or grid, as is common in a wind farm or solar array.

The a leverage generator with one or more partially rotating, two-sided levers or a vertical leverage generator with one or more fully rotating weighted device track system blades may be packaged as load cells and may be further configured as an array. The arrays may operate at various voltages. In one configuration, the array may operate at a DC voltage of 90 VDC with a maximum output capacity at 2.5 kWp. Those skilled in the art will recognize that other multi-voltages, output capacities, and photovoltaic array sizes are contemplated. Other photovoltaic cells produced by various manufacturers and operating at various currents, voltages, and power output capacities may also be used as alternate energy sources. Other alternate energy sources to fire piston switches may be activated with a variety of fuel sources (e.g., electric, hydrogen, fuel cell, wind or water-based systems) may also be used. The power storage and supply devices also include energy storage modules such as batteries, fuel cells, or any other suitable type of independent energy storage medium as appreciated by one of ordinary skill in the art.

Further, the power storage and supply device includes a charge controller; one or more energy storage modules; one or more inverters; a electromechanical isolation breaker; a local data processing gateway with data logging capabilities; a home area network (HAN); is Internet compatible; contains a web portal and optionally communicates through an advanced meter infrastructure (AMI), all of which are preferably connected to or contained therein with a single enclosed cabinet, such as the one discussed in more detail below. Furthermore, an Independent service operator and/or Utility Enterprise System may communicate with the energy storage and supply device via the internet user interface. In an embodiment of the present invention each array of photovoltaic cells (acting as the alternate energy source) has a dedicated charge controller, though it is recognized that the charge controllers can be configured in a number of ways appreciable by one of ordinary skill in the art. The charge controller routes the electricity generated by the alternate energy source to one or any number/size of the energy storage modules and the inverters. Alternatively, the charge controller may be controlled by another device, such as the local data processing gateway, which makes this determination. In an embodiment of the present invention, the inverter is a grid tied hybrid PV Schneider Electric XW4548-12/240-60, the charge controller is & Schneider Electric charge controller XW-MPPT60-150, but other suitable charge controllers and inverters may also be used.

The inverters separate the DC output voltage into time varying segments to produce an AC (alternating current) power signal, such as a 120/240 split-phase load current, which is typically the current supplied to a house. In an exemplary embodiment of the present invention, one inverter is used hybrid PV Schneider Electric XW4548-12/240-60, but other suitable inverters can also be used.

The electromechanical isolation breaker preferably includes one or more automated switches for dynamically directing the AC power signal from the inverters to a desired load. For example, in the embodiment, the power storage and supply device may be configured to send and receive power from the alternate energy sources or to/from the utility power grid only.

The local data processing gateway monitors and controls most of the processes conducted by the power storage and supply device. The local data processing gateway is a computer-implemented device that may include, for example, one or more processors, a clock, memory, I/O interfaces, analog to digital converters, digital to analog converters, and operating system software. In addition, the local data processing gateway includes a number of software modules for implementing the functionality discussed below. The local data processing gateway can be configured to monitor and control the processes and measurements conducted by the power storage and supply device in either a local or remote mode configuration and can be aggregated by a third party (e.g., independent service operator, etc.) or utility for purposes of dispatching and controlling distributed power or stored energy.

Optimization. The various embodiments of a leverage generator with one or more partially rotating, two-sided levers or a vertical leverage generator with one or more fully rotating weighted device track system blades enable a user to size and scale the apparatus and integrate the devices with inverters and power generation system according to the needs of the site in a utility-grade form-factor.

Localization. The leverage generation apparatus system is placed strategically at a site to generate renewable energy at a place where power and energy are most needed.

Aggregation. The capacity of multiple site leverage generation apparatus systems is combined and managed as one resource to provide grid-scale impact.

Automation. The software platform in an example embodiment maximizes the value of energy and power services by intelligent and automated charge and dispatch of one or more renewable energy leverage generating apparatus configurations.

Virtualization. The various embodiments can pool available renewable energy leverage generating capacity into energy resources that can be reserved, allocated, and scaled to meet demand.

Integration. Applications and data are delivered over the web and integrated with external systems by means of open standards.

In certain aspects, a machine in the example form of a computer system within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a Home Network consumer appliance with an embedded logic on a chip or software, or any such device implemented via the Internet-of-Things technology (IoT), a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

An exemplary computer system may include a data processor (e.g., a central processing unit (CPU), a graphics processing unit (GPU), or both), a main memory and a static memory, which communicate with each other via a bus. The computer system may further include a video display unit (e.g., a liquid crystal display (LCD) or a cathode ray tube (CRT)). The computer system may also include one or more input devices (e.g., a keyboard), a cursor control device (e.g., a mouse), a disk drive unit, a signal generation device (e.g., a speaker) and a network interface device.

An exemplary disk drive unit may include a non-transitory machine-readable medium on which is stored one or more sets of instructions (e.g., software) embodying any one or more of the methodologies or functions described herein. The instructions may also reside, completely or at least partially, within the main memory, the static memory, and/or within the processor during execution thereof by the computer system. The main memory and the processor also may constitute machine-readable media. The instructions may further be transmitted or received over a network via the network interface device. While the machine-readable medium is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

SUMMARY OF THE INVENTION

In one embodiment, a renewable energy leverage generator apparatus to produce electricity from a rotating lever, comprises a triangular support structure for supporting a partially rotating, two-sided lever comprising a first end and a second end wherein said partially rotating, two-sided lever pivots about a fulcrum point and travels radially at an angle not to exceed forty-five degrees and pivots about a point substantially equidistant from the first end and the second end; one or more rotating lever ball bearings adjacent to the triangular support structure, the triangular support structure coupled to the rotating lever at the fulcrum point and one or more rotating lever ball bearings; one or more support brackets that form a substantially perpendicular angle between a first end and a second end of the one or more support brackets that are coupled to a swivel ball bearing fulcrum assembly having one or more swivel ball bearings wherein the ball bearing fulcrum assembly is coupled to the one or more rotating lever ball bearings, the one or more support brackets further coupled to a weight to form a weight swivel assembly operating on the rotating lever wherein the weight travels rotationally from a first position on the first end of the lever to a second position on the second end of the lever to apply a first force to move a crankshaft and turning a generator; and wherein the weight mounted on the rotating lever freely travels rotationally over a center such that the first end of the lever rotates substantially ninety degrees contemporaneously with the second end of the lever; and wherein the weight which is mounted on the rotating lever, having travelled from the first position on the first end of the lever to the second position on the first end, upon a reversal of the weight mounted on the rotating lever travelling rotationally from the second position on the second end of the lever to the first position on the first end of the lever to apply a second force and then repeats this cycle in response to a cycle force applied to the weight swivel assembly from activating one or more springs; one or more primary over center springs having a primary spring constant which provides a primary spring force that, when coupled with gravity, offsets a majority of the weight in the vertical direction; one or more secondary over center springs having a secondary spring constant which provides a secondary spring force, that when coupled with gravity, offsets a portion of an additional load that is created once the rotating lever is depressed; a piston affixed perpendicularly to the partially rotating two sided lever, wherein the piston is fired once a downward cycle is completed, one or more piston switches perpendicularly affixed to the top of the triangular support structure wherein the one or more piston switches fire one or more pistons and propels the weight swivel assembly over center to the other side of the partially rotating two-sided lever once the see-saw lever is fully depressed and the one or more pistons are fired in response to a fuel source; a fuel source, selected from the group including natural gas, propane, gasoline, linear actuators, and pneumatic drives powered by solenoids, provides fuel sufficient to fire the one or more pistons and send the weight swivel assembly over center to the other side of the partially rotating two-sided lever when the see-saw lever is fully depressed; the base of the one or more partially rotating two-sided lever is attached to a first end of a vertical crankshaft and a second end of a vertical force rod affixed to the crankshaft, and a side of a horizontal force rod affixed to the crankshaft, wherein the vertical force rod and the horizontal force rod pivot about a point and wherein the crankshaft is linked to the generator; one or more springs and one or more pistons are placed on the rotating lever along the length of the rotating lever said first ends and said second ends; and the weight swivel assembly including the weight, swivel ball bearings fulcrum assembly, and one or more pistons wherein the piston is attached perpendicularly to the support bracket of the base of the swivel weight assembly to activate one or more primary and one or more secondary springs via one or more cycle forces.

In certain aspects, a renewable energy leverage generator apparatus to produce electricity from a partially rotating, two-sided lever of comprises a fuel source that provides fuel sufficient to activate a high energy piston switch to fire one or more pistons to apply a high energy force to the weight swivel assembly is an electric linear actuator.

In another aspect, a renewable energy leverage generator apparatus to produce electricity from a partially rotating, two-sided lever comprises a fuel source that provides fuel sufficient to activate a high energy piston switch to fire one or more pistons to apply a high energy force to the weight swivel assembly is an electric fuel source sending a signal to a linear actuator having an integrated linear motion system with a roller screw mechanism for converting electric motor power into linear motion.

In another aspect, a renewable energy leverage generator apparatus to produce electricity from a partially rotating, two-sided lever comprises a high capacity electric linear actuator configured in a closed-loop servo system to provide positioning feedback from one or more linear position feedback sensors.

In yet another aspect, a renewable energy leverage generator apparatus to produce electricity from a partially rotating, two-sided lever comprising a high capacity electric linear actuator includes a force sensing option having a load cell for measuring force in both tension and compression directions required to propel weight swivel assembly over center to the opposite side of the partially rotating two-sided lever when the see-saw lever is fully depressed.

In yet another aspect, a renewable energy leverage generator apparatus to produce electricity from a partially rotating, two-sided lever comprising a high capacity electric linear actuator includes a force sensing option having a load cell for measuring force in both tension and compression directions required to propel the weight swivel assembly over center to the opposite side of the partially rotating two-sided lever when the see-saw lever is fully depressed.

In yet another aspect, a renewable energy leverage generator apparatus to produce electricity from a partially rotating, two-sided lever comprising a high capacity electric linear actuator includes a force sensing option having a load cell with load sensing for static and dynamic loads to determine and apply the force via the actuator required to propel the weight swivel assembly over center to the opposite side of the two-sided lever when the see-saw lever is fully depressed.

In yet another aspect, a renewable energy leverage generator apparatus to produce electricity from a partially rotating, two-sided lever comprising energy required to activate one or more pistons switches and one or more pistons, one or more primary springs, one or more secondary springs, and fuel source is less than the energy output from the leverage generator apparatus.

In yet another aspect, a renewable energy leverage generator apparatus to produce electricity from a partially rotating, two-sided lever comprising a ratio of energy output generated to energy input less efficiency losses of the renewable energy leverage generator apparatus is in a range from about 7:1 to about 22:1 when 3,000 watts are applied to the electric linear actuator to activate the one or more piston switches and pistons and one or more primary and one or more secondary springs, to move a weight of at least 10,000 pounds wherein the partially rotating, two-sided lever has a distance of at least ten feet from a point equidistant along the partially rotating, two-sided lever to its end point, wherein the moving weight swivel assembly produces energy to turn an axel one foot in one second.

In other various aspects, a renewable energy leverage generator apparatus to produce electricity from a partially rotating, two-sided lever comprising a two or more partially rotating, two-sided levers coupled on a common crankshaft sufficient to turn the crankshaft and maintain a smooth energy input to provide a constant speed of the common crankshaft.

In other various aspects, the leverage generator apparatus to produce electricity from a rotating lever may include an adjustable ball bearing swivel joint area coupled to one or more triangular over center weight swivel assemblies and slidingly attached to the rotating lever in a manner that moves freely along the lever in the direction of the lower end of the rotating lever, until it reaches a stop point at a piston switch.

In other various aspects, a leverage generator apparatus to produce electricity from a rotating lever, may further include one or more pistons, primary and secondary springs having a time delay equal to the amount of time for the triangular over center weight swivel assembly to reach a stop point at a piston switch along the lower end of the rotating lever, wherein the one or more pistons, primary and secondary springs are not released until the swivel joint area reaches the stop point when all devices fire, throwing the triangular structure over center.

In another embodiment, a vertical leverage generator apparatus, comprises a first rotating triangular weight car harness structure having an angled lever bar comprising a substantially forty-five degree support bar coupled on a first end to a weight bar and the support bar coupled on a second end to a support bar that is substantially perpendicular to the weight bar; a second rotating triangular weight car harness structure having an angled lever bar comprising a substantially forty-five degree support bar coupled on a first end to a weight bar and the support bar coupled on a second end to a support bar that is substantially perpendicular to the weight bar; the first and second rotating triangular weight car harness structures operating at substantially one hundred eighty degrees to each other to create forces in the opposite direction when the first and second rotating triangular weight car harness structures rotate at the same speed wherein the first and second rotating triangular weight car harness structures are coupled to a drive axel, a timing assembly having one or more points and one or more rotors, and a generator to provide energy to turn the drive axel and propel the first and second rotating triangular weight car harness structures in equal and opposite directions; a track system for transporting one or more travelling weighted devices, the track system having a wheel bar substantially in parallel to a weight bar, wherein the wheel bar is located radially outward from a drive axel and nearest to one or more wheels of the travelling weighted devices and wherein the track system is coupled to a first and second rotating triangular support assembly interposed at one hundred eighty degrees from each other; the wheel bar of the first and second rotating triangular weight car harness structures, wherein each wheel bar includes a first end and a second end, wherein each of the wheel bars is connected by catches to the weight bar; one or more springs on each of the wheel bars facing radially outward from the drive axel; the one or more travelling weighted devices are placed on each of the wheel bars coupled to one or more wheels that adjacent to the weight bar and the wheel bar; a wheel bar having a first end and a second end that together supports the travelling weight device in an upright position and in an inverted position to provide three hundred sixty degree support for the travelling weight device; one or more pistons which fire when a travelling weight device reaches a 90 degrees or 12:00 position; a fuel source to fire the one or more pistons, the fuel source selected from a group including natural gas, linear actuators, and pneumatic drives powered by solenoids wherein the fuel source creates energy to, fire the one or more pistons and send the travelling weight device in the 12:00 position towards opposite ends of the lever, and sends the travelling weight device in the 6:00 position towards a beginning point of a lever, creating a significant displacement of weight or torque, resulting in the drive axel being turned, resulting in the generator being turned; a travelling weight device located in the 3:00 and corresponding 9:00 position, resulting in the weights achieving leverage parity; a travelling weight device located between the 12:00 position and the 3:00 position, resulting in the displacement of the weight; one or more springs attached to both ends of the wheel bar, the springs vertically facing radially outward from the drive axel; a catch which releases when a travelling weight device reaches a 90 degrees or 12:00 position; a drive axel which is linked to at least one generator; a triangular swing-set support base assembly affixed to the drive axel and generator drive assembly at the top of the triangular swing-set support assembly; a vertical support bar wherein the base of the support bar is affixed to the drive axel; a horizontal weight bar or lever bar attached near the top of the vertical support bar; the forty-five degree support bar affixed to the end of the weight bar not connected to the vertical support bar, and also affixed near the bottom of the vertical support bar; one or more points and one or more rotors forming a timing assembly affixed adjacent to the drive axel; at least two lever assemblies vertically linked to one drive axel, the drive axel located at the intersection of the two lever assemblies, a bottom assembly connected the same as a top assembly; the pistons connected near the end of the vertical support bar; and a travelling weight device located at the 12:00 position, 1:30 position, 3:00 position, and 4:30 position, along with corresponding travelling weight devices on an opposite side.

In certain aspects, the vertical leverage generator apparatus may include a track construction wherein one or more weighted car devices have one or more wheels on the top of the car and one or more wheels on the bottom of the car, wherein the one or more wheels are coupled with one or more axels affixed to the weighted car device and wherein the one or more wheels are coupled to the track construction to allow the weighted car device to travel along the track and capture the one or more weighted car devices in an upright, fully inverted, and three hundred sixty degree configuration.

In other aspects, the vertical leverage generator apparatus, may further include a weighted car device configuration wherein two or more sets of wheels are configured such that each set of wheels capture a track length having one or more wheels above the track length and one or more wheels below the track length, rigidly affixed to the car device to capture the car device in all inverted, upright and three hundred sixty degree angular rotational positions.

In other various aspects, the vertical leverage generator apparatus, may further include one or more additional rotating harness track pairs operating on different Z-planes along multiple points of a common drive axel providing electricity to a common generator. There is a vertical y plane and a horizontal x plane.

In other various aspects, the vertical leverage generator apparatus, may further include wherein the one or more additional rotating harness track pairs operate at substantially the same speed but offset by thirty degrees or more from a first rotating harness track pair. There is a vertical y plane and a horizontal x plane.

In another embodiment, a method of using leverage to produce electricity from a partially rotating, two-sided lever, comprises steps for: supporting a partially rotating, two-sided lever with a triangular support structure coupled at a fulcrum point located at the midpoint of the partially rotating, two-sided lever wherein the triangular support structure has a base, a two sides, the sides each having one or more piston switches to engage a portion of the partially rotating, two-sided lever; engaging the partially rotating, two-sided lever with a triangular weight swivel assembly that travels rotationally about a fixed swivel ball bearings assembly that is adjacent to the midpoint of the partially rotating, two-sided lever wherein the triangular weight swivel assembly includes a first and second support arms that are perpendicular to each other and joined at a center point of the fixed swivel ball bearings assembly and wherein the first and second support arms are joined on the outer ends by a weighted device forming a right triangle between the first and second support arms; rotating the triangular weight swivel assembly from a first beginning position on the partially rotating, two-sided lever to a second ending position on the partially rotating, two-sided lever to complete one-half of an over-center cycle of the partially rotating, two-sided lever, wherein the first beginning position is vertically below said fulcrum and midpoint of the partially rotating, two-sided lever and wherein the second ending position is vertically below said fulcrum and midpoint of the partially rotating, two-sided lever; activating a first piston switch upon lowering the partially rotating, two-sided lever to the first beginning position vertically below said fulcrum and midpoint of the partially rotating, two-sided lever to overcome the triangular weight swivel assembly until it travels over-center to a second position vertically below said fulcrum and midpoint of the partially rotating, two-sided lever to complete the first-half of the over-center cycle of the partially rotating, two-sided lever and activate a second piston switch to reverse the over-center action of the triangular weight swivel assembly and return the triangular weight swivel assembly to the first beginning position vertically below the fulcrum and midpoint of the partially rotating, two-sided lever thereby completing a second-half of the over-center cycle to complete a full cycle of travel for the triangular weight swivel assembly and thereby reactivating the first piston switch to begin a complete second cycle of the triangular weight swivel assembly; applying a force from the completed full cycle of travel of the triangular weight swivel assembly when the partially rotating, two-sided lever reaches the original first beginning position for a subsequent time to engage the force with a crankshaft which turns a generator and wherein the partially rotating, two-sided lever which has reached the original first beginning positions commences a second cycle and reactivates the piston switch for a subsequent cycle to commence; engaging the rotating triangular weight swivel assembly with one or more secondary springs attached to an outer portion of the rotating lever, one or more primary springs attached to an inner portion of the rotating lever, and one or more piston switches near the midpoint of the partially rotating, two-sided lever, wherein the one or more secondary springs, one or more primary springs, and one or more piston switches engage an end of the partially rotating, two-sided lever to propel it over-center with a force in excess of the rotating triangular weight swivel assembly sufficient to send the rotating triangular weight swivel assembly to a second ending position vertically below the fulcrum and midpoint of the partially rotating, two-sided lever, wherein the rotating triangular weight swivel assembly in conjunction with gravity, produces a force on a crankshaft sufficient to turn a generator and produce electricity; joining the rotating triangular weight swivel assembly to a swivel ball bearing fulcrum assembly having one or more swivel ball bearings enclosed in a common area wherein the swivel ball bearing fulcrum assembly is adjacent to one or more rotating lever ball bearings at a midpoint fulcrum of the partially rotating, two-sided lever; releasing one or more secondary springs and one or more primary springs wherein each secondary spring and each primary spring has a spring constant sufficient to produce a moment arm torque substantially greater than the moment arm torque of the triangular weight swivel assembly; firing one or more piston switches coupled to a lower portion of the partially rotating, two-sided lever and firing one or more piston switches coupled to the support structure on the lower portion of the partially rotating, two-sided lever nearest the fulcrum midpoint; and increasing weight to the rotating triangular weight swivel assembly and increasing length to the partially rotating, two-sided lever to correspondingly increase the force transferred to the crankshaft and generator.

In other aspects, the method may include steps for slidingly attaching an adjustable ball bearing swivel joint area coupled to one or more triangular over center weight swivel assemblies such that the adjustable ball bearing swivel joint area moves freely along the rotating lever in the direction of the lower end of the rotating lever, until it reaches a stop point at a piston switch.

In other various aspects, the method may further include steps for delaying the operation of one or more pistons, primary and secondary springs affixed to the rotating lever for a time period equal to the time required for the slidingly attached adjustable ball bearing swivel assembly to travel down the lower end of the rotating lever to the stop point at a piston switch; and engaging the slidingly attached adjustable ball bearing swivel joint area with the one or more pistons, primary and secondary springs to activate and fire the one or more pistons, primary and secondary springs with sufficient force to throw the triangular structure over center.

In another embodiment, a method of using leverage to produce electricity from a vertical generator apparatus, comprises steps for rotating two or more triangular weight car harness structure pairs about a pivot point located at a midpoint of one or more support bars for one or more complete revolutions of three hundred sixty (360) degrees; affixing the two or more triangular weight car harness structure pairs to the one or more support bars by forming a perpendicular intersection between each of the one or more weight bars and each of the one or more support bars mechanically coupled at a first end closest to each of the one or more support bars and by forming a substantially forty-five (45) degree angle with each of the one or more weight bars and each of the one or more support bars to form each of the triangular weight car harness structure frames; attaching a track to capture a weight car device having two or more wheels to move along the track for each of the triangular weight car harness structures, wherein the two or more wheels moving along the track are enclosed between two parallel tracks adjacent to the two or more wheels at all times during the triangular weight car harness structure during one or more revolutions; simultaneously firing one or more pistons and releasing one or more catch releases adjacent to each of the one or more weight car devices to start the one or more weight car devices traveling along the track and applying force to each of the one or more triangular weight car harness structure pairs to begin a rotation about the pivot point located at the midpoint of the one or more support bars; coupling the one or more support bars with the two or more triangular weight car harness structure pairs to a drive axel of a generator, a timing assembly having one or more points and one or more rotors, to produce electricity from the generator proportional to the speed of the drive axel, weight of the two or more triangular weight car harness structure pairs, force generated from the one or more firing pistons adjacent to each of the weight car devices, and the spring constant on each of the triangular weight car harness structure pair track assembly; and forming a base frame assembly having a triangular shape with sufficient strength to support the weight of the vertical generator apparatus and vertical leverage generator assembly having two or more triangular weight car harness structure pairs on opposite, one hundred-eighty (180) degrees of each of the one or more support bars.

In certain aspects, the method may further include steps for capturing one or more weighted car devices for one or more full revolutions in three hundred sixty degree angular, rotational positions; coupling one or more wheels of one or more weighted car devices on the top of the one or more weighted car devices and one or more wheels on the bottom of the one or more weighted car devices with one or more affixed axels and one or more track lengths, such that the one or more wheels on the bottom and the one or more wheels on the top are located between the wheels and the track length; and propelling the weighted car device along the track length by allowing the one or more top wheels and the one or more bottom wheels to rotate freely about an axel affixed to the weighted car device.

In other aspects, the method may further include steps for capturing a weighted car device configuration in all inverted, upright and three hundred sixty degree angular rotational positions, wherein two or more sets of wheels envelope a track length having one or more wheels above the track length and one or more wheels below the track length; and coupling the two or more sets of wheels to the weighted car device by one or more axels allowing the two or more sets of wheels to freely rotate and propel the weighted car device along the track length.

In other various aspects, the method may further include steps for rotating one or more additional harness track pairs operating on different Z-planes along multiple points of a common drive axel providing electricity to a common generator.

In other various aspects, the method may further include steps for the one or more additional rotating harness track pairs operate at substantially the same speed but are offset by thirty degrees or more from a first rotating harness track pair.

A partially rotating, two-sided leverage generator apparatus, comprises one or more lever devices each pivoting about a midpoint fulcrum at an angle not to exceed forty-five degree from a horizontal position, one or more weighted devices freely pivoting about a common cylinder adjacent to the one or more lever devices midpoint fulcrum such that the one or more weighted devices move from a first position on the lever device over-center of the lever device to a second position in response to a first set of pistons, springs and fuel cell energy inputs and wherein the one or more weighted devices reverse direction in response to a second set of pistons, springs and fuel cell energy inputs to move from the second position on the lever device and return over center at the midpoint of the lever device to the first position to complete a full cycle of travel, thereby transferring two or more forces proportional to the energy input to a common crankshaft, wherein the two or more forces from each of the one or more weighted devices are sufficient to turn the crankshaft at a constant speed and turn a generator.

In other aspects of the embodiment, the partially rotating, two-sided leverage generator apparatus further comprises two or more partially rotating, two-sided levers applying three thousand (3,000) watts to two or more electric linear actuators wherein the ratio of energy output generated to energy input less efficiency losses for each electric linear actuator is in a range from about 7:1 to about 22:1 when two or more piston switches, pistons and two or more primary, and two or more secondary springs, combine to move a weight of at least 10,000 pounds a distance of at least ten feet from a point equidistant along each of the partially rotating, two-sided levers to its end point, wherein each of the moving weight swivel assemblies produces energy sufficient to turn an axel one foot in one second. In other various aspects, the partially rotating, two-sided leverage generator apparatus further comprises four or more sets of two or more partially rotating, two-sided levers applying at least three thousand (3,000) watts to two or more electric linear actuators wherein the ratio of energy output generated to energy input less efficiency losses for each electric linear actuator is about a minimum of 22:1 when two or more piston switches, pistons and two or more primary, and two or more secondary springs, combine to move a weight of at least 10,000 pounds a distance of at least ten feet from a point equidistant along each of the partially rotating, two-sided levers to its end point, wherein each of the moving weight swivel assemblies produces energy sufficient to turn an axel at a minimum speed of one foot per second.

In another embodiment, a leverage generator device comprises one or more high energy linear actuators operating in response to one or more fuel cell inputs, each activating a set of one or more piston switches, one or more pistons, and releasing one or more springs of a sufficient spring constant to transfer a high energy force to propel one or more weighted devices over a midpoint of one or more partially rotating, two-sided levers to transfer energy to a generator.

In another aspect, a leverage generator device comprises one or more high energy linear actuators operating in response to one or more fuel cells is an electric linear actuator having an integrated linear motion system with a roller screw mechanism for converting electric motor power into linear motion to turn a roller screw device.

In other various aspects, a leverage generator device of comprises an electric linear actuator is configured in a closed-loop servo system to provide positioning feedback from one or more sensors.

In other various aspects, a leverage generator device of comprises a ratio of energy output generated to energy input less efficiency losses of the leverage generator device is at least 7:1 when 3,000 watts are applied to the electric linear actuator having a rating of at least 7,000 pounds continuous force, to apply a force on one or more weighted devices of 10,000 pounds wherein the one or more weighted devices travel a distance of at least twenty feet to a point at about ten feet from the midpoint of the one or more partially rotating, two-sided levers in less than one second and wherein the one or more weighted devices produces sufficient energy to turn an axel one foot in one second.

BRIEF DESCRIPTION OF THE DRAWINGS

Figure 1A:
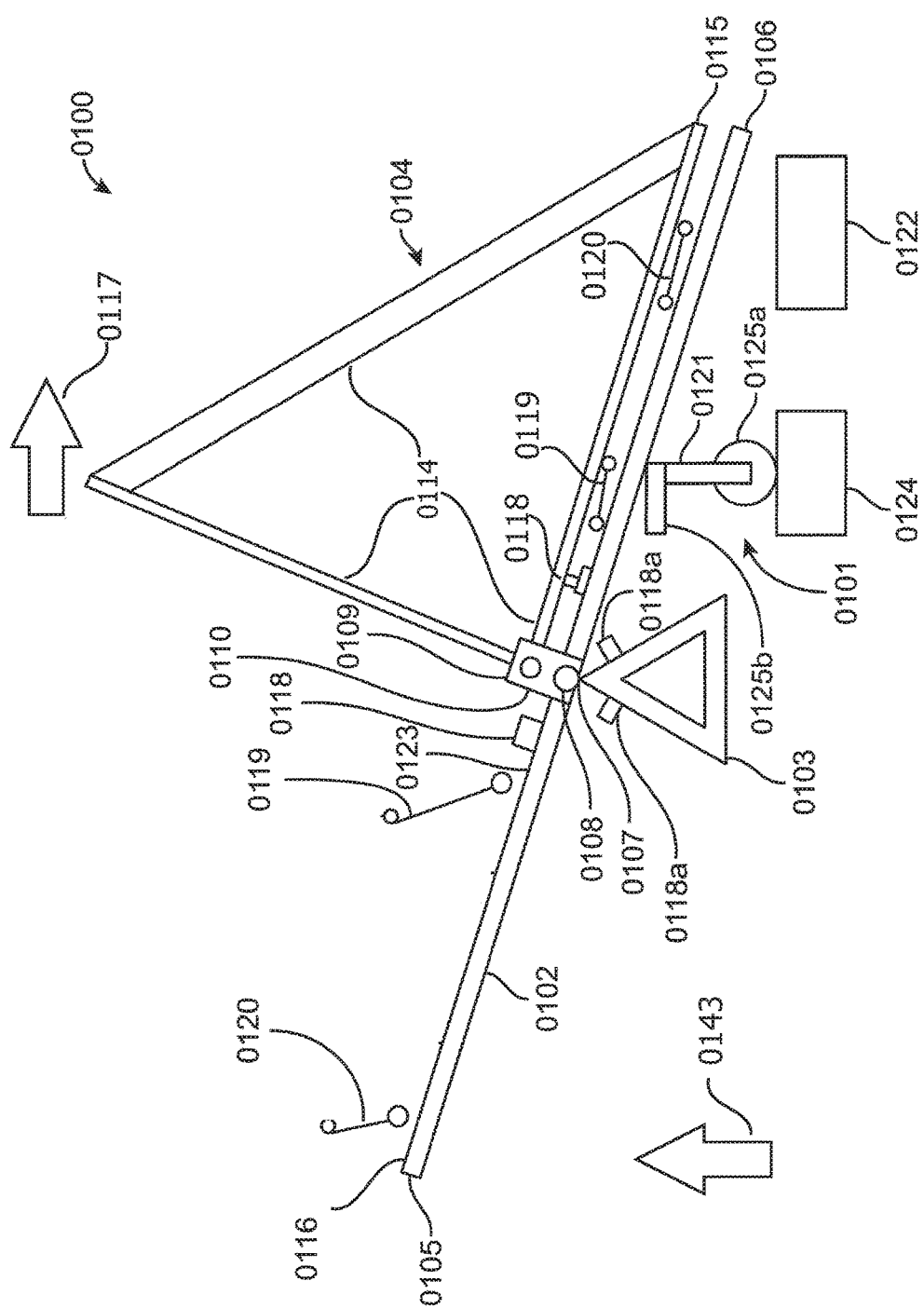

Having thus described the invention in general terms, reference will now be made to the accompanying drawings, which are not necessarily drawn to scale, and wherein:

FIG. 1A is an apparatus for a renewable energy leverage generator for producing electrical energy in the right position.

Figure 1B:
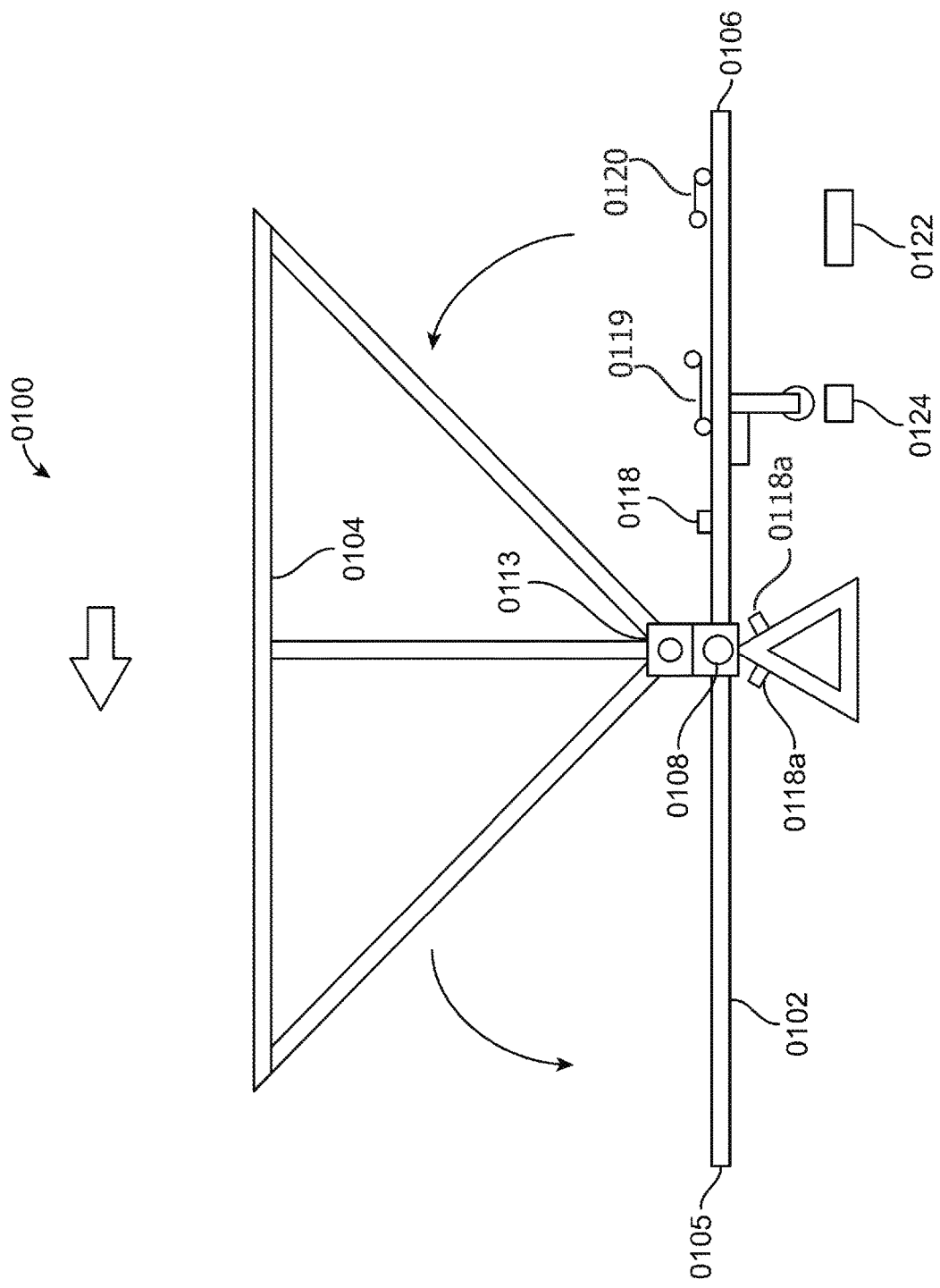

FIG. 1B is another configuration of an apparatus for a renewable energy leverage generator for producing electrical energy, moving counterclockwise from right to left.

Figure 1C:
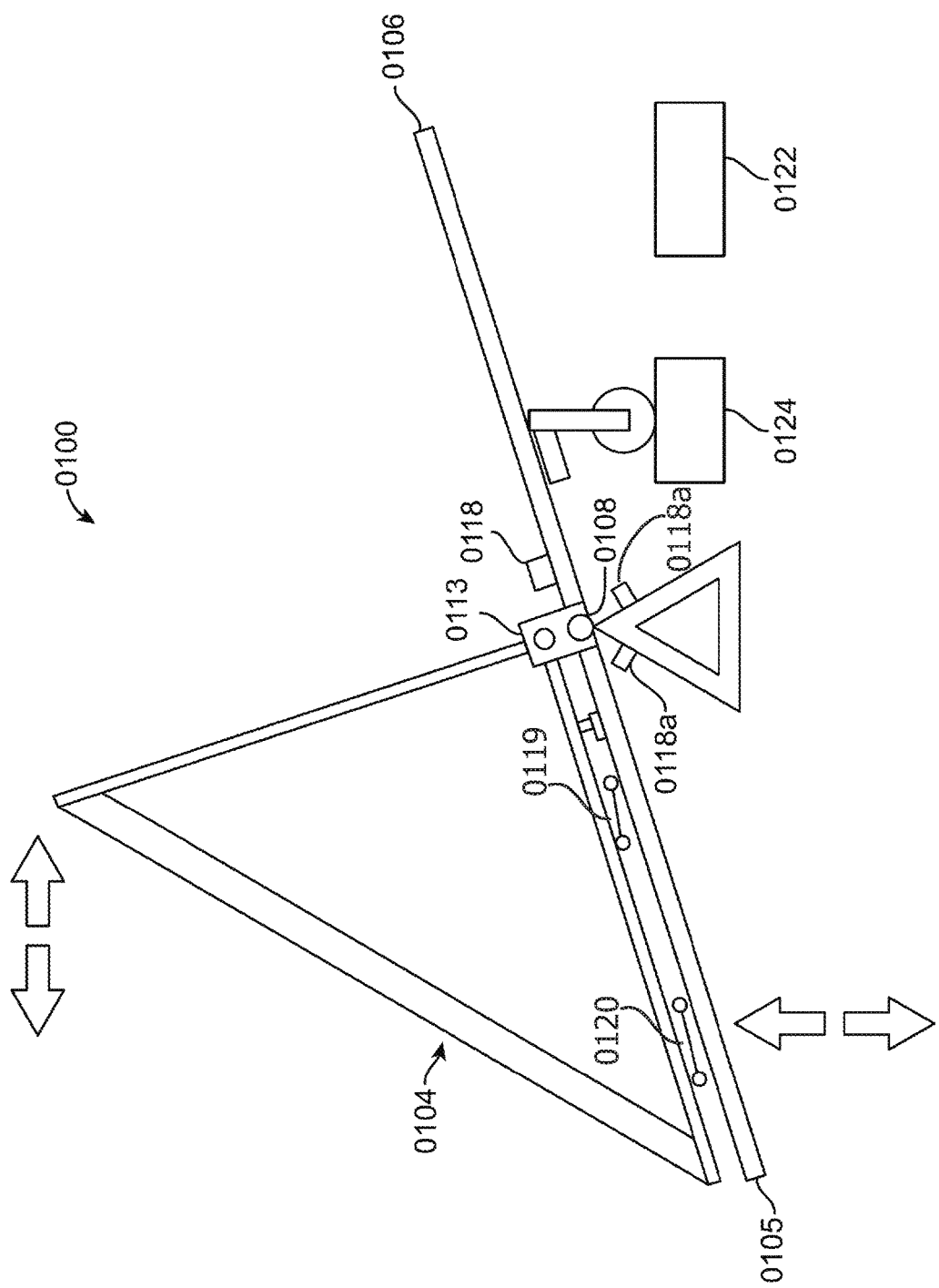

FIG. 1C is an apparatus configuration for a renewable energy leverage generator for producing electrical energy in the left position.

Figure 1D:
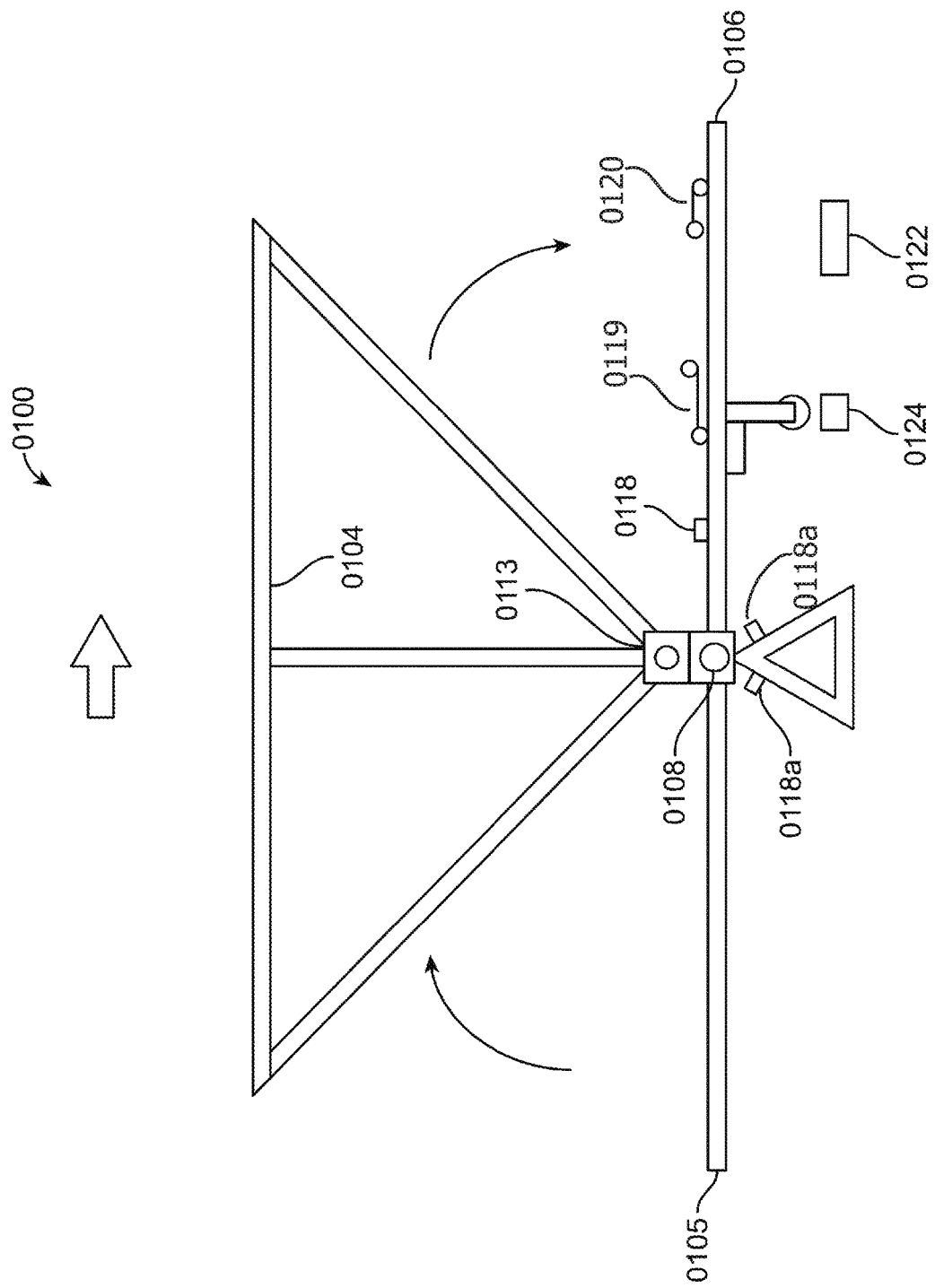

FIG. 1D is an apparatus configuration for a renewable energy leverage generator for producing electrical energy, moving clockwise from left to right.

FIG. 1E is an apparatus configuration for a renewable energy leverage generator for producing electrical energy.

Figure 1F:
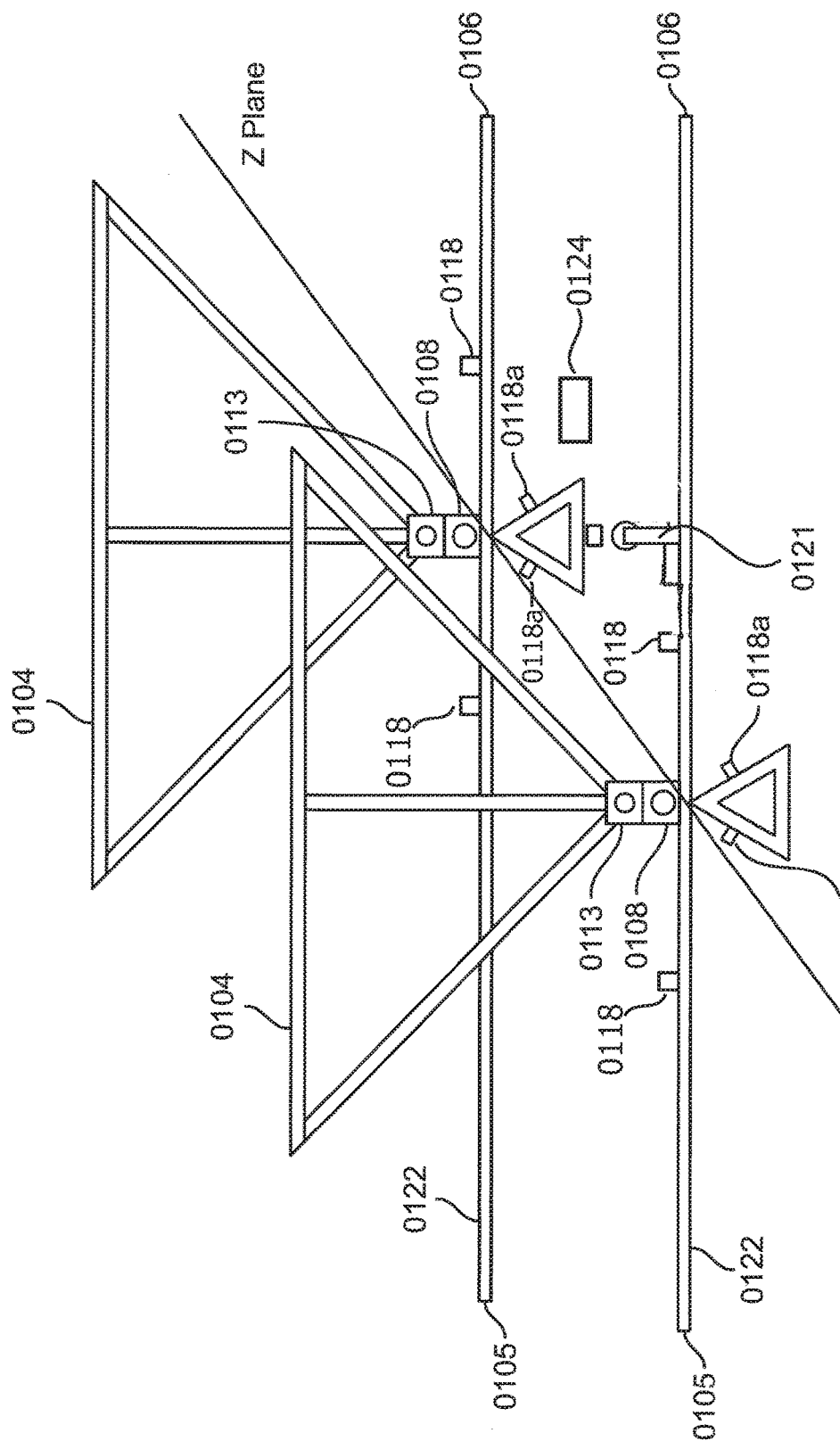

FIG. 1F is an apparatus configuration for a renewable energy leverage generator for producing electrical energy, with two partially rotating, two-sided levers.

Figure 1G:
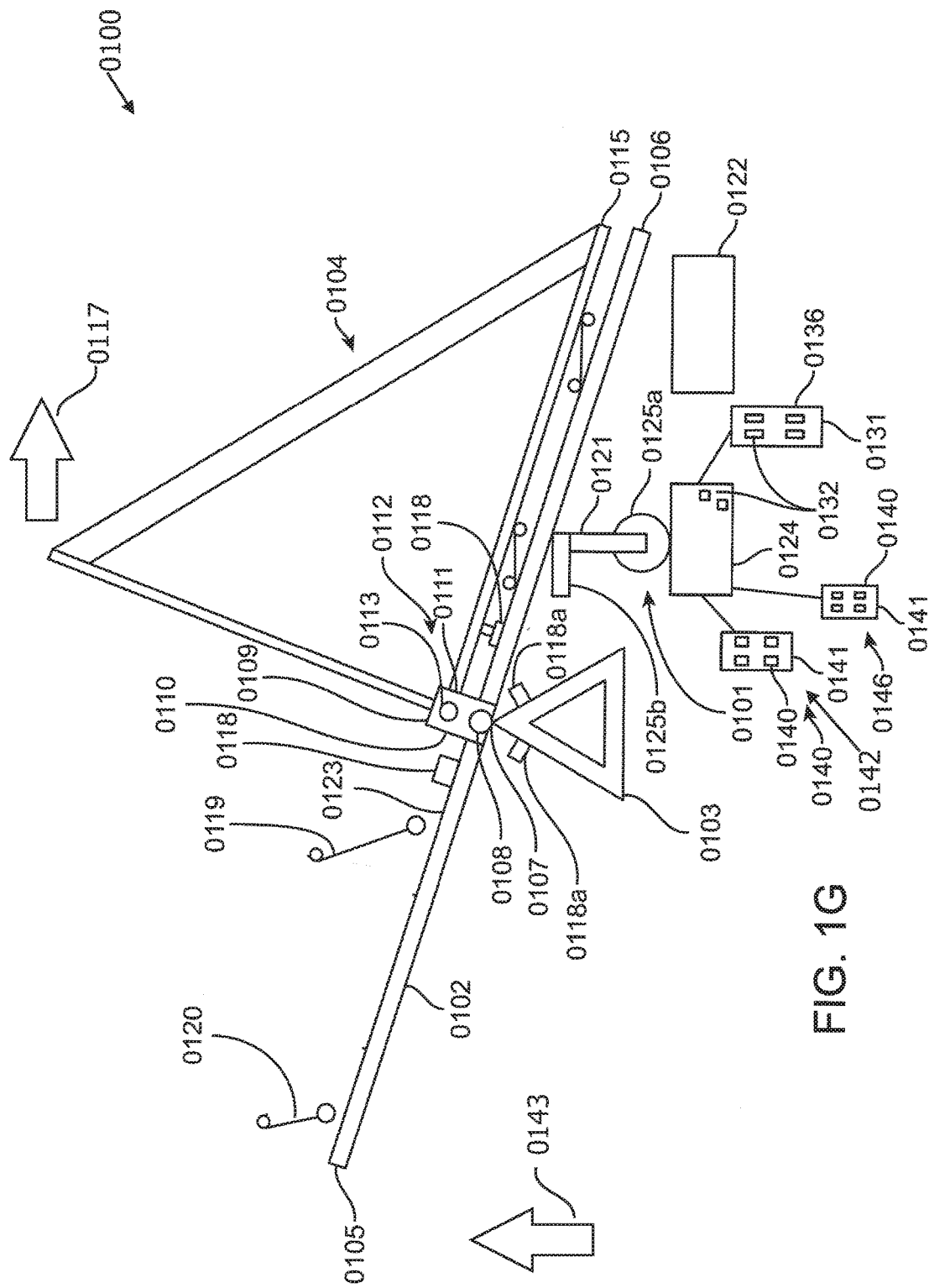

FIG. 1G is an apparatus for a renewable energy leverage generator for producing electrical energy, with a closed-loop servo system and a force sensing option having a load cell.

Figure 2A:
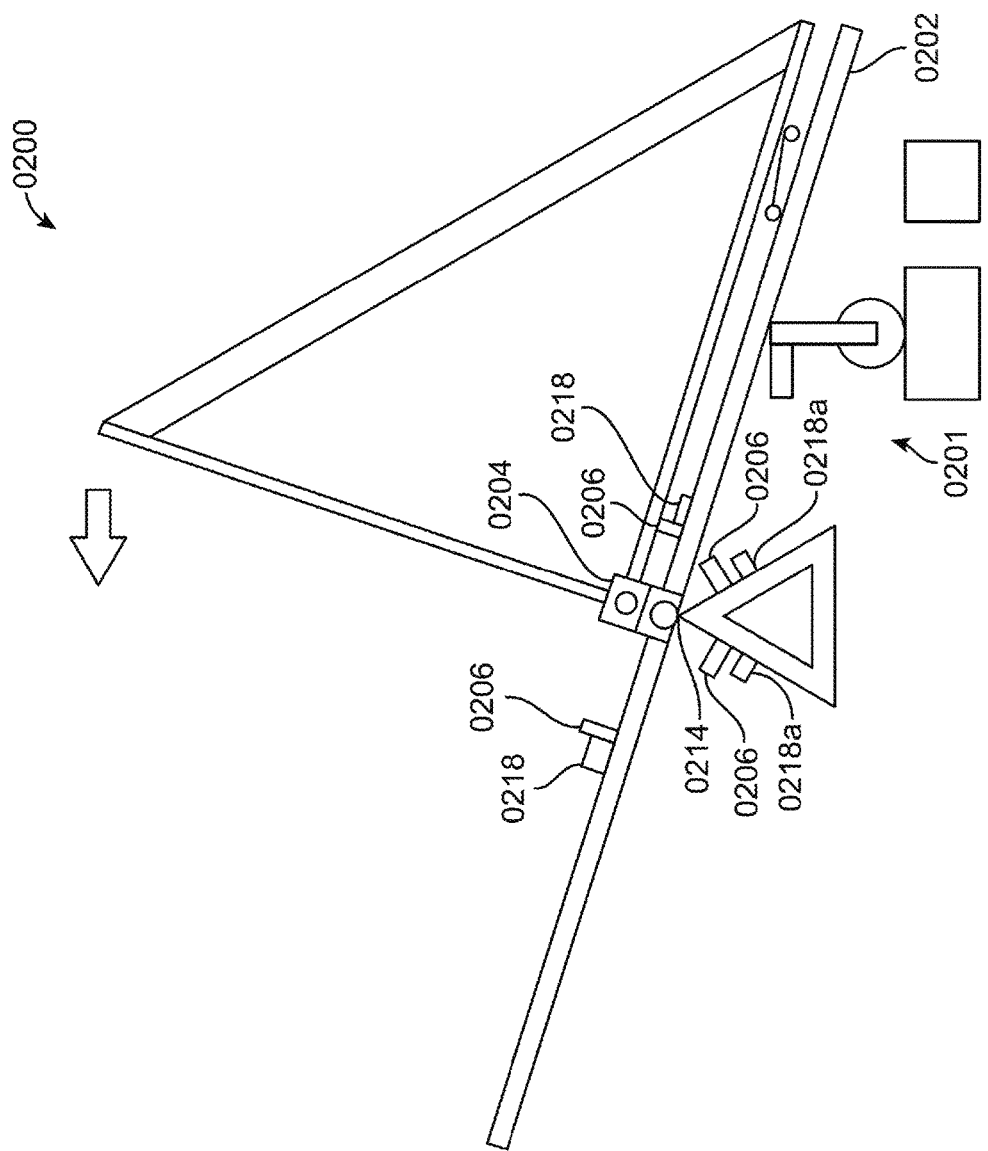

FIG. 2A is a renewable energy leverage generator apparatus for producing electrical energy in the right position.

Figure 2B:
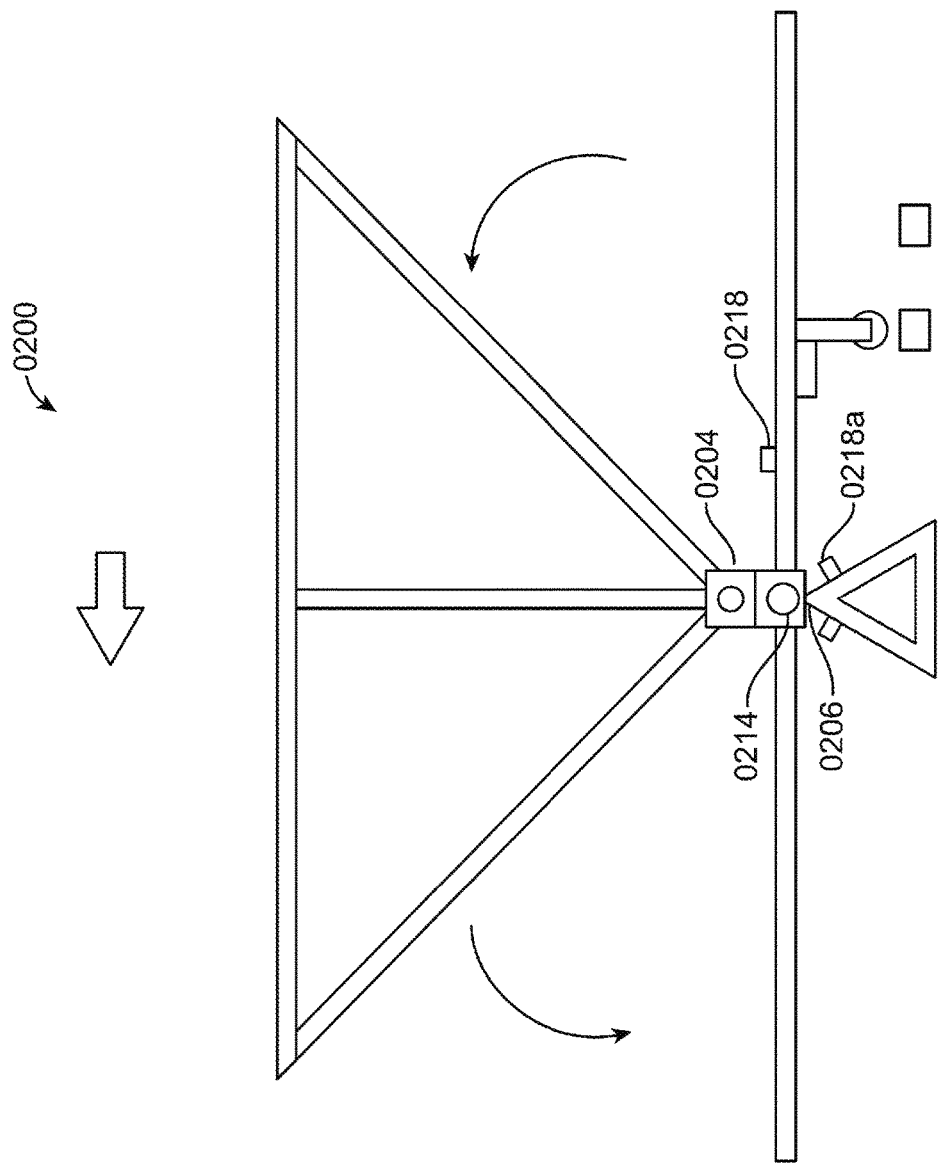

FIG. 2B is an apparatus for a renewable energy leverage generator for producing electrical energy, moving counterclockwise from right to left, with a stop point at a piston switch.

Figure 2C:
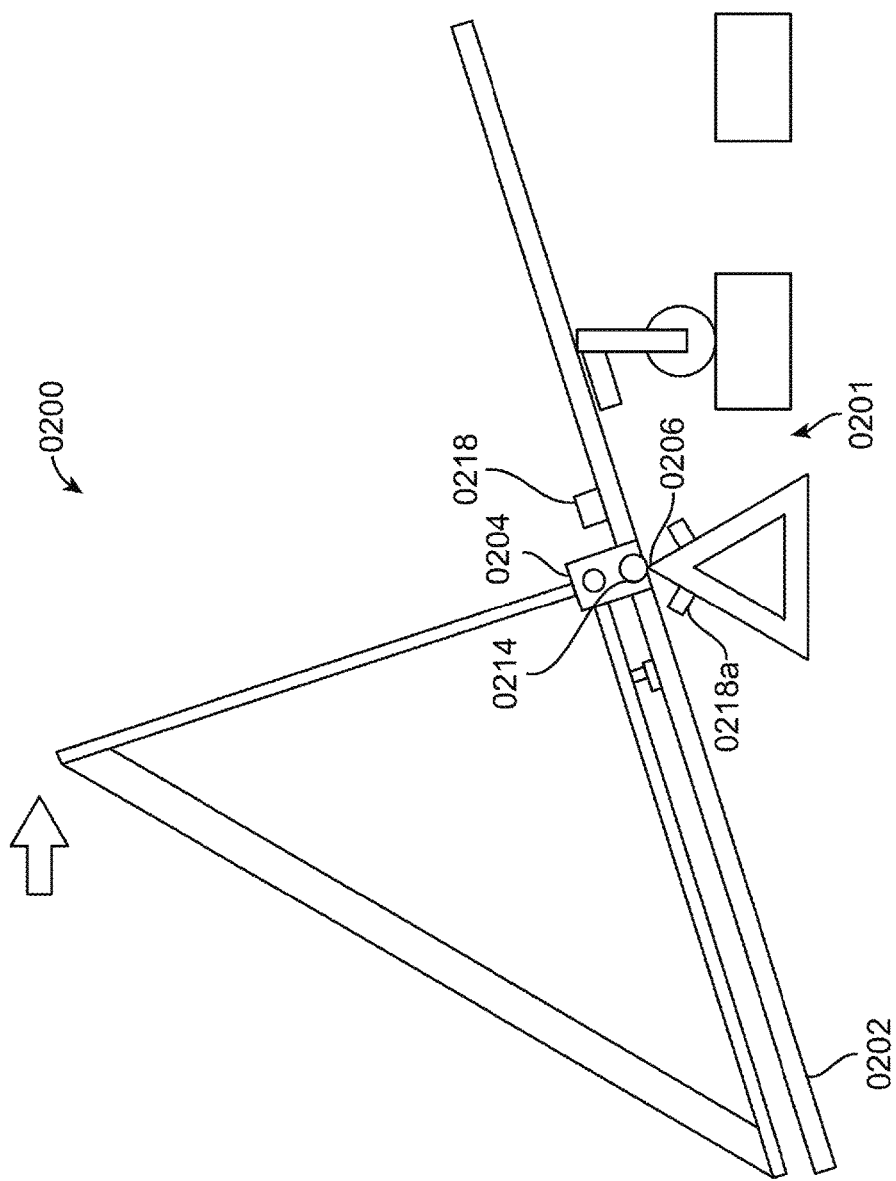

FIG. 2C is an apparatus for a renewable energy leverage generator for producing electrical energy in the left position, with a stop point at a piston switch.

Figure 2D:
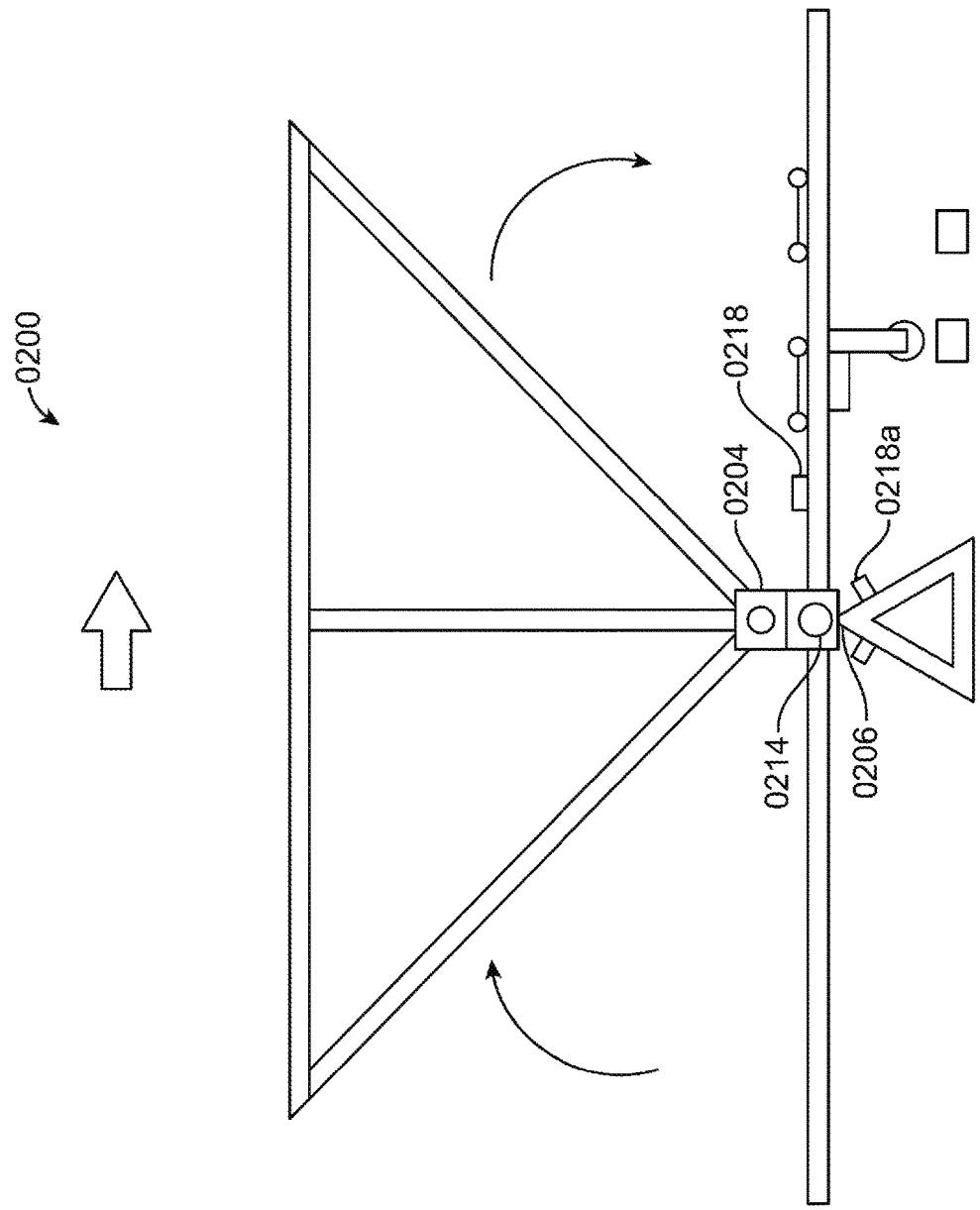

FIG. 2D is an apparatus for a renewable energy leverage generator for producing electrical energy, moving clockwise from left to right, with a stop point at a piston switch.

Figure 2E:
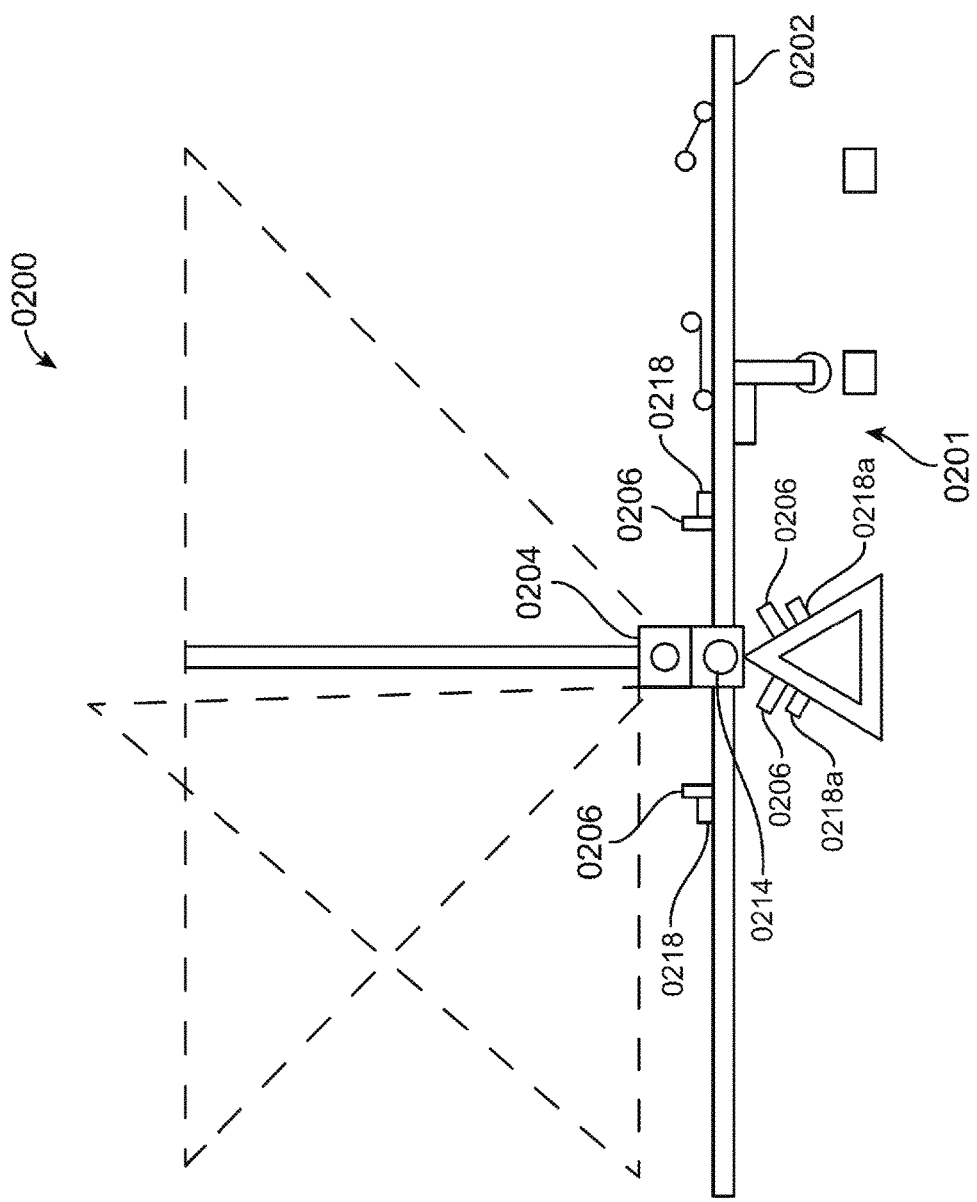

FIG. 2E is an apparatus for a renewable energy leverage generator for producing electrical energy, with a stop point at a piston switch.

Figure 3:
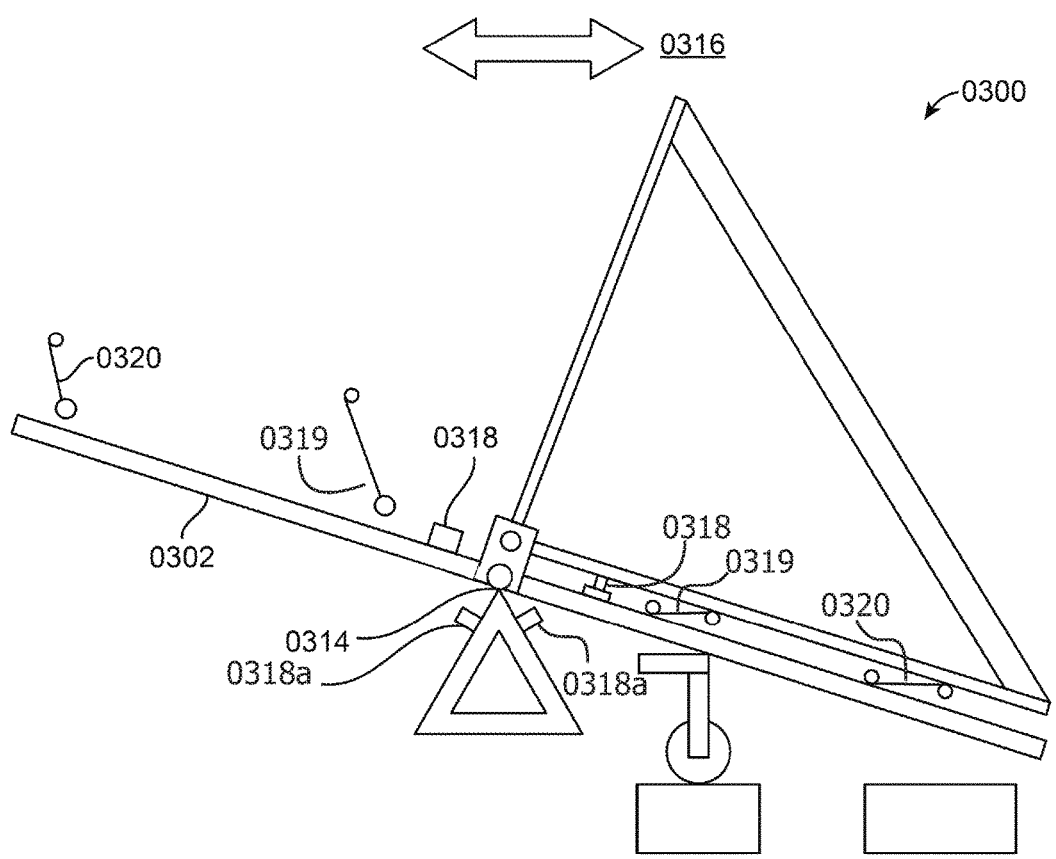

FIG. 3 is an apparatus configuration for a renewable energy leverage generator for producing electrical energy.

Figure 4:
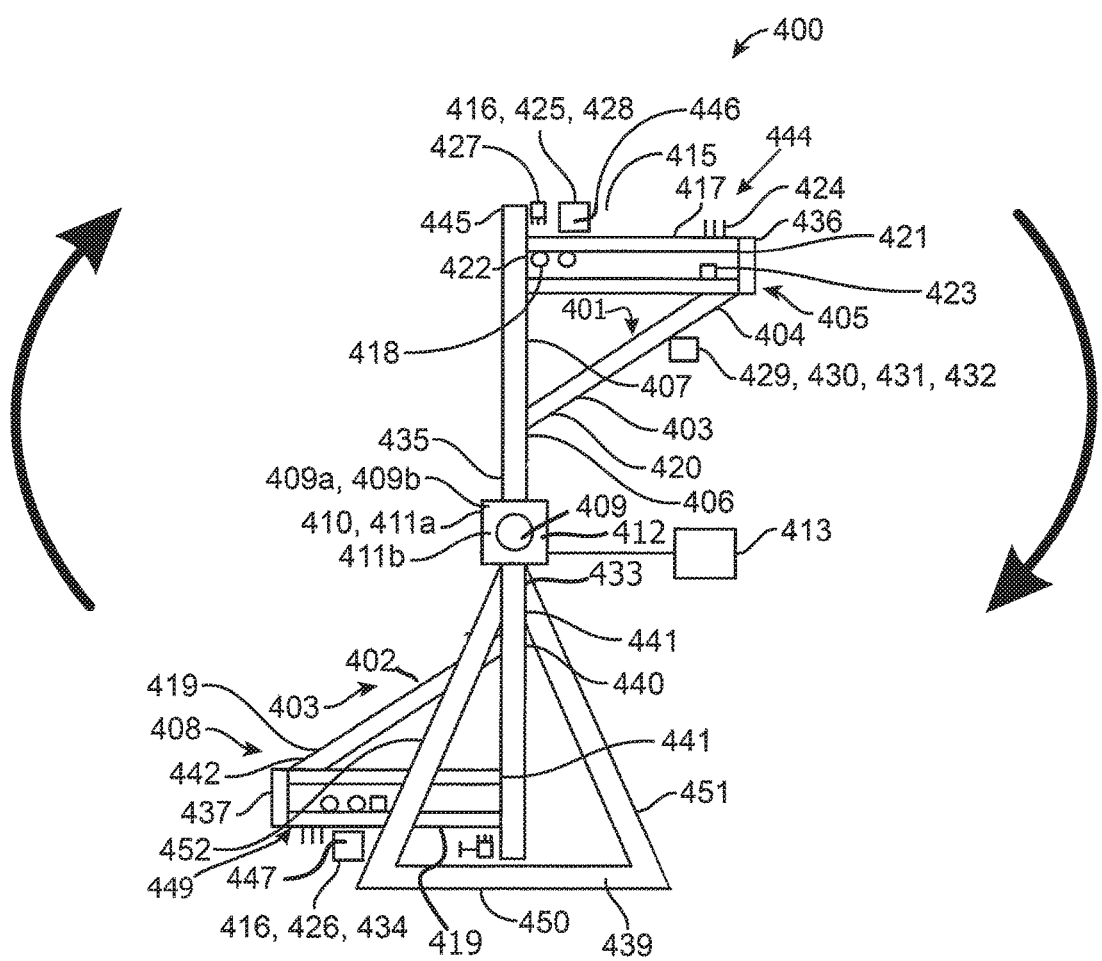

FIG. 4 is a vertical leverage generator apparatus.

Figure 5:
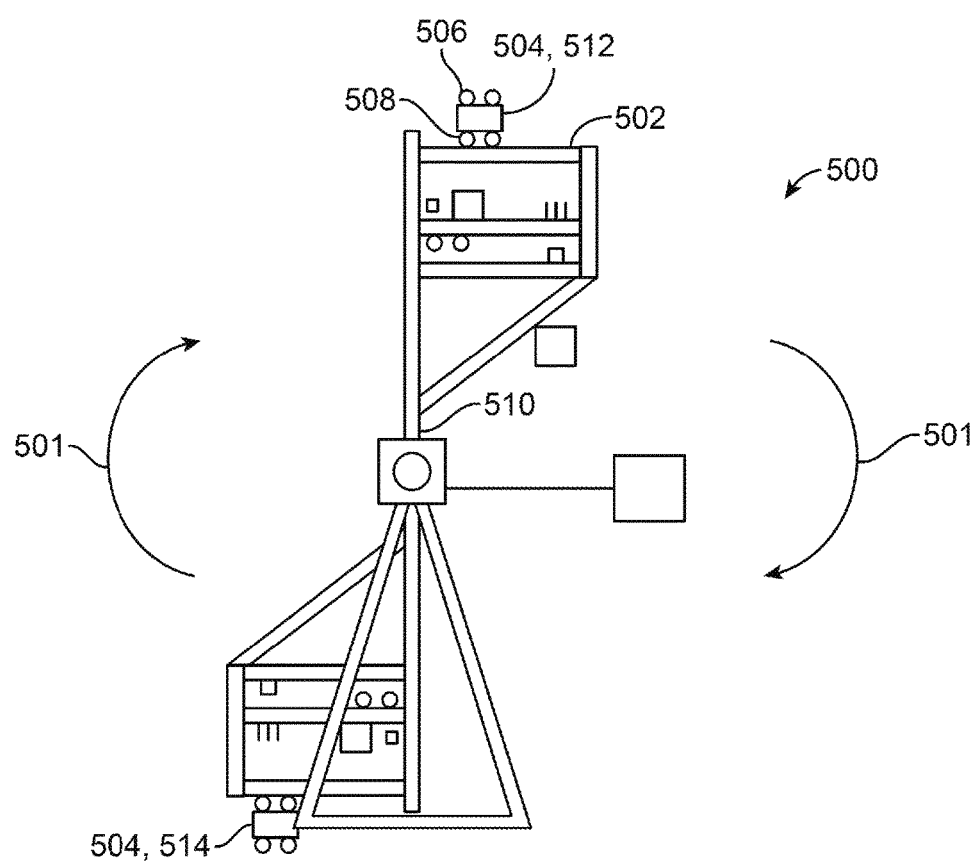

FIG. 5 is a vertical leverage generator apparatus configuration.

Figure 6:
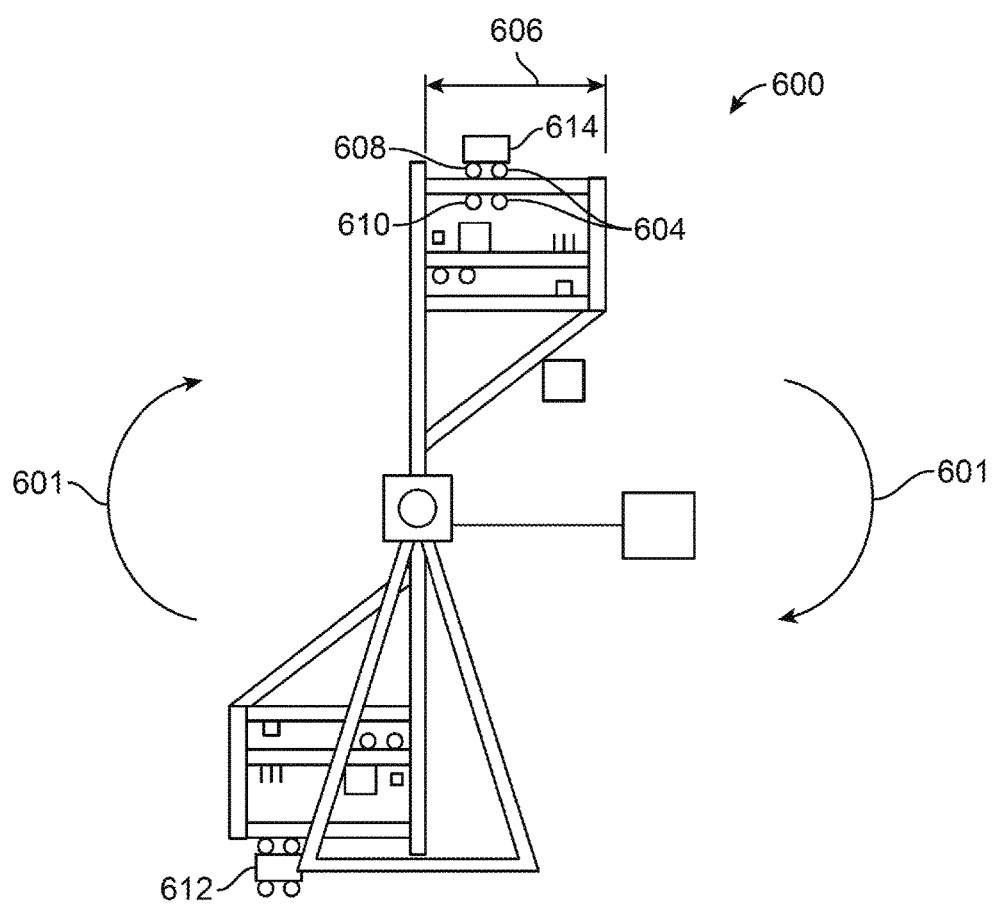

FIG. 6 is a vertical leverage generator apparatus configuration.

Figure 7:
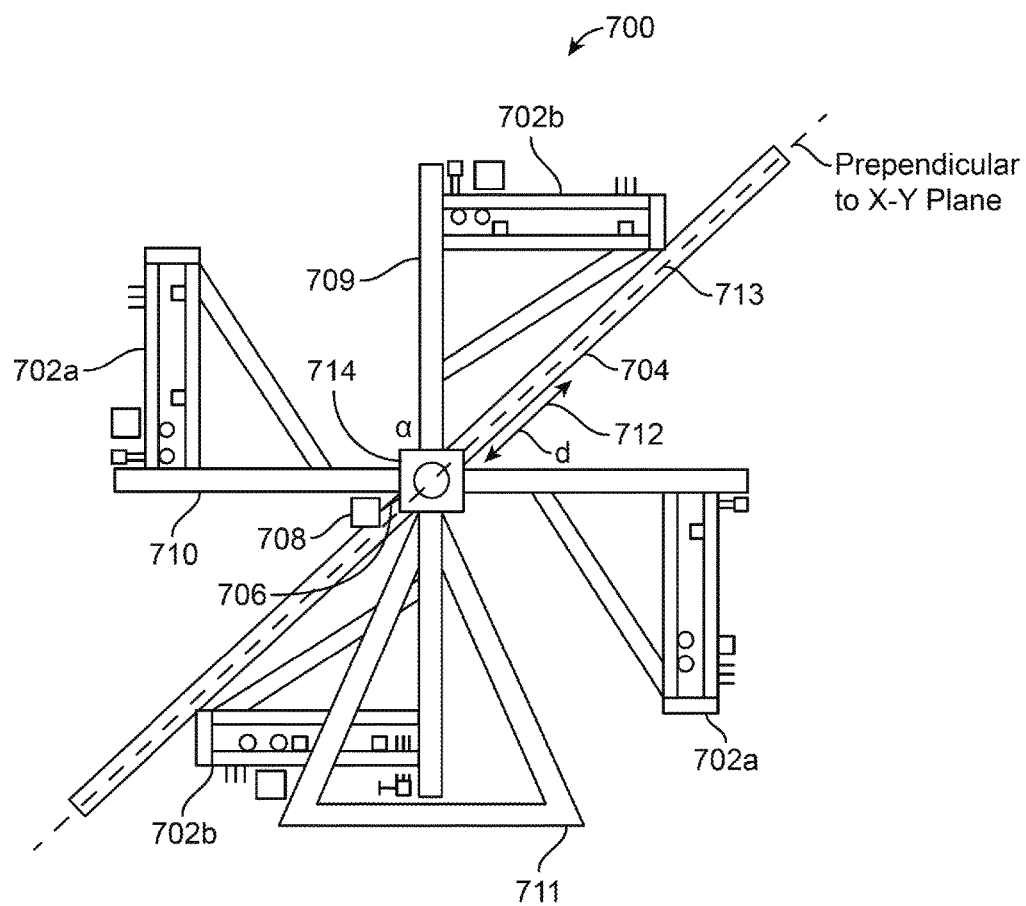

FIG. 7 is another vertical leverage generator apparatus configuration, with two rotating track pairs operating on the same Z-plane at the same constant velocity and each offset by an angle $\alpha$.

Figure 8:
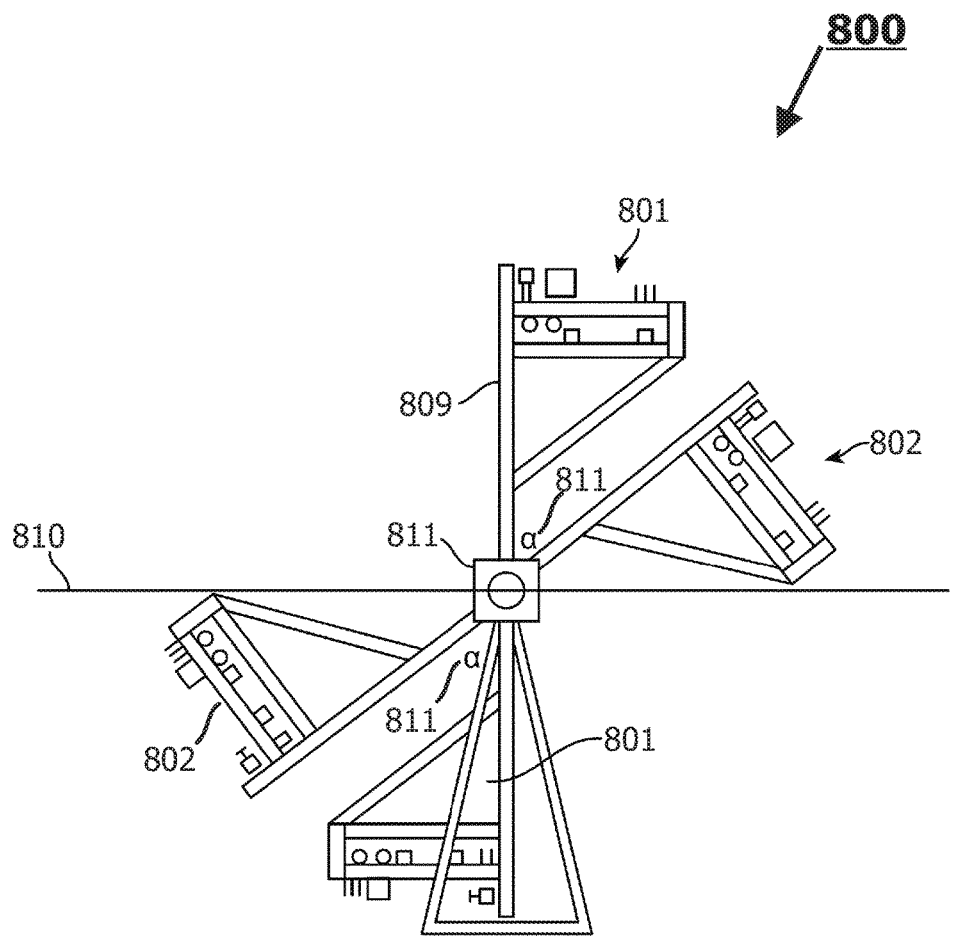

FIG. 8 is another vertical leverage generator apparatus configuration operating on a different Z-plane at the same constant velocity and each offset by an angle $\alpha$.

Figure 9A:
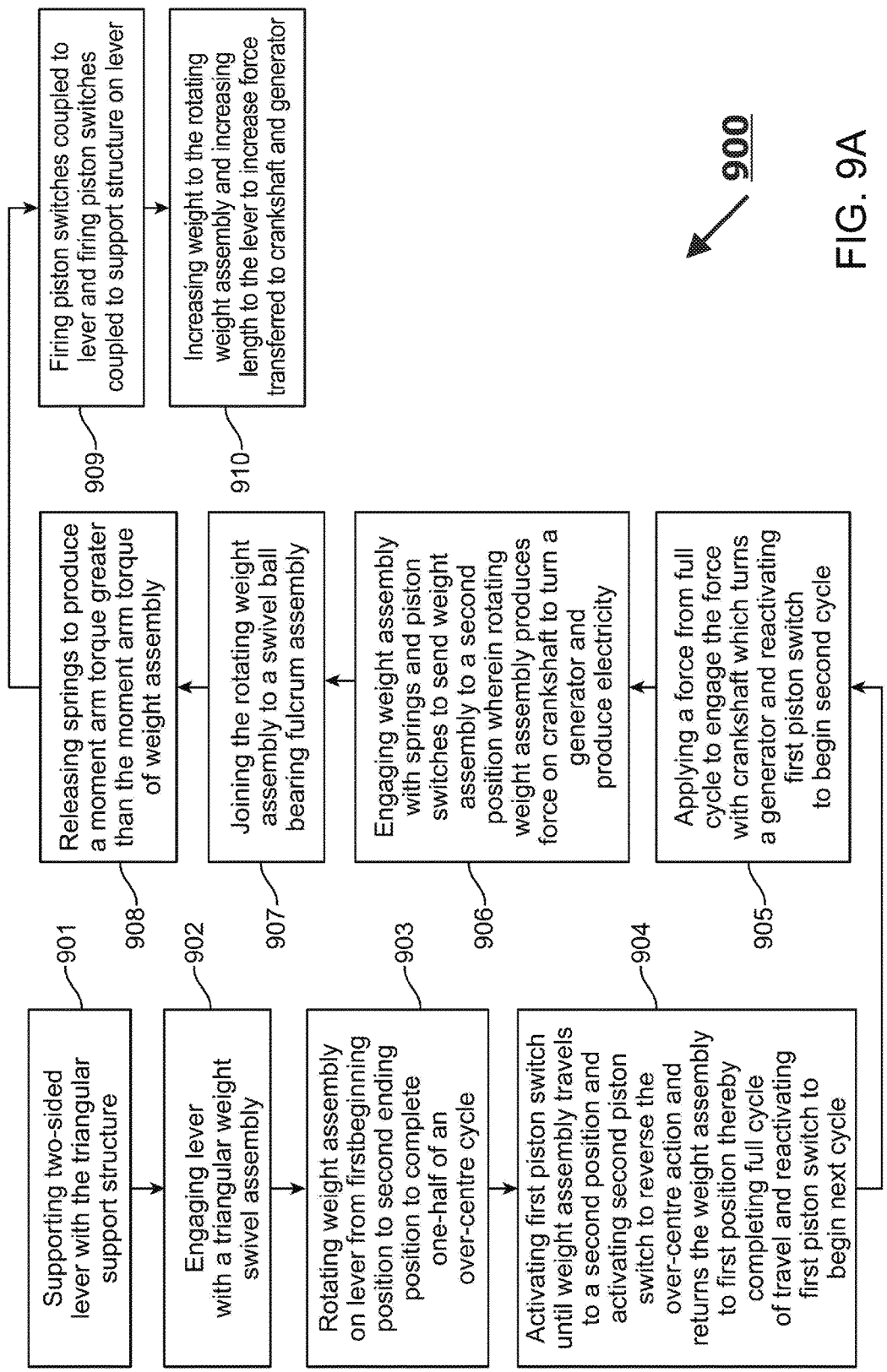

FIG. 9A is a flow chart diagram of a method of using leverage to produce electricity from a partially rotating, two-sided lever.

Figure 9B:
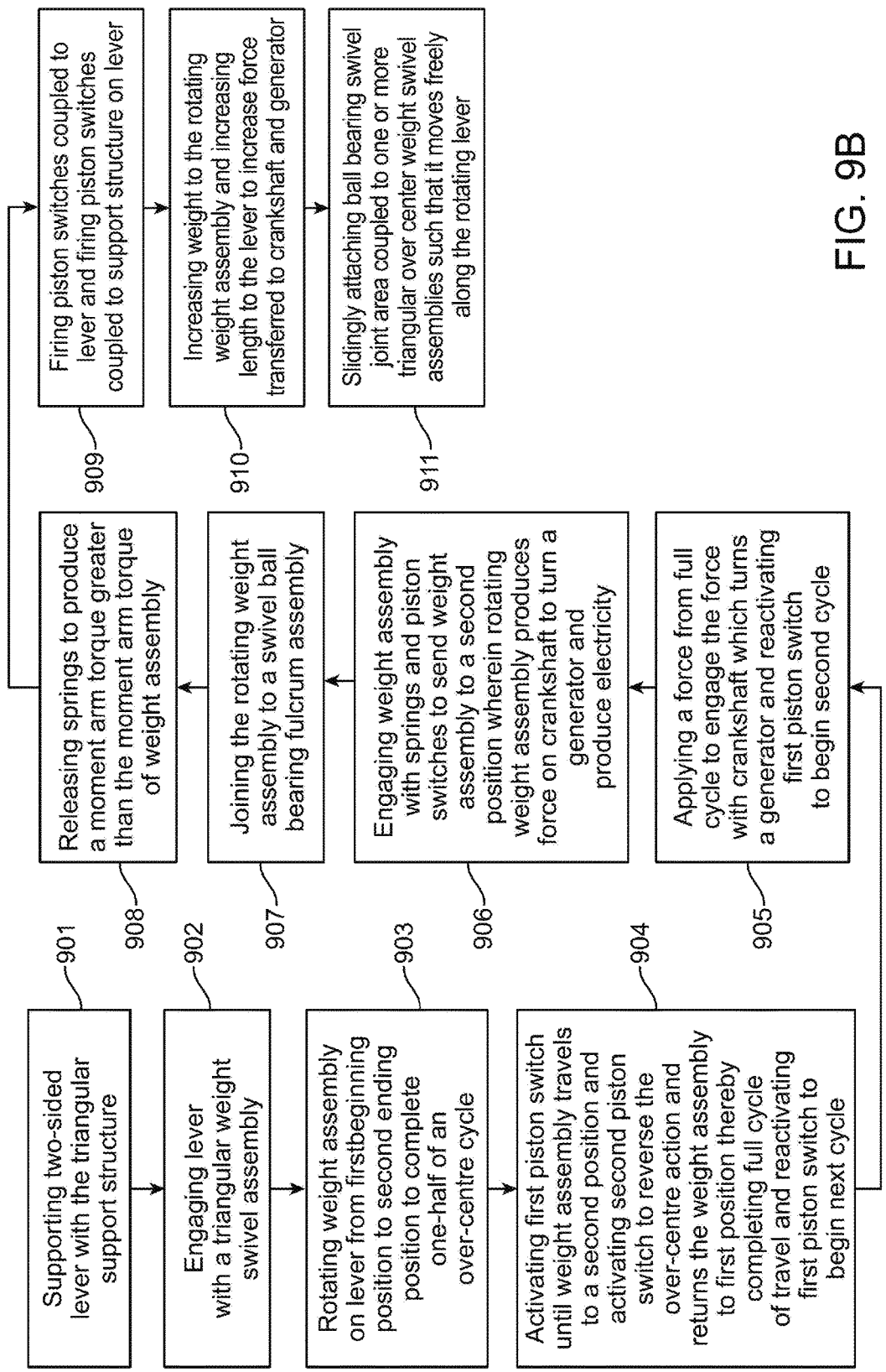

FIG. 9B is a flow chart diagram of a method of using leverage to produce electricity from a partially rotating, two-sided lever.

FIG. 9C is a flow chart diagram of a method of using leverage to produce electricity from a partially rotating, two-sided lever.

FIG. 10A is a flow chart diagram of a method steps for using leverage to produce electricity from a vertical generator apparatus.

Figure 10B:
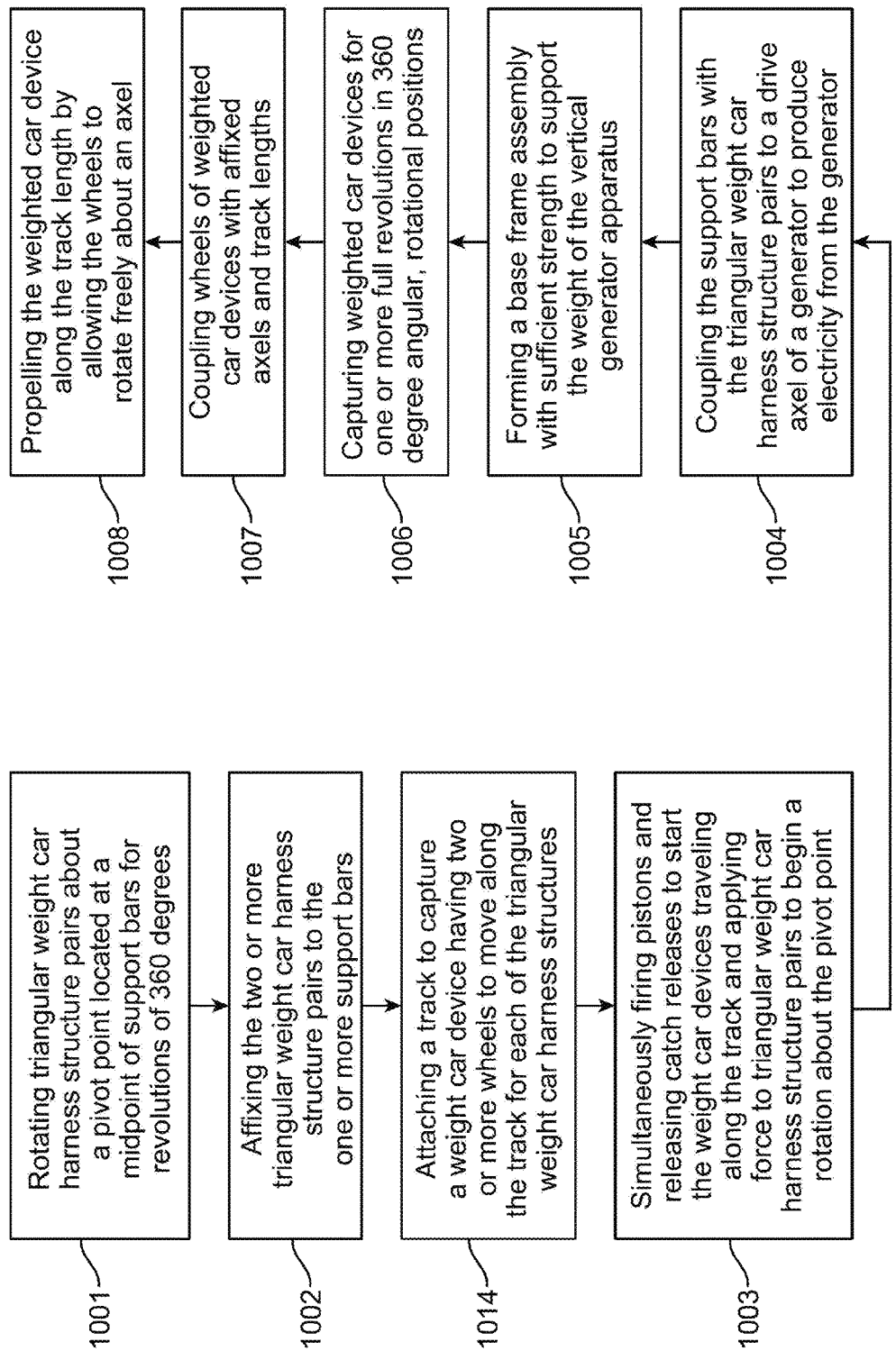

FIG. 10B is a flow chart diagram of a method steps for using leverage to produce electricity from a vertical generator apparatus.

Figure 10C:
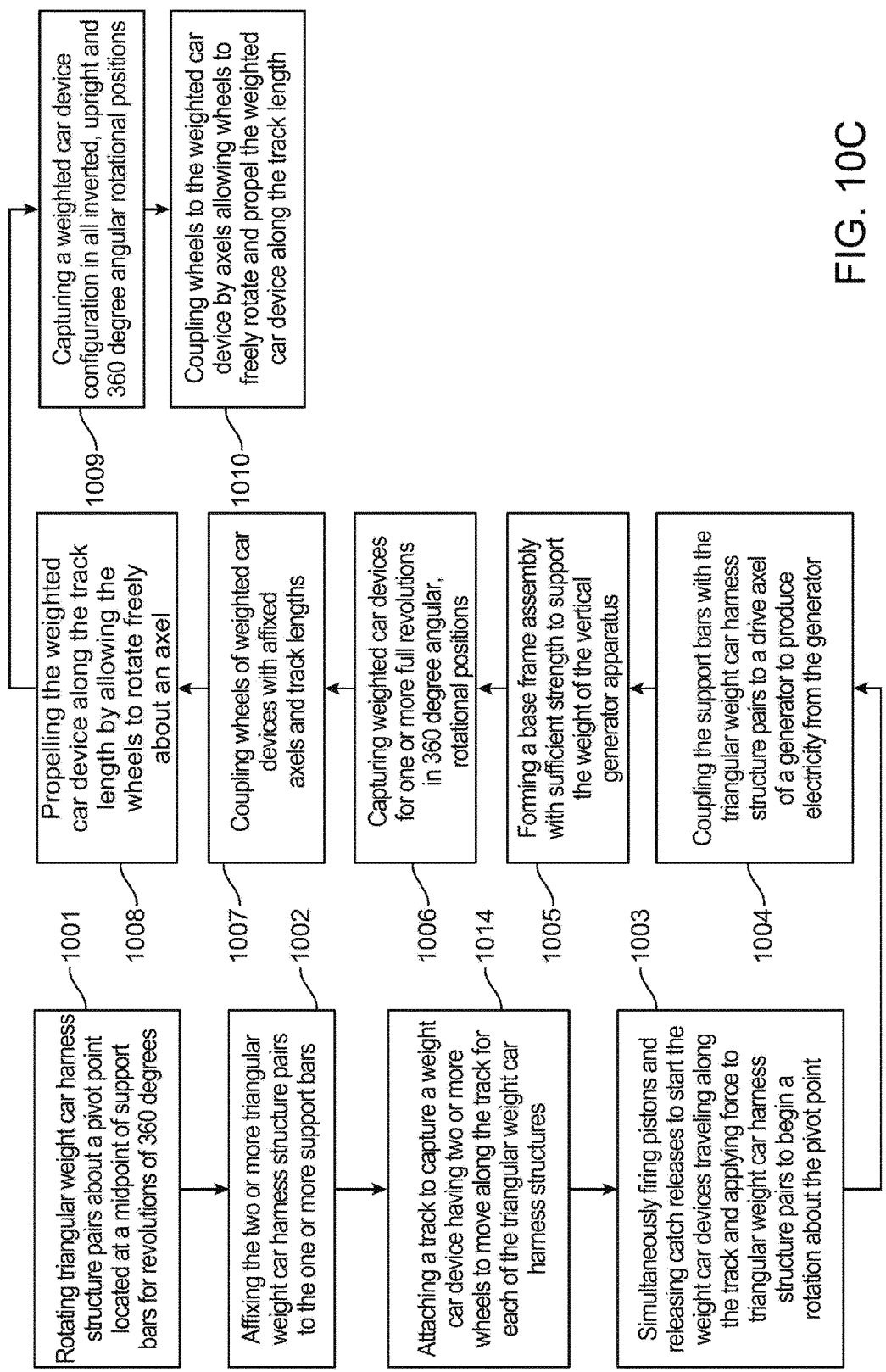

FIG. 10C is a flow chart diagram of a method steps for using leverage to produce electricity from a vertical generator apparatus.

Figure 10D:
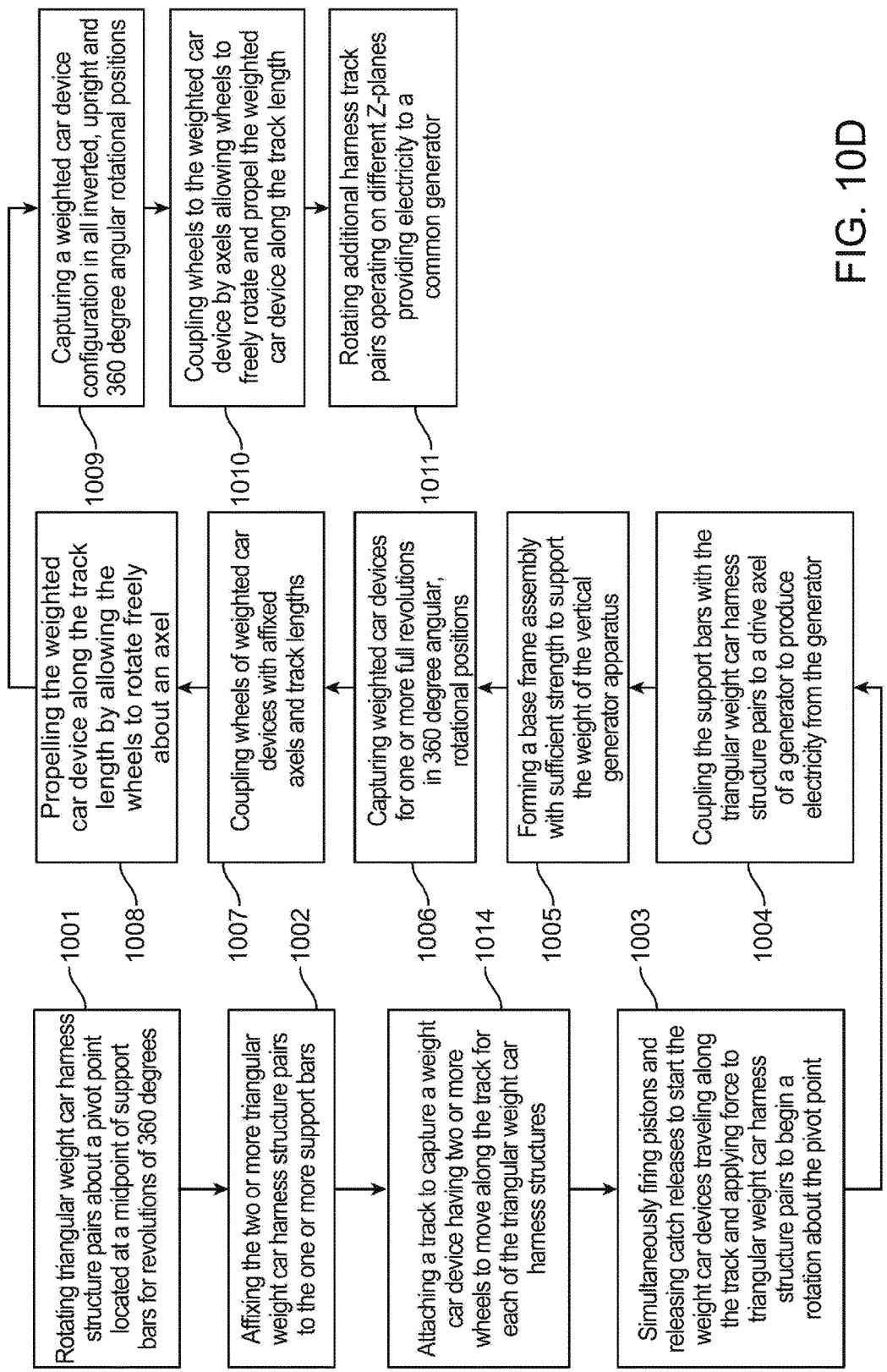

FIG. 10D is a flow chart diagram of a method steps for using leverage to produce electricity from a vertical generator apparatus.

Figure 10E:
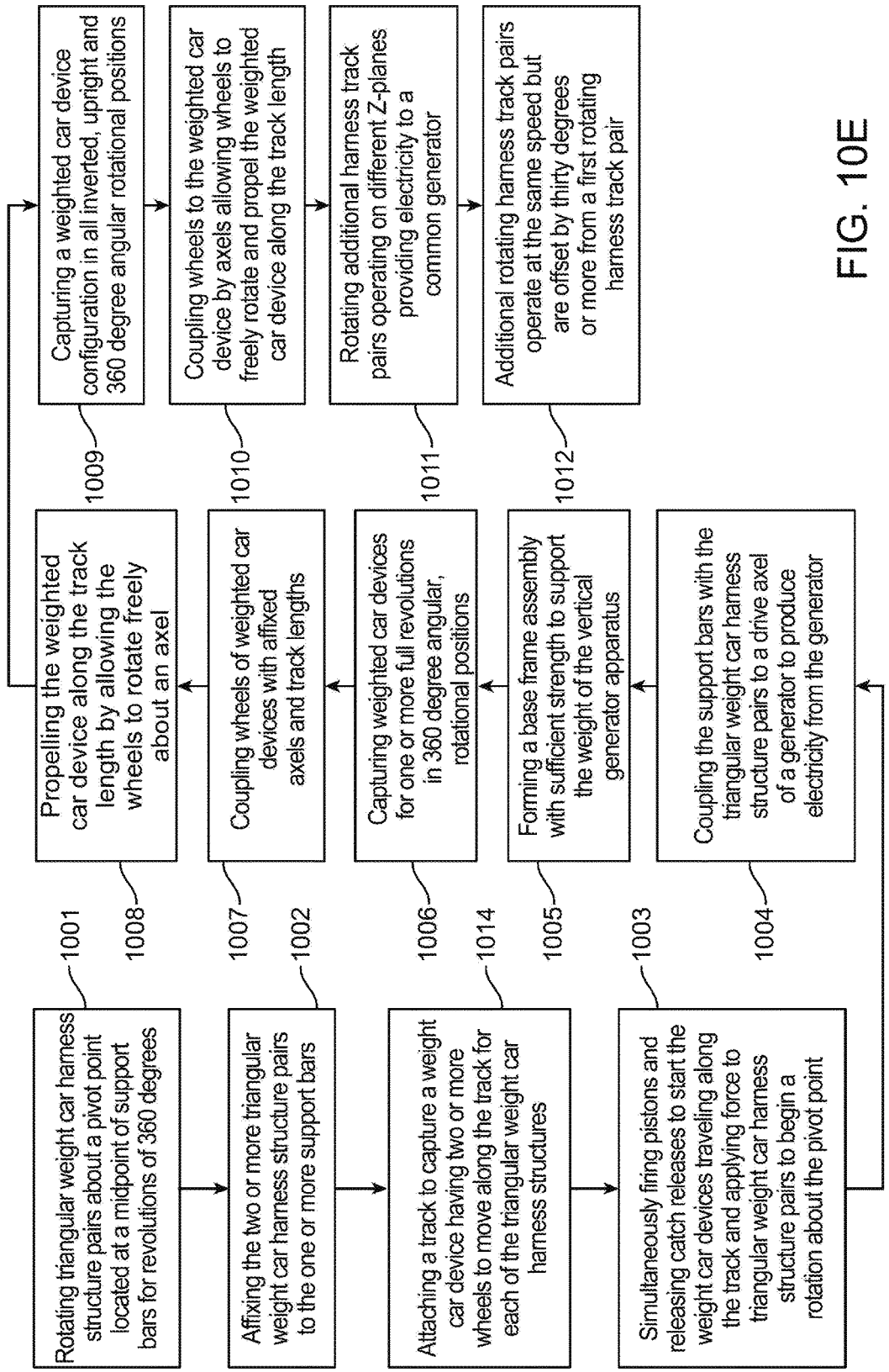

FIG. 10E is a flow chart diagram of a method steps for using leverage to produce electricity from a vertical generator apparatus.

Figure 11:
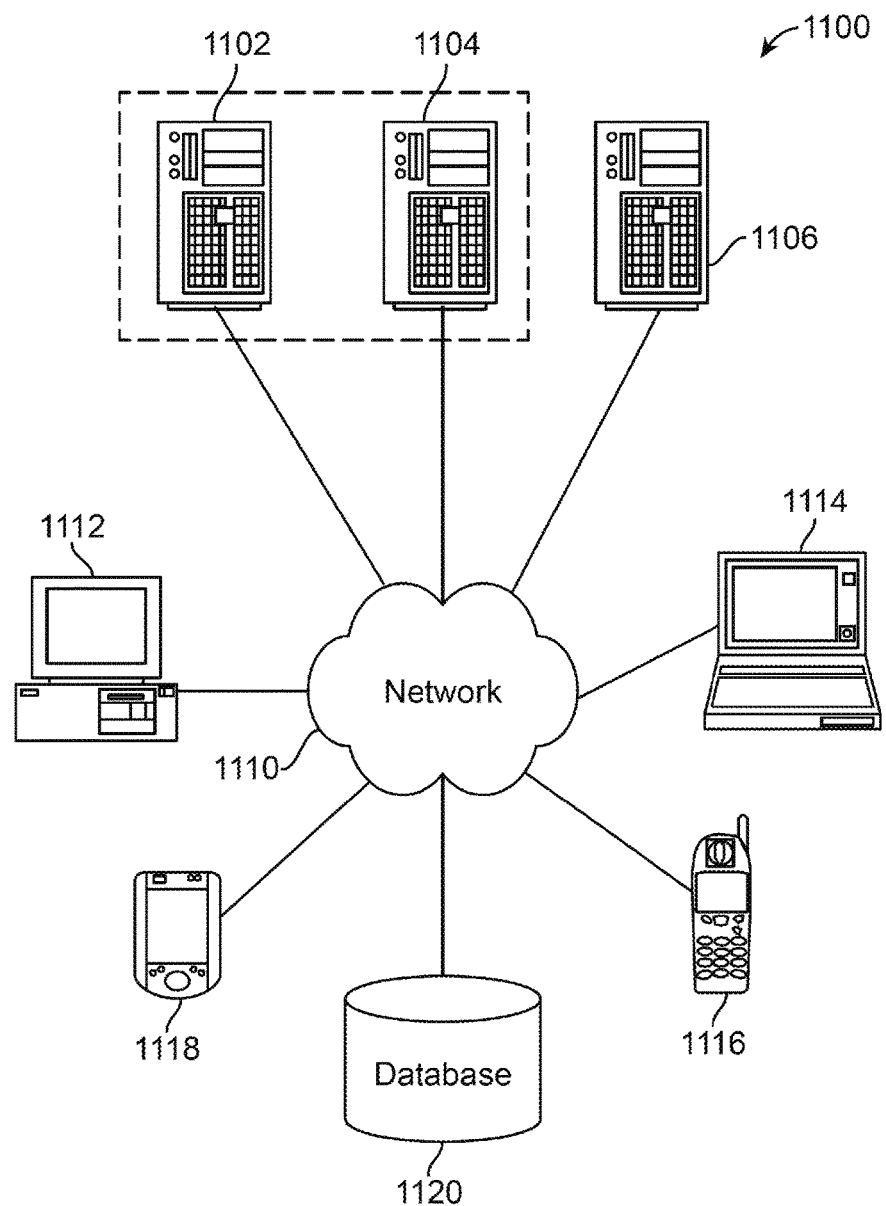

FIG. 11 is an illustration depicting an exemplary operating environment including one or more user computers, computing devices, or processing devices, which can be used to operate a client, such as a dedicated application, web browser is shown.

Figure 12:
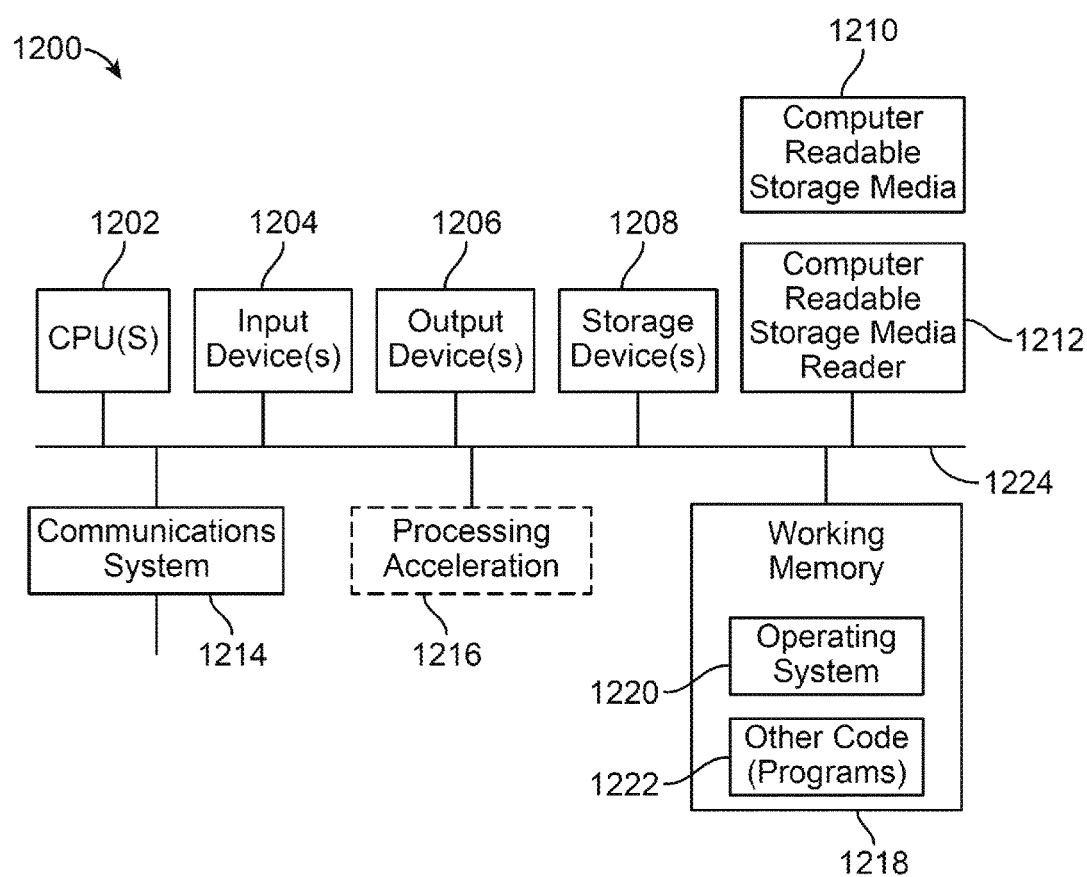

FIG. 12 is another illustration depicting an exemplary operating environment including a computer system with various elements as shown.

Figure 13:
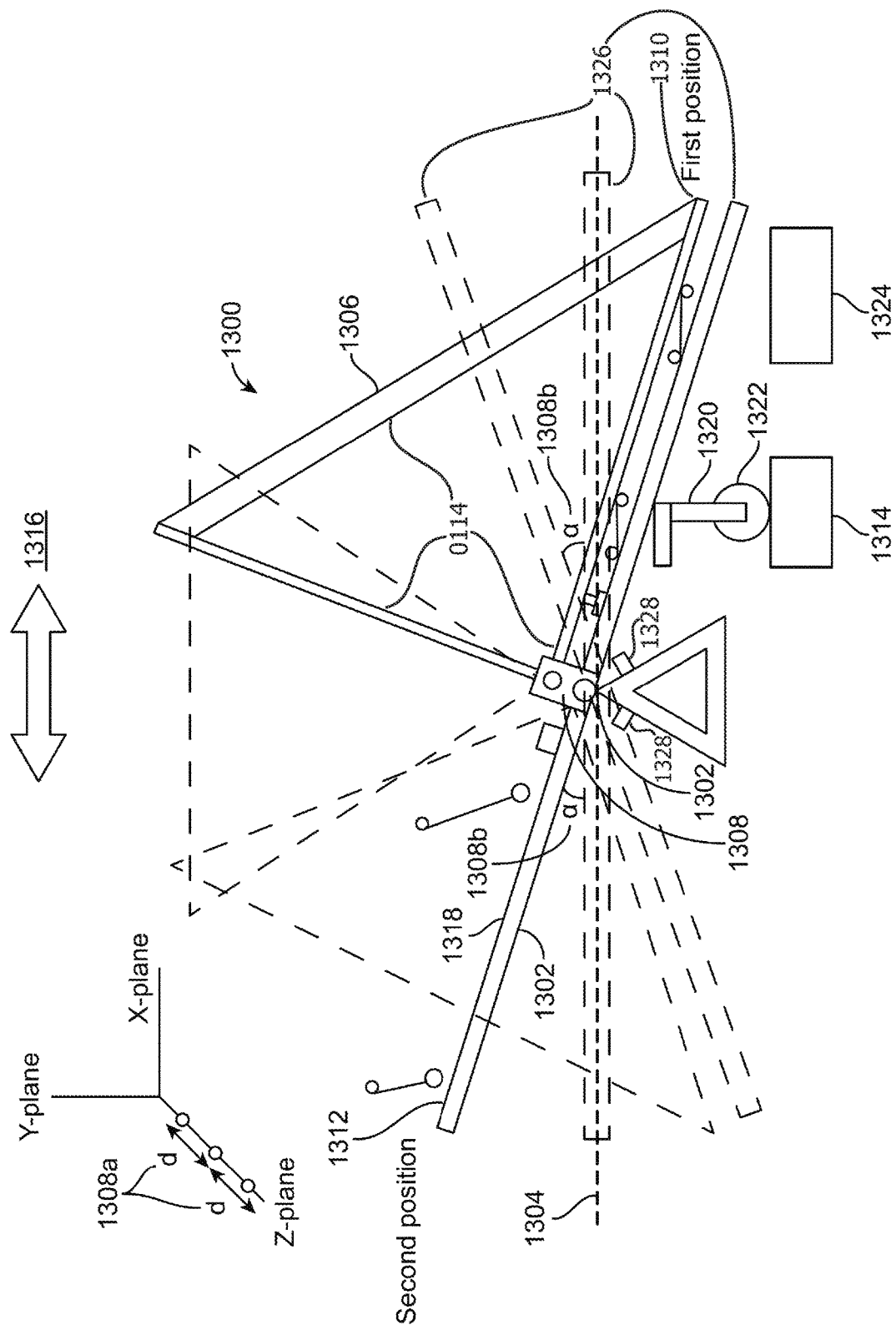

FIG. 13 is a leverage generator apparatus configuration depicting one or more devices operating on more than one Z-plane.

Figure 14:
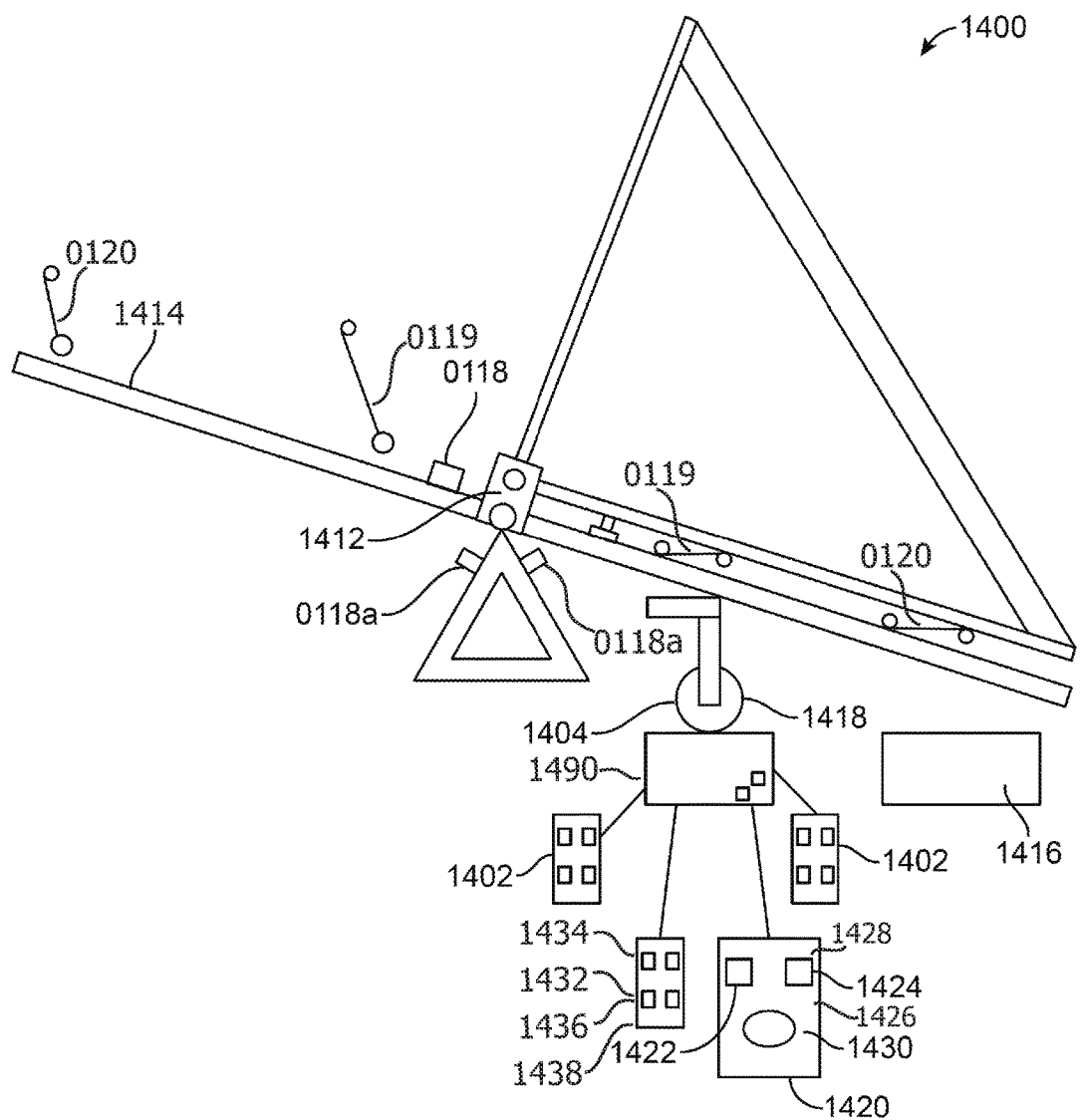

FIG. 14 is a leverage generator apparatus configuration with one or more high energy linear actuators.

Figure 15A:
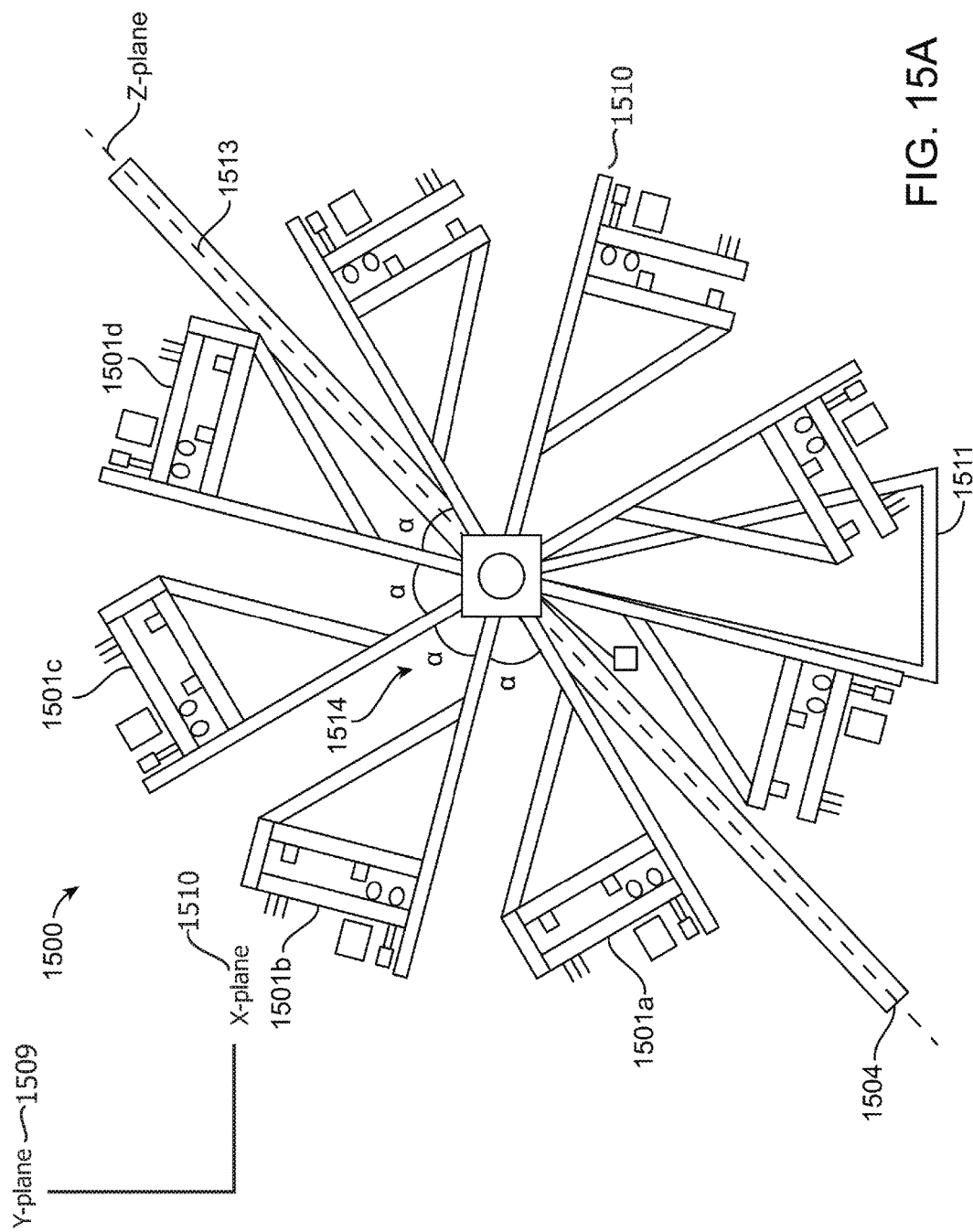

FIG. 15A is a vertical leverage generator apparatus configuration with four or more rotating track harness pairs each travelling at the same, constant velocity and each separated by an equal angle α.

Figure 15B:
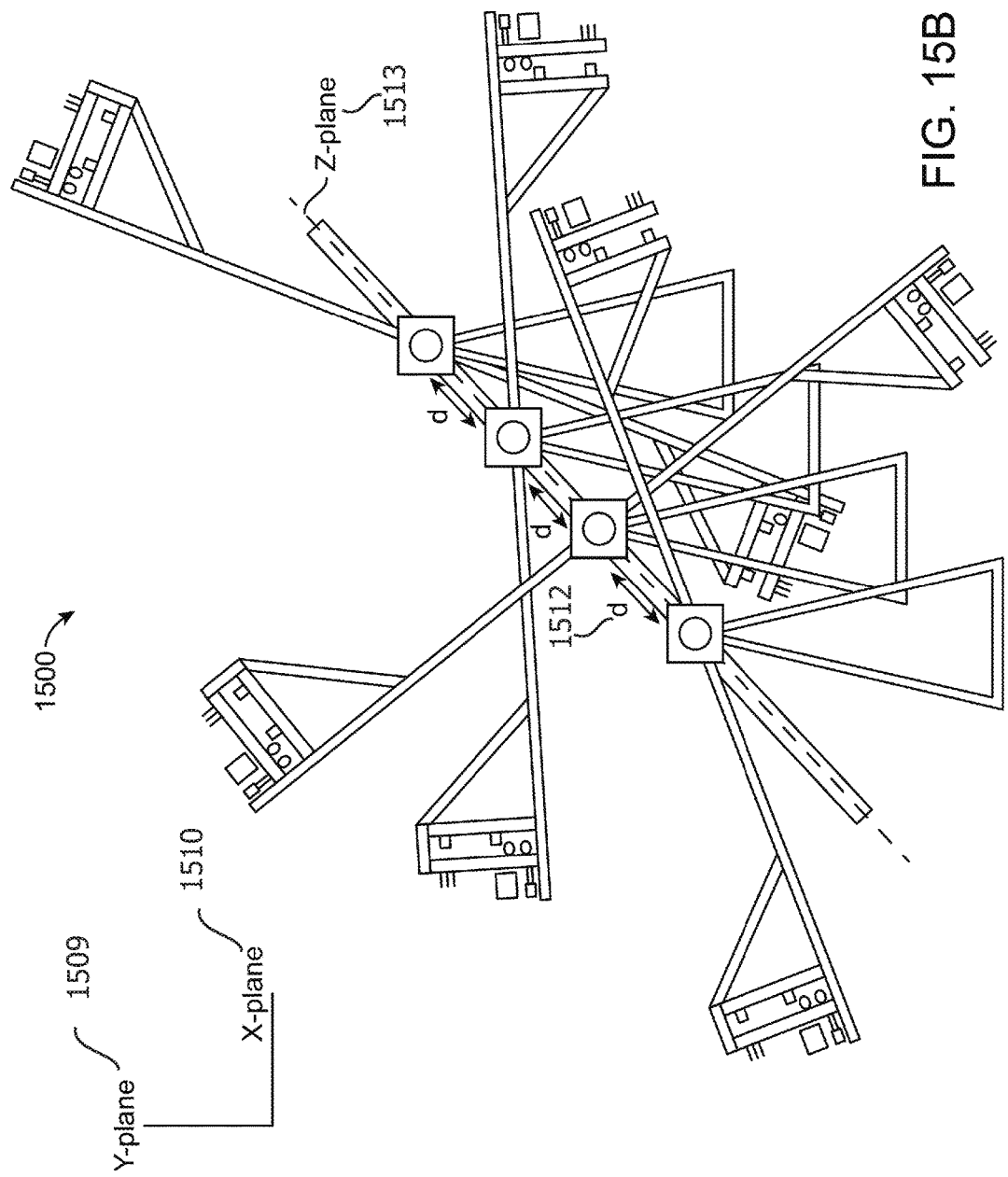

FIG. 15B is a vertical leverage generator apparatus configuration with two or more rotating track harness pairs operating on one or more Z-planes separated by a distance d on the Z-plane, each travelling at the same, constant velocity and each separated by an equal angle α.

DETAILED DESCRIPTION OF THE INVENTION

The present invention is directed to leverage generator systems, methods, and apparatus.

In some embodiments the disclosure herein can be further illustrated as a systems, methods, and apparatus that integrate the necessary hardware and system components into various leverage generator configurations. The energy generation and management apparatus include cabinets that contain essentially all necessary renewable energy generation and distributed electrical components including turbines, generators, charge controllers, inverters, relay circuitry, circuit breakers, energy storage modules (e.g., batteries), automatic transfer switches and balance of system circuitry for operating distributed energy sources (e.g., leverage generator devices).

From a communications and information management perspective, the systems, methods and apparatus integrate the software, hardware and system components of a leverage generator renewable energy management system, a local gateway controller, an edge gateway controller, and an energy cloud controller, to implement methods of leverage generated energy storage, management, and renewable energy leverage generation relevant to the user site location in conjunction with a user partitioned leverage generated energy pool and other domain specific virtual energy pools.

The present invention is described below with reference to block diagrams of systems, methods, apparatuses and computer program products according to embodiments of the invention. It will be understood that each block of the block diagrams and combinations of blocks in the block diagrams, respectively, can be implemented by means of analog or digital hardware and computer instructions or various physical and hardware, power electronics, control, and electrical apparatus components. One or more of the various components may include microprocessor embedded software, ASIC, mobile devices, or other means of implementing computer instructions to the components or machines. These computer instructions may be loaded onto a general purpose computer, special purpose computer, ASIC, or other programmable data processing apparatus to produce a machine, such that the instructions, which execute on the computer or other programmable data processing apparatus create means for implementing the functions/acts specified in the block or blocks.

The computer program instruction can be provided to a processor of a general purpose computer, special purpose computer, ASIC, or other programmable data processing apparatus, such that the instruction, which execute via the process of the computer or other programmable data processing apparatus, implements the function/acts specified in the block diagrams or operational block or blocks.

In some alternate implementations, the functions or acts noted in the blocks can occur out of the order noted in the operational illustration. For example, two blocks shown in succession can in fact be executed substantially concurrently or the blocks can sometimes be executed in the reverse order, depending upon the functionality or acts involved.

Reference will now be made in detail to illustrative embodiments of the present invention, examples of which are/may be shown in the accompanying drawings. These inventions may be embodied in different forms and should not be construed as limitations to the embodiments set forth herein; rather, these embodiments are provided so that the disclosure will satisfy applicable legal requirements, be thorough and complete, and will fully convey the scope of the invention to those skilled in the art.

In one embodiment as shown in FIG. 1, a leverage generator apparatus 0100 to produce electricity from a partially rotating, two-sided lever 0102, comprises a triangular support structure 0103 for supporting the partially rotating, two-sided lever 0102 comprising a first end 0105 and a second end 0106 wherein said partially rotating, two-sided lever 0102 pivots about a fulcrum point 0107 and travels radially at an angle not to exceed forty-five degrees and pivots about a point substantially equidistant from the first end 0105 and the second end 0106; one or more rotating lever ball bearings 0108 adjacent to the triangular support structure 0103, the triangular support structure 0103 coupled to the partially rotating, two-sided lever 0102 at the fulcrum point 0107 and one or more rotating lever ball bearings 0108; one or more support brackets 0109 that form a substantially perpendicular angle between a first end 0110 and a second end 0111 of the one or more support brackets 0109 that are coupled to a swivel ball bearing fulcrum assembly 0112 having one or more swivel ball bearings 0113 wherein the ball bearing fulcrum assembly 0112 is coupled to the one or more rotating lever ball bearings 0108, one or more support brackets 0109 further coupled to a weight 0104 to form a weight swivel assembly 0114 operating on the rotating lever 0102 wherein the weight travels rotationally from a first position on the first end of the partially rotating, two-sided lever 0115 to a second position on the second end of the partially rotating, two-sided lever 0102 to apply a first force on the second end of the partially rotating, two-sided lever 0102 in response to firing one or more pistons 0118 coupled to the first end 0105 of the partially rotating, two-sided lever 0102 and further coupled to the support structure 0103 and activating one or more primary springs 0119 and one or more secondary springs 0120 to operate the partially rotating, two-sided lever 0102 to transfer energy and move a crankshaft 0121 and turn a generator 0122; and wherein the weight 0104 mounted on the partially rotating, two-sided lever 0102 freely travels rotationally over a center such that the first end 0110 of one of the support brackets 0109 of the weight swivel assembly 0114 rotates substantially ninety degrees contemporaneously with the second end 0106 of the lever and the weight swivel assembly 0114 pivots about a point substantially equidistant from the first end 0105 and the second end 0106 of the partially rotating, two-sided lever 0102; and wherein the weight 0104 of the weight swivel assembly 0114 which is mounted on the partially rotating, two-sided lever 0102, having travelled from the first position 0105 on the first end of the lever 0115 to the second position 0106 on the first end 0116, upon a reversal of the weight 0104 mounted on the partially rotating, two-sided lever 0102 travelling rotationally from the second position 0106 on the second end of the lever 0102 to the first position 0105 on the first end of the lever 0102 to apply a second force in response to a second firing of one or more pistons 0118 and activating one or more primary springs 0119 and one or more secondary springs 0120, and then repeats this cycle in response to a repeated cycle of pistons 0118 and springs 0119, 0120 applied to the weight swivel assembly 0114 wherein the activating of the alternating sets of one or more primary and one or more secondary springs 0119, 0129 partially produce an over center action on the weight swivel assembly 0114; one or more primary over center springs 0119 having a primary spring constant which provides a primary spring force that, when coupled with gravity, offsets a majority of the weight in the vertical direction; one or more secondary over center springs 0120 having a secondary spring constant which provides a secondary spring force, that when coupled with gravity, offsets a portion of an additional load that is created once the partially rotating, two-sided lever 0102 is depressed at the initiation of a first cycle; the one or more pistons 0118 affixed perpendicularly to the partially rotating two sided lever, wherein the one or more pistons 0118 affixed perpendicularly to the partially rotating two-sided lever are fired once a downward cycle is completed, one or more piston switches 0118a perpendicularly affixed to the top of the triangular support structure 0103 wherein the one or more piston switches 0118a fire one or more pistons 0118 and propels the weight swivel assembly 0114 over center to the other side of the partially rotating two-sided lever 0102 once the see-saw lever is fully depressed and the one or more pistons 0118 are fired in response to a fuel source 0124; the fuel source 0124, selected from the group including natural gas, propane, gasoline, linear actuators, and pneumatic drives powered by solenoids, when activated by one or more of the piston switches 0118a provides fuel sufficient to fire the one or more pistons 0118 and exert a large force and propel the weight swivel assembly 0114 over center to the other side of the partially rotating two-sided lever 0102 when the partially rotating, two-sided lever is fully depressed; the base of the one or more partially rotating two-sided lever is attached to a first end of a vertical crankshaft 0121 and a second end of a vertical force rod 0125a affixed to the crankshaft 0121, and a side of a horizontal force rod 0125b affixed to the crankshaft 0121, wherein the vertical force rod 0125a and the horizontal force rod 0125b pivot about a point and wherein the crankshaft 0121 is linked to the generator 0122; one or more primary springs 0119, one or more secondary springs 0120, and one or more pistons 0118 are placed on the partially rotating, two-sided lever 0102 along the length of the rotating lever said first ends 0105 and said second ends 0106; and the weight swivel assembly 0114 including the weight 0104, swivel ball bearings fulcrum assembly 0113, and one or more pistons 0118 wherein at least one of the one or more pistons is attached perpendicularly to the support bracket 0109 of the base of the swivel weight assembly 0114 and fires in response to a signal from at least one of the one or more piston switches 118a to activate one or more primary 0119 and one or more secondary springs 0120 via one or more cycle forces.

In certain aspects, a renewable energy leverage generator apparatus 0100 to produce electricity from a partially rotating, two-sided lever 0102 of comprises fuel source 0124 selected from the group including natural gas, propane, gasoline, linear actuators, and pneumatic drives powered by solenoids, when activated by one or more of the piston switches 0118a provides fuel sufficient to fire the one or more pistons 0118 to apply a high energy force to the weight swivel assembly 0114 is an electric linear actuator.

In another aspect, a renewable energy leverage generator apparatus 0100 to produce electricity from a partially rotating, two-sided lever 0102 comprises a fuel source 0124 selected from the group including natural gas, propane, gasoline, linear actuators, and pneumatic drives powered by solenoids, when activated by one or more of the piston switches 0118a to apply a high energy force to weight swivel assembly 0118 is an electric fuel source sending a signal to a linear actuator having an integrated linear motion system with a roller screw mechanism for converting electric motor power into linear motion.

In another aspect, a renewable energy leverage generator apparatus 0100 to produce electricity from a partially rotating, two-sided lever 0102 comprises a high capacity electric linear actuator configured in a closed-loop servo system 0131 to provide positioning feedback 0136 from one or more linear position feedback sensors 0132.

In yet another aspect, a renewable energy leverage generator apparatus 0100 to produce electricity from a partially rotating, two-sided lever 0102 comprising a high capacity electric linear actuator includes a force sensing option 0140 having a load cell 0141 for measuring force in both tension and compression directions 0142 required to propel weight swivel assembly over center to the opposite side of the partially rotating two-sided lever 0102 when the see-saw lever is fully depressed.

In yet another aspect, a renewable energy leverage generator 0100 apparatus to produce electricity from a partially rotating, two-sided lever 0102 comprising a high capacity electric linear actuator includes a force sensing option 0140 having a load cell 0141 for measuring force in both tension and compression directions 0142 required to propel the weight swivel assembly over center to the opposite side of the partially rotating, two-sided lever 0102 when the see-saw lever is fully depressed.

In yet another aspect, a renewable energy leverage generator 0100 apparatus to produce electricity from a partially rotating, two-sided lever 0102 comprising a high capacity electric linear actuator includes a force sensing option 0140 having a load cell 0141 with load sensing for static and dynamic loads 0146 to determine and apply the force via the actuator required to propel the weight swivel assembly over center to the opposite side of the two-sided lever when the see-saw lever is fully depressed.

In yet another aspect, a renewable energy leverage generator apparatus 0100 to produce electricity from a partially rotating, two-sided lever 0102 comprising energy required to activate one or more pistons switches 0118a and one or more pistons 0118, one or more primary springs 0119, one or more secondary springs 0120, and fuel source 0124 is less than the energy output from the leverage generator apparatus 0100.

In yet another aspect, a renewable energy leverage generator apparatus 0100 to produce electricity from a partially rotating, two-sided lever 0102 comprising a ratio of energy output generated to energy input less efficiency losses of the renewable energy leverage generator apparatus 0100 is in a range from about 7:1 to about 22:1 when 3,000 watts are applied to the electric linear actuator to activate the one or more piston switches 0118a and pistons 0118 and one or more primary 0119 and one or more secondary springs 0120, to move a weight of at least 10,000 pounds wherein the partially rotating, two-sided lever 0102 has a distance of at least ten feet from a point substantially equidistant along the partially rotating, two-sided lever 0102 to its end point, wherein the moving weight swivel assembly 0114 produces energy to turn an axel one foot in one second.

In other various aspects, a renewable energy leverage generator apparatus 0100 to produce electricity from a partially rotating, two-sided lever 0102 comprising a two or more partially rotating, two-sided levers 0102 coupled on a common crankshaft 0121 sufficient to turn the crankshaft and maintain a smooth energy input to provide a constant speed of the common crankshaft.

In other various aspects, leverage generator apparatus 0100 to produce electricity from partially rotating, two-sided lever 0102 may include an adjustable ball bearing swivel joint area coupled to one or more triangular over center weight swivel assemblies and slidingly attached to partially rotating, two-sided lever 0102 in a manner that moves freely along the lever in the direction of the lower end of partially rotating, two-sided lever 0102, until it reaches a stop point at a piston switch 118a.

In other various aspects, leverage generator apparatus 0100 to produce electricity from partially rotating, two-sided lever 0102, may further include one or more pistons 0118, primary 0119 and secondary springs 0120 having a time delay equal to the amount of time for the triangular over center weight swivel assembly 0114 to reach a stop point at a piston switch 0118a along the lower end of the partially rotating, two-sided lever 0102, wherein the one or more pistons 0118, primary 0119 and secondary springs 0120 are not released until the swivel joint area reaches the stop point when all devices fire, throwing the triangular structure over center.

In another embodiment, as shown in FIG. 2, the leverage generator apparatus 0200 to produce electricity 0201 from rotating lever may include an adjustable ball bearing swivel joint area 0204 coupled to one or more triangular over center weight swivel assemblies 0214 and slidingly attached to rotating lever 0202 in a manner that moves freely along the lever in the direction of the lower end of partially rotating, two-sided lever 0202, until it reaches a stop point 0206 at a piston 0218 and a piston switch 0218a.

In other aspects as shown in FIG. 3, the leverage generator apparatus 0300 to produce electricity from a rotating lever 0302, may further include one or more pistons 0318, primary 0319 and secondary springs 0320 having a time delay equal to the amount of time for the triangular over center weight swivel assembly 0314 to reach a stop point at a piston switch 0318a along the lower end of the partially rotating, two-sided lever 0302, wherein the one or more pistons 0318 and one or more piston switches 0318a, primary 0319 and secondary springs 0320 are not released until the swivel joint area reaches the stop point when all devices fire, throwing the triangular structure over center 0316.

In another embodiment as shown in FIG. 4, a vertical leverage generator apparatus 400 comprises a first rotating triangular weight car harness structure 401 having an angled lever bar 402 comprising a substantially forty-five degree support bar 403 coupled on a first end 404 to a weight bar 405 and the support bar 403 coupled on a second end 406 to a second support bar 407 that is substantially perpendicular to the weight bar 405; a second rotating triangular weight car harness structure 408 having an angled lever bar 402 comprising a substantially forty-five degree support bar 403 coupled on a first end 404 to a weight bar 405 and the support bar 403 coupled on a second end 406 to a second support bar 407 that is substantially perpendicular to the weight bar 405; the first and second rotating triangular weight car harness structures 401, 408 operating at substantially one hundred eighty degrees to each other to create forces in the opposite direction when the first and second rotating triangular weight car harness structures 401, 408 rotate at the same speed wherein the first and second rotating triangular weight car harness structures 401, 408 are coupled to and rotate about a drive axel contained within a centerpoint junction device 409a, 409b, a timing assembly 410 having one or more points 411a, one or more bearings 411b, and one or more rotors 412, and at least one generator 413 to provide energy to turn the drive axel 409 and propel the first and second rotating triangular weight car harness structures 401, 408 in equal and opposite directions; a track system 415 for transporting one or more travelling weighted devices 416, the track system 415 having a wheel bar 417 substantially in parallel to a weight bar 405, wherein the wheel bar 417 is located radially outward from the drive axel 409 and nearest to one or more wheels 418 of the travelling weighted devices 416 and wherein the track system 415 is coupled to a first and second rotating triangular support assembly 419, 420 interposed at one hundred eighty degrees from each other; the wheel bar 417 of the first and second rotating triangular weight car harness structures 401, 408, wherein each wheel bar 417, 419 includes a first end 421, 441 and a second end 422, 442, wherein each of the wheel bars 417, 419 is connected by catches 423 to the weight bar; one or more springs 424 on each of the wheel bars 417, 419 facing radially outward from the drive axel 409; the one or more travelling weighted devices 416 are placed on each of the wheel bars 417 coupled to one or more wheels 418 that are adjacent to the weight bar 405 and the wheel bar 417, 419; a wheel bar 417, 419 having a first end 421, 441 and a second end 422, 442 that together supports the travelling weight device 416 in an upright position 425 and in an inverted position 426 to provide three hundred sixty degree support for the travelling weight device 416; one or more pistons 427 which fire when a travelling weight device 416 reaches a 90 degrees or 12:00 position 428; a fuel source 429 to fire the one or more pistons 427, the fuel source 429 selected from a group including natural gas 430, linear actuators 431, and pneumatic drives powered by solenoids 432 wherein the fuel source 429 creates energy to fire the one or more pistons 427 and send the travelling weight device 416 in the 12:00 position 428 towards opposite ends of a lever 433, and sends the travelling weight device 416 in the 6:00 position 434 towards a beginning point of a lever 435, 441, creating a displacement of weight or torque, resulting in the drive axel being turned, resulting in the generator being turned; a travelling weight device 416 located in the 3:00 position 436 and corresponding 9:00 position 437, resulting in the weights achieving leverage parity; a travelling weight device 416 located between the 12:00 position and the 3:00 position, resulting in the displacement of the weight; one or more springs 424 attached to both ends of the wheel bar, the springs vertically facing radially outward from the drive axel; a catch 436 which releases when a travelling weight device reaches a 90 degrees or 12:00 position 457; a drive axel which is linked to the at least one generator 413; a stationary triangular support base assembly 439 affixed to the drive axel and generator drive assembly at the top of the stationary triangular support assembly, the assembly having a horizontal support bar base 450 and two sloping vertical support members 451, 452; one or more points and one or more rotors forming a timing assembly affixed adjacent to the drive axel 409; at least two lever assemblies vertically linked to one drive axel 409, the drive axel located at the intersection of the two lever assemblies 440, a bottom assembly 449 connected the same as a top assembly 444; the pistons connected near the end of the vertical support bar 445; and a travelling weight device located at the 12:00 position, 1:30 position, 3:00 position, and 4:30 position, 446 along with corresponding travelling weight devices on an opposite side 447.

In certain aspects as shown in FIG. 5, another embodiment of the vertical leverage generator apparatus 400 as completely described in the previous paragraph, further comprises a configuration 500 that further includes, in addition to items 400-452, a track construction 502 wherein one or more weighted car devices 504 having one or more wheels on the top of the car 506 and one or more wheels on the bottom of the car 508, wherein the one or more wheels 506, 508 are coupled with one or more axles 510 affixed to each one of the weighted car devices 504 and wherein the one or more wheels 506, 508 are coupled to the track construction 502 to allow the one or more weighted car devices 504 to travel along the track 502 and capture the one or more weighted car devices 504 in one or more positions, including, but not limited to, an upright position 512, a fully inverted position 514, and a three hundred sixty degree position, configuration 501.

In other aspects of the embodiment of the vertical leverage generator apparatus 400, as shown in FIG. 6, a vertical leverage generator apparatus configuration 600 may further include, in addition to items 400-452, a weighted car device configuration wherein two or more sets of wheels 604 are configured such that each set of wheels captures a track length 606 having one or more wheels 608 above the track length 606 and one or more wheels 610 below the track length 606, rigidly affixed to the car device to capture the car device in all inverted 612, upright 614 and three hundred sixty degree angular rotational positions 601.

In other various aspects of the embodiment of the vertical leverage generator apparatus 400, as shown in FIG. 7, the vertical leverage generator apparatus configuration 700 may further include, in addition to items 400-447, one or more additional rotating harness track pairs 702a, 702b, etc., operating on different Z-planes 713 along multiple centerpoints (with respect to the rotating members of that respective harness track pair) of a common drive axel 704 (along the z-axis 723) providing electricity 706 to a common generator 708. There is a vertical y plane 709 and a horizontal x plane 710. The one or more additional rotating harness track pairs 702a,b operating on one or more different Z-planes 713 along multiple points of a common drive axel 704 providing electricity 706 to a common generator 708 wherein each of the one or more additional rotating harness track pairs on one or more different Z-planes 713 are offset by a minimum distance "d" 712 along an axis perpendicular to the one or more coplanar Z-planes 713 and wherein the one or more additional rotating harness track pairs 702a,b rotate at an offset angle "α" 714 that is equal for each subsequent additional rotating harness track pairs; and a stationary triangular support base assembly 711 affixed to the drive axel and generator drive assembly at the top of the stationary triangular support assembly, the assembly having a horizontal support bar base and two sloping vertical support members.

In other various aspects of the embodiment of the vertical leverage generator apparatus 400, as shown in FIG. 8, a vertical leverage generator apparatus configuration 800 may further include, in addition to items #400-447, one or more additional rotating harness track pairs 802 that operate at substantially the same speed but are offset by an angle "α" 811. In at least one embodiment of the configuration 800, the angle α is thirty degrees or more from a first rotating harness track pair 801. There is a vertical y plane 809 and a horizontal x plane 810.

In another embodiment as shown in FIG. 9A, a method of using leverage to produce electricity from a partially rotating, two-sided lever 900, comprises steps for: supporting a partially rotating, two-sided lever with a triangular support structure coupled at a fulcrum point located at the midpoint of the partially rotating, two-sided lever wherein the triangular support structure has a base, a two sides, the sides each having one or more piston switches to engage a portion of the partially rotating, two-sided lever 901; engaging the partially rotating, two-sided lever with a triangular weight swivel assembly that travels rotationally about a fixed swivel ball bearings assembly that is adjacent to the midpoint of the partially rotating, two-sided lever wherein the triangular weight swivel assembly includes a first and second support arms that are perpendicular to each other and joined at a center point of the fixed swivel ball bearings assembly and wherein the first and second support arms are joined on the outer ends by a weighted device forming a right triangle between the first and second support arms 902; rotating the triangular weight swivel assembly from a first beginning position on the partially rotating, two-sided lever to a second ending position on the partially rotating, two-sided lever to complete one-half of an over-center cycle of the partially rotating, two-sided lever, wherein the first beginning position is vertically below said fulcrum and midpoint of the partially rotating, two-sided lever and wherein the second ending position is vertically below said fulcrum and midpoint of the partially rotating, two-sided lever 903; activating a first piston switch upon lowering the partially rotating, two-sided lever to the first beginning position vertically below said fulcrum and midpoint of the partially rotating, two-sided lever to overcome the triangular weight swivel assembly until it travels over-center to a second position vertically below said fulcrum and midpoint of the partially rotating, two-sided lever to complete the first-half of the over-center cycle of the partially rotating, two-sided lever and activate a second piston switch to reverse the over-center action of the triangular weight swivel assembly and return the triangular weight swivel assembly to the first beginning position vertically below the fulcrum and midpoint of the partially rotating, two-sided lever thereby completing a second-half of the over-center cycle to complete a full cycle of travel for the triangular weight swivel assembly and thereby reactivating the first piston switch to begin a complete second cycle of the triangular weight swivel assembly 904; applying a force from the completed full cycle of travel of the triangular weight swivel assembly when the partially rotating, two-sided lever reaches the original first beginning position for a subsequent time to engage the force with a crankshaft which turns a generator and wherein the partially rotating, two-sided lever which has reached the original first beginning positions commences a second cycle and reactivates the piston switch for a subsequent cycle to commence 905; engaging the rotating triangular weight swivel assembly with one or more secondary springs attached to an outer portion of the rotating lever, one or more primary springs attached to an inner portion of the rotating lever, and one or more piston switches near the midpoint of the partially rotating, two-sided lever, wherein the one or more secondary springs, one or more primary springs, and one or more piston switches engage an end of the partially rotating, two-sided lever to propel it over-center with a force in excess of the rotating triangular weight swivel assembly sufficient to send the rotating triangular weight swivel assembly to a second ending position vertically below the fulcrum and midpoint of the partially rotating, two-sided lever, wherein the rotating triangular weight swivel assembly in conjunction with gravity, produces a force on a crankshaft sufficient to turn a generator and produce electricity 906; joining the rotating triangular weight swivel assembly to a swivel ball bearing fulcrum assembly having one or more swivel ball bearings enclosed in a common area wherein the swivel ball bearing fulcrum assembly is adjacent to one or more rotating lever ball bearings at a midpoint fulcrum of the partially rotating, two-sided lever 907; releasing one or more secondary springs and one or more primary springs wherein each secondary spring and each primary spring has a spring constant sufficient to produce a moment arm torque substantially greater than the moment arm torque of the triangular weight swivel assembly 908; firing one or more piston switches coupled to a lower portion of the partially rotating, two-sided lever and firing one or more piston switches coupled to the support structure on the lower portion of the partially rotating, two-sided lever nearest the fulcrum midpoint 909; and increasing weight to the rotating triangular weight swivel assembly and increasing length to the partially rotating, two-sided lever to correspondingly increase the force transferred to the crankshaft and generator 910.

In other aspects, the method of FIG. 9A, as shown in FIG. 9B may further include steps for slidingly attaching an adjustable ball bearing swivel joint area coupled to one or more triangular over center weight swivel assemblies such that the adjustable ball bearing swivel joint area moves freely along the rotating lever in the direction of the lower end of the rotating lever, until it reaches a stop point at a piston switch 911.

In other various aspects, the method of FIG. 9A, as shown in FIG. 9C may further include steps for delaying the operation of one or more pistons, primary and secondary springs affixed to the rotating lever for a time period equal to the time required for the slidingly attached adjustable ball bearing swivel assembly to travel down the lower end of the rotating lever to the stop point at a piston switch 912; and engaging the slidingly attached adjustable ball bearing swivel joint area with the one or more pistons, primary and secondary springs to activate and fire the one or more pistons, primary and secondary springs with sufficient force to throw the triangular structure over center 913.

In another embodiment as shown in FIG. 10A, a method of using leverage to produce electricity from a vertical generator apparatus 1000, comprises steps for rotating two or more triangular weight car harness structure pairs about a pivot point located at a midpoint of one or more support bars for one or more complete revolutions of three hundred sixty (360) degrees 1001; affixing the two or more triangular weight car harness structure pairs to the one or more support bars by forming a perpendicular intersection between each of the one or more weight bars and each of the one or more support bars mechanically coupled at a first end closest to each of the one or more support bars and by forming a substantially forty-five (45) degree angle with each of the one or more weight bars and each of the one or more support bars to form each of the triangular weight car harness structure frames 1002; attaching a track to capture a weight car device having two or more wheels to move along the track for each of the triangular weight car harness structures, wherein the two or more wheels moving along the track are enclosed between two parallel tracks adjacent to the two or more wheels at all times during the triangular weight car harness structure during one or more revolutions 1014; simultaneously firing one or more pistons and releasing one or more catch releases adjacent to each of the one or more weight car devices to start the one or more weight car devices traveling along the track and applying force to each of the one or more triangular weight car harness structure pairs to begin a rotation about the pivot point located at the midpoint of the one or more support bars 1003; coupling the one or more support bars with the two or more triangular weight car harness structure pairs to a drive axel of a generator, a timing assembly having one or more points and one or more rotors, to produce electricity from the generator proportional to the speed of the drive axel, weight of the two or more triangular weight car harness structure pairs, force generated from the one or more firing pistons adjacent to each of the weight car devices, and the spring constant on each of the triangular weight car harness structure pair track assembly 1004; and forming a base frame assembly having a triangular shape with sufficient strength to support the weight of the vertical generator apparatus and vertical leverage generator assembly having two or more triangular weight car harness structure pairs on opposite, one hundred-eighty (180) degrees of each of the one or more support bars 1005.

In certain aspects, the method of FIG. 10A, as shown in FIG. 10B may further include steps for capturing one or more weighted car devices for one or more full revolutions in three hundred sixty degree angular, rotational positions 1006; coupling one or more wheels of one or more weighted car devices on the top of the one or more weighted car devices and one or more wheels on the bottom of the one or more weighted car devices with one or more affixed axels and one or more track lengths, such that the one or more wheels on the bottom and the one or more wheels on the top are located between the wheels and the track length 1007; and propelling the weighted car device along the track length by allowing the one or more top wheels and the one or more bottom wheels to rotate freely about an axel affixed to the weighted car device 1008.

In other aspects, the method of FIG. 10A, as shown in FIG. 10C may further include steps for capturing a weighted car device configuration in all inverted, upright and three hundred sixty degree angular rotational positions, wherein two or more sets of wheels envelope a track length having one or more wheels above the track length and one or more wheels below the track length 1009; and coupling the two or more sets of wheels to the weighted car device by one or more axels allowing the two or more sets of wheels to freely rotate and propel the weighted car device along the track length 1010.

In other various aspects, the method of FIG. 10A, as shown in FIG. 10D may further include steps for rotating one or more additional harness track pairs operating on different Z-planes along multiple points of a common drive axel providing electricity to a common generator 1011.

In other various aspects, the method of FIG. 10A, as shown in FIG. 10E may further include steps for the one or more additional rotating harness track pairs operate at substantially the same speed but are offset by thirty degrees or more from a first rotating harness track pair 1012.

In other various aspects of the embodiment of the vertical leverage generator apparatus 400, as shown in FIG. 15A and FIG. 15B, the vertical leverage generator apparatus configuration 1500 may further include, in addition to items 400-

447, one or more rotating harness track pairs 1501a, 1501b, 1501c and 1501d, operating on different Z planes 1513 along multiple centerpoints (with respect to the rotating members of that respective harness track pair) of a common drive axel (along the z-axis 723) 1504 providing electricity 1506 to a common generator 1508. There is a vertical y plane 1509 and a horizontal x plane 1510. As shown in FIG. 15A, the one or more additional rotating harness track pairs 1501a, 1501b, 1501c and 1501d, operating on one or more different Z-planes 1513 along multiple points of a common drive axel 1504 providing electricity 1506 to a common generator 1508 wherein each of the one or more additional rotating harness track pairs 1501a, 1501b, 1501c and 1501d rotate at an offset angle "α" 1514 that is equal for each subsequent additional rotating harness track pairs. As shown in FIG. 15B, the one or more additional rotating harness track pairs 1501 operating on one or more different Z-planes 1513 along multiple points of a common drive axel 1504 providing electricity 1506 to a common generator 1508 wherein each of the one or more additional rotating harness track pairs 1501a, 1501b, 1501c and 1501d on one or more different Z-planes 1513 are offset by a minimum distance "d" 1512 along an axis perpendicular to the one or more coplanar Z-planes 1513; and a stationary triangular support base assembly 711 affixed to the drive axel and generator drive assembly at the top of the stationary triangular support assembly, the assembly having a horizontal support bar base and two sloping vertical support members. While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.
Exemplary Operating Environments, Components, and Technology FIG. 11 is a block diagram illustrating components of an exemplary operating environment in which embodiments of the present invention may be implemented. The system 1100 can include one or more user computers, computing devices, or processing devices 1112, 1114, 1116, 1118, which can be used to operate a client, such as a dedicated application, web browser, etc. The user computers 1112, 1114, 1116, 1118 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1112, 1114, 1116, 1118 may also have any of a variety of applications, including one or more development systems, database client and/or server applications, and Web browser applications. Alternatively, the user computers 1112, 1114, 1116, 1118 may be any other electronic device, such as a thin-client computer, Internet-enabled gaming system, and/or personal messaging device, capable of communicating via a network (e.g., the network 1110 described below) and/or displaying and navigating Web pages or other types of electronic documents. Although the exemplary system 1100 is shown with four user computers, any number of user computers may be supported.

In most embodiments, the system 1100 includes some type of network 1110. The network can be any type of network familiar to those skilled in the art that can support data communications using any of a variety of commercially-available protocols, including without limitation TCP/IP, SNA, IPX, AppleTalk, and the like. Merely by way of example, the network 1110 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, und/or any other wireless protocol); and/or any combination of these and/or other networks.

The system may also include one or more server computers 1102, 1104, 1106 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1106) may be dedicated to running applications, such as a business application, a Web server, application server, etc. Such servers may be used to process requests from user computers 1112, 1114, 1116, 1118. The applications can also include any number of applications for controlling access to resources of the servers 1102, 1104, 1106.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1112, 1114, 1116, 1118. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1112, 1114, 1116, 1118.

The system 1100 may also include one or more databases 1120. The database(s) 1120 may reside in a variety of locations. By way of example, a database 1120 may reside on a storage medium local to (and/or resident in) one or more of the computers 1102, 1104, 1106, 1112, 1114, 1116, 1118. Alternatively, it may be remote from any or all of the computers 1102, 1104, 1106, 1112, 1114, 1116, 1118, and/or in communication (e.g., via the network 1110) with one or more of these. In a particular set of embodiments, the database 1120 may reside in a storage-area network ("SAN") familiar to those skilled in the art. Similarly, any necessary files for performing the functions attributed to the computers 1102, 1104, 1106, 1112, 1114, 1116, 1118 may be stored locally on the respective computer and/or remotely, as appropriate. In one set of embodiments, the database 1120 may be a relational database, such as Oracle 10g, that is adapted to store, update, and retrieve data in response to SQL-formatted commands.

FIG. 12 illustrates an exemplary computer system 1200, in which embodiments of the present invention may be implemented. The system 1200 may be used to implement any of the computer systems described above. The computer system 1200 is shown comprising hardware elements that may be electrically coupled via a bus 1224. The hardware elements may include one or more central processing units (CPUs) 1202, one or more input devices 1204 (e.g., a mouse, a keyboard, etc.), and one or more output devices 1206 (e.g., a display device, a printer, etc.). The computer system 1200 may also include one or more storage devices 1208. By way of example, the storage device(s) 1208 can include devices such as disk drives, optical storage devices, solid-state storage device such as a random access memory ("RAM") and/or a read-only memory ("ROM"), which can be programmable, flash-updateable and/or the like.

The computer system 1200 may additionally include a computer-readable storage media reader 1212, a communications system 1214 (e.g., a modem, a network card (wireless or wired), an infra-red communication device, etc.), and working memory 1218, which may include RAM and ROM devices as described above. In some embodiments, the computer system 1200 may also include a processing acceleration unit 1216, which can include a digital signal processor DSP, a special-purpose processor, and/or the like.

The computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing, storing, transmitting, and retrieving computer-readable information. The communications system 1214 may permit data to be exchanged with the network and/or any other computer described above with respect to the system 1200.

The computer system 1200 may also comprise software elements, shown as being currently located within a working memory 1218, including an operating system 1220 and/or other code 1222, such as an application program (which may be a client application; Web browser, mid-tier application, RDBMS, etc.). It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

FIG. 12 further illustrates an environment where an on-demand distributed database service might be used. As illustrated in FIG. 12 user systems might interact via a network with an on-demand database. Some on-demand databases may store information from one or more records stored into tables of one or more distributed database images to form a database management system (DBMS). Accordingly, on-demand database and system will be used interchangeably herein. A database image may include one or more database objects. A relational database management system (RDMS) or the equivalent may execute storage and retrieval of information against the database object(s). Some on-demand database services may include an application platform that enables creation, managing and executing one or more applications developed by the provider of the on-demand database service, wherein users accesses the on-demand database service via user systems, or third party application developers access the on-demand database service via user systems.

The security of a particular user system might be entirely determined by permissions (permission levels) for the current user. For example, where a user account identification transaction may involve a portable identification alphanumeric data field physically or digitally linked to a personal primary identification device to request services from a provider account and wherein the user is using a particular user system to interact with System, that user system has the permissions allotted to that user account. However, while an administrator is using that user system to interact with System, that user system has the permissions allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different permissions with regard to accessing and modifying application and database information, depending on a user's security or permission level.

A network can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems might communicate with a system using TCP/IP and, at a higher network level, use other common Internet protocols to communicate, such as HTTP, FTP, AFS, WAP, etc. In an example where HTTP is used, a user system might include an HTTP client commonly referred to as a "browser" for sending and receiving HTTP messages to and from an HTTP server at System. Such HTTP server might be implemented as the sole network interface between a system and network, but other techniques might be used as well or instead. In some implementations, the interface between a system and network includes load sharing functionality, such as round-robin HTTP request distributors to balance loads and distribute incoming HTTP requests evenly over a plurality of servers. At least as for the users that are accessing that server, each of the plurality of servers has access to at least one third party entity system data schema; however, other alternative configurations are contemplated.

According to one arrangement, each user system and all of its components are operator configurable using applications, such as a browser, including computer code run using a central processing unit such as an Intel Pentium® processor or the like. Similarly, a computer system (and additional instances of an enterprise database, where more than one is present) and all of their components might be operator configurable using application(s) including computer code run using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein. Computer code for operating and configuring systems to intercommunicate and to process web pages, applications and other data and media content as described herein is preferably downloaded and stored on a hard disk, but the entire program code, or portions thereof, may also be locally stored in any other volatile or non-volatile memory medium or device as is well known, such as a ROM or RAM, or provided on any media capable of storing program code, such as any type of rotating media including floppy disks, optical disks, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, HTML, any other markup language, Java™, JavaScript, ActiveX, any other scripting language such as VB Script, and many other programming languages as are well known. (Java™ is a trademark of Sun Microsystems, Inc.).

FIG. 13 illustrates a partially rotating, two-sided leverage generator apparatus 1300, comprise one or more lever devices 1312 each pivoting about a midpoint fulcrum 1302 at an angle 1308b not to exceed forty-five degree from a horizontal position 1304, one or more weighted devices 1306 freely pivoting about a common cylinder 1308 adjacent at a depth distance "d" along the z-axis 723 from each other 1308a, to the one or more lever devices midpoint fulcrum 1302 such that the one or more weighted devices move from a first position 1310 on the lever device over-center of the lever device to a second position 1312 in response to a first set of pistons, springs and fuel cell energy inputs 1314 and wherein the one or more weighted devices reverse direction in response to a second set of pistons, springs and fuel cell energy inputs to move from the second position on the lever device and return over center at the midpoint of the lever device to the first position to complete a full cycle of travel 1316, thereby transferring two or more forces 1318 proportional to the energy input to a common crankshaft 1320, wherein the two or more forces from each of the one or more weighted devices are sufficient to turn the crankshaft at a constant speed 1322 and turn a generator 1324.

In other aspects of the embodiment as shown in FIG. 13, the partially rotating, two-sided leverage generator apparatus further comprises two or more partially rotating, two-sided levers 1326 applying three thousand (3,000) watts to two or more electric linear actuators 1328 wherein the ratio of energy output generated to energy input less efficiency losses for each electric linear actuator is in a range from about 7:1 to about 22:1 when two or more piston switches 0118a, pistons 0118 and two or more primary 0119, and two or more secondary springs 0120, combine to move a weight of at least 10,000 pounds a distance of at least ten feet from a point equidistant along each of the partially rotating, two-sided levers 1326 to its end point, wherein each of the moving weight swivel assemblies 0114 produces energy sufficient to turn an axel one foot in one second. In other various aspects, the partially rotating, two-sided leverage generator apparatus further comprises four or more sets 1338 of two or more partially rotating, two-sided levers applying at least three thousand (3,000) watts to two or more electric linear actuators 1328 wherein the ratio of energy output generated to energy input less efficiency losses for each electric linear actuator is about a minimum of 22:1 when two or more piston switches 0118a, pistons 0118 and two or more primary 0119, and two or more secondary springs 0120, combine to move a weight of at least 10,000 pounds a distance of at least ten feet from a point equidistant along each of the partially rotating, two-sided levers to its end point, wherein each of the moving weight swivel assemblies produces energy sufficient to turn an axel at a minimum speed of one foot per second.

FIG. 14 illustrates a leverage generator device 1400 comprises one or more high energy linear actuators 1490 operating in response to one or more fuel cell inputs 1402, each activating a set of one or more piston switches 0118a, one or more pistons 0118, and releasing one or more springs 0119, 0120 of a sufficient spring constant to transfer a high energy force to propel one or more weighted devices 1440 over a midpoint 1412 of one or more partially rotating, two-sided levers 1414 to transfer energy to a generator 1416.

In another aspect, a leverage generator device as shown in FIG. 14 comprises one or more high energy linear actuators 1490 operating in response to one or more fuel cells 1418 is an electric linear actuator 1420 having an integrated linear motion system 1422 with a roller screw mechanism 1424 for converting electric motor power 1426 into linear motion 1428 to turn a roller screw device 1430.

In other various aspects, a leverage generator device as shown in FIG. 14 comprises an electric linear actuator 1432 is configured in a closed-loop servo system 1434 to provide positioning feedback 1436 from one or more sensors 1438.

In other various aspects, a leverage generator device 1400 as shown in FIG. 14 comprises a ratio of energy output generated to energy input less efficiency losses of the leverage generator device 1400 of at least 7:1 when 3,000 watts are applied to the electric linear actuator 1420 having a rating of at least 7,000 pounds continuous force, to apply a force on one or more weighted devices of 10,000 pounds wherein the one or more weighted devices travel a distance of at least twenty feet 1464 to a point at about ten feet 1466 from the midpoint of the one or more partially rotating, two-sided levers in less than one second and wherein the one or more weighted devices produces sufficient energy 1468 to turn an axel 1470 one foot in one second 1460.

In other various aspects of the embodiment of the vertical leverage generator apparatus 400, as shown in FIG. 7, the vertical leverage generator apparatus configuration 700 may further include, in addition to items 400-447, four or more additional rotating harness track pairs 702*a,b* operating on different Z-planes 713 along multiple points of a common drive axel 704 providing electricity 706 to a common generator 708. There is a vertical y plane 709 and a horizontal x plane 710. The one or more additional rotating harness track pairs 702*a,b* operating on one or more different Z-planes 713 along multiple points of a common drive axel 704 providing electricity 706 to a common generator 708 wherein each of the one or more additional rotating harness track pairs on one or more different Z-planes 713 are offset by a minimum distance 712 along an axis perpendicular to the one or more coplanar Z-planes 713 and wherein the one or more additional rotating harness track pairs 702*a,b* rotate at an offset angle "α" 714 that is equal for each subsequent additional rotating harness track pairs.

The above illustrations provide many different embodiments for implementing different features of the invention. Specific embodiments of components and processes are described to help clarify the invention. These are, of course, merely embodiments and are not intended to limit the invention from that described in the claims.

What is claimed:

1. A renewable energy leverage generator apparatus to produce electricity from a partially rotating lever, comprising:

a triangular support structure for supporting a partially rotating lever comprising a first end and a second end wherein said partially rotating lever pivots about a fulcrum point and travels radially at an angle not to exceed forty-five degrees and pivots about a point substantially equidistant from the first end and the second end of the partially rotating lever;

one or more rotating lever ball bearings adjacent to the triangular support structure, the triangular support structure coupled to the partially rotating lever at the fulcrum point and the one or more partially rotating lever ball bearings;

one or more support brackets that form a substantially perpendicular angle between a first end and a second end of the one or more support brackets that are coupled to a swivel ball bearing fulcrum assembly having one or more swivel ball bearings wherein the ball bearing fulcrum assembly is coupled to the one or more rotating lever ball bearings, the one or more support brackets further coupled to a weight to form a weight swivel assembly operating on the partially rotating lever wherein the weight travels rotationally from a first position on the first end of the lever to a second position on the second end of the lever to apply a large first force to move a crankshaft and turn a generator; and wherein the weight mounted on the partially rotating lever freely travels rotationally over a center in response to a large force such that the first end of the partially rotating lever rotates substantially ninety degrees contemporaneously with the second end of the partially rotating lever;

the one or more weight swivel assemblies enclosing the weight, the weight swivel assemblies mounted on the partially rotating lever by joining a pair of substantially perpendicular support brackets on a pair of outer ends to the weight and a ball bearing swivel assembly on a pair of inner ends, such that in response to a large first force having travelled from the first position on the first end of the partially rotating lever to the second position on the first end, upon a reversal of the weight mounted on the rotating lever travelling rotationally from the second position on the second end of the partially rotating lever to the first position on the first end of the partially rotating lever to apply a large second force and then repeats this cycle in response to a cycle force applied to the weight swivel assembly from activating one or more springs;

one or more primary over center springs having a primary spring constant which provides a primary spring force that, when coupled with gravity, offsets a majority of the weight in the vertical direction;

one or more secondary over center springs having a secondary spring constant which provides a secondary spring force, that when coupled with gravity, offsets a portion of an additional load that is created once the partially rotating lever is depressed;

one or more pistons affixed perpendicularly to the partially rotating lever, wherein the one or more pistons are fired once a downward cycle is completed, one or more piston switches perpendicularly affixed to a top of the triangular support structure wherein the one or more piston switches fire one or more pistons and propels the weight swivel assembly over center to the other side of the two-sided lever once the partially rotating lever is fully depressed and the one or more pistons are fired in response to a fuel source;

a fuel source that provides fuel sufficient to activate a high energy piston switch to fire the one or more pistons to apply a high energy force to the weight swivel assembly sufficient to send the weight swivel assembly over center to the opposite side of the partially rotating lever when the partially rotating lever is fully depressed;

the base of the partially rotating lever is attached to a first end of a vertical crankshaft and a second end of a vertical force rod affixed to the vertical crankshaft, and a side of a horizontal force rod affixed to the crankshaft, wherein the vertical force rod and the horizontal force rod pivot about a point and wherein the crankshaft is linked to the generator;

one or more springs and one or more pistons are placed on the partially rotating lever along the length of the partially rotating lever said first ends and said second ends; and the weight swivel assembly including the weight, swivel ball bearings fulcrum assembly, and one or more pistons wherein the piston is attached perpendicularly to the support bracket of the base of the swivel weight assembly to activate one or more primary and one or more secondary springs via one or more cycle forces.

2. The renewable energy leverage generator apparatus to produce electricity from a partially rotating lever of claim 1 wherein the fuel source that provides fuel sufficient to activate a high energy piston switch to fire the one or more pistons to apply a high energy force to the weight swivel assembly is an electric linear actuator.

3. The renewable energy leverage generator apparatus to produce electricity from a partially rotating lever of claim 2 wherein the fuel source that provides fuel sufficient to activate a high energy piston switch to fire the one or more pistons to apply a high energy force to the weight swivel assembly is an electric fuel source sending a signal to a linear actuator having an integrated linear motion system with a roller screw mechanism for converting electric motor power into linear motion.

4. The renewable energy leverage generator apparatus to produce electricity from a partially rotating lever of claim 3 wherein the electric linear actuator is configured in a closed-loop servo system to provide positioning feedback from one or more linear position feedback sensors.

5. The renewable energy leverage generator apparatus to produce electricity from a partially rotating lever of claim 4 wherein the high capacity electric linear actuator includes a force sensing option having a load cell for measuring a force in both the tension and compression directions required to propel the weight swivel assembly over center to the opposite side of the two-sided lever when the see-saw lever is fully depressed.

6. The renewable energy leverage generator apparatus to produce electricity from a partially rotating lever of claim 5 wherein the electric linear actuator includes a force sensing option having a load cell with load sensing for a static and dynamic load to determine and apply the force via the electric linear actuator required to propel the weight swivel assembly over center to the opposite side of the two-sided lever when the see-saw lever is fully depressed.

7. The renewable energy leverage generator apparatus to produce electricity from a partially rotating lever of claim 6 wherein the energy required to activate the one or more pistons switches and one or more pistons, one or more primary springs, one or more secondary springs, and fuel source is less than the energy output from the leverage generator apparatus.

8. The renewable energy leverage generator apparatus to produce electricity from a partially rotating lever of claim 7 wherein the ratio of energy output generated to energy input less efficiency losses of the renewable energy leverage generator apparatus is in a range from about 7:1 to about 22:1 when 3,000 watts are applied to the electric linear actuator to activate the one or more piston switches and pistons and one or more primary and one or more secondary springs, to move a weight of at least 10,000 pounds wherein the partially rotating lever has a distance of at least ten feet from a point equidistant along the partially rotating lever to the partially rotating lever end point, wherein the moving weight swivel assembly produces energy to turn an axel one foot in one second.

9. The renewable energy leverage generator apparatus to produce electricity from a partially rotating lever of claim 8 wherein two or more partially rotating levers coupled on a common crankshaft sufficient to turn the crankshaft and maintain a smooth energy input to provide a constant speed of the common crankshaft.

10. The renewable energy leverage generator apparatus to produce electricity from a partially rotating lever of claim 1, further comprising:
an adjustable ball bearing swivel joint area coupled to one or more triangular over center weight swivel assemblies and slidingly attached to the partially rotating lever in a manner that moves freely along the partially rotating lever in the direction of the lower end of the partially rotating lever, until the one or more triangular over center weight swivel assemblies each reaches a stop point at a piston switch.

11. The renewable leverage generator apparatus to produce electricity from a partially rotating lever of claim 10, further comprising:
one or more pistons, primary and secondary springs having a time delay equal to the amount of time for the triangular over center weight swivel assembly to reach a stop point at a piston switch along the lower end of the rotating lever, wherein the one or more pistons, primary and secondary springs are not released until the adjustable ball bearing swivel joint area reaches the stop point when the piston switch and the one or more pistons fire, throwing the triangular structure over center.

12. A renewable energy vertical leverage generator apparatus, comprising:
a first rotating triangular weight car harness structure having an angled lever bar comprising a substantially forty-five degree support bar coupled on a first end to a weight bar and the forty-five degree support bar coupled on a second end to a support bar that is substantially perpendicular to the weight bar;
a second rotating triangular weight car harness structure having an angled lever bar comprising a substantially forty-five degree support bar coupled on a first end to a weight bar and the forty-five degree support bar coupled on a second end to a support bar that is substantially perpendicular to the weight bar;
the first and second rotating triangular weight car harness structures operating at substantially one hundred eighty degrees to each other to create forces in the opposite direction when the first and second rotating triangular weight car harness structures rotate at the same speed wherein the first and second rotating triangular weight car harness structures are coupled to a drive axel, a timing assembly having one or more points and one or more rotors, and a generator to provide energy to turn the drive axel and propel the first and second rotating triangular weight car harness structures in equal and opposite directions;
a track system for transporting one or more travelling weighted devices, the track system having a wheel bar substantially in parallel to a weight bar, wherein the wheel bar is located radially outward from a drive axel and nearest to one or more wheels of the travelling weighted devices and wherein the track system is coupled to a first and second rotating triangular support assembly interposed at one hundred eighty degrees from each other;
the wheel bar of the first and second rotating triangular weight car harness structures, wherein each wheel bar includes a first end and a second end, wherein each of the wheel bars is connected by catches to the weight bar;
one or more springs on each of the wheel bars facing radially outward from the drive axel;
the one or more travelling weighted devices are placed on each of the wheel bars coupled to one or more wheels that adjacent to the weight bar and the wheel bar;
a wheel bar having a first end and a second end that together supports the travelling weight device in an upright position and in an inverted position to provide three hundred sixty degree support for the travelling weight device;
one or more pistons which fire when a travelling weight device reaches a 90 degrees or 12:00 position;
a fuel source to fire the one or more pistons, the fuel source selected from a group including natural gas, linear actuators, and pneumatic drives powered by solenoids wherein the fuel source creates energy to, fire the one or more pistons and send the travelling weight device in the 12:00 position towards opposite ends of the angled lever bar, and sends the travelling weight device in the 6:00 position towards a beginning point of a lever, creating a significant displacement of weight or torque, resulting in the drive axel being turned, resulting in the generator being turned;

a travelling weight device located in the 3:00 and corresponding 9:00 position, resulting in the weights achieving leverage parity;

a travelling weight device located between the 12:00 position and the 3:00 position, resulting in the displacement of the weight;

one or more springs attached to both ends of the wheel bar, the springs vertically facing radially outward from the drive axel;

a catch which releases when a travelling weight device reaches a 90 degrees or 12:00 position;

a drive axel which is linked to at least one generator;

a triangular swing-set support base assembly affixed to the drive axel and generator drive assembly at a top of the triangular swing-set support assembly;

a vertical support bar wherein a base of the support bar is affixed to the drive axel;

a horizontal weight bar or lever bar attached near a top of the vertical support bar;

the forty-five degree support bar affixed to the end of the weight bar not connected to the vertical support bar, and also affixed near the bottom of the vertical support bar;

one or more points and one or more rotors forming a timing assembly affixed adjacent to the drive axel;

at least two lever assemblies vertically linked to one drive axel, the drive axel located at an intersection of the two lever assemblies, a bottom assembly connected the same as a top assembly;

the pistons connected near the end of the vertical support bar; and a travelling weight device located at the 12:00 position, 1:30 position, 3:00 position, and 4:30 position, along with corresponding travelling weight devices on an opposite side.

13. The renewable energy vertical leverage generator apparatus of claim 12, further comprising:

a track construction wherein one or more weighted car devices have one or more wheels on a top of the car and one or more wheels on a bottom of the car, wherein the one or more wheels are coupled with one or more axels affixed to the weighted car device and wherein the one or more wheels are coupled to the track construction to allow the weighted car device to travel along the track and capture the one or more weighted car devices in an upright, fully inverted, and three hundred sixty degree configuration.

14. The renewable energy vertical leverage generator apparatus of claim 13, further comprising:

a weighted car device configuration wherein two or more sets of wheels are configured such that each set of wheels capture a track length having one or more wheels above the track length and one or more wheels below the track length, rigidly affixed to the car device to capture the car device in all inverted, upright and three hundred sixty degree angular rotational positions.

15. The renewable energy vertical leverage generator apparatus of claim 12, further comprising:

one or more additional rotating harness track pairs operating on one or more different Z-planes along multiple points of a common drive axel providing electricity to a common generator wherein each of the one or more additional rotating harness track pairs are offset by a minimum distance along an axis perpendicular to the one or more coplanar Z-planes and wherein the one or more additional rotating harness track pairs rotate at an offset angle that is equal for each subsequent additional rotating harness track pairs.

16. The renewable energy vertical leverage generator apparatus of claim 15, wherein the one or more additional rotating harness track pairs operate at substantially the same speed but offset by thirty degrees or more from a first rotating harness track pair.

17. A method of using leverage to produce electricity from a partially rotating lever, comprising steps for:

supporting a partially rotating lever with a triangular support structure coupled at a fulcrum point located at a midpoint of the partially rotating lever wherein the triangular support structure has a base, a two sides, the sides each having one or more piston switches to engage a portion of the partially rotating lever;

engaging the partially rotating lever with a triangular weight swivel assembly that travels rotationally about a fixed swivel ball bearings assembly that is adjacent to the midpoint of the partially rotating lever wherein the triangular weight swivel assembly includes a first and second support arms that are perpendicular to each other and joined at a center point of the fixed swivel ball bearings assembly and wherein the first and second support arms are joined on the outer ends by a weighted device forming a right triangle between the first and second support arms;

rotating the triangular weight swivel assembly from a first beginning position on the partially rotating lever to a second ending position on the partially rotating lever to complete one-half of an over-center cycle of the partially rotating lever, wherein the first beginning position is vertically below said fulcrum and midpoint of the partially rotating lever and wherein the second ending position is vertically below said fulcrum and midpoint of the partially rotating lever;

activating a first piston switch upon lowering the partially rotating lever to the first beginning position vertically below said fulcrum and midpoint of the partially rotating lever to overcome the triangular weight swivel assembly until the triangular weight swivel assembly travels over-center to a second position vertically below said fulcrum and midpoint of the partially rotating lever to complete the first-half of the over-center cycle of the partially rotating lever and activate a second piston switch to reverse the over-center action of the triangular weight swivel assembly and return the triangular weight swivel assembly to the first beginning position vertically below the fulcrum and midpoint of the partially rotating lever thereby completing a second-half of the over-center cycle to complete a full cycle of travel for the triangular weight swivel assembly and thereby reactivating the first piston switch to begin a complete second cycle of the triangular weight swivel assembly;

applying a force from the completed full cycle of travel of the triangular weight swivel assembly when the partially rotating lever reaches the original first beginning position for a subsequent time to engage the force with a crankshaft which turns a generator and wherein the partially rotating lever which has reached the original first beginning positions commences a second cycle and reactivates the piston switch for a subsequent cycle to commence;

engaging the rotating triangular weight swivel assembly with one or more secondary springs attached to an outer portion of the rotating lever, one or more primary springs attached to an inner portion of the rotating lever, and one or more piston switches near the midpoint of the partially rotating lever, wherein the one or more secondary springs, one or more primary springs, and one or more piston switches engage an end of the partially rotating lever to propel it over-center with a force in excess of the rotating triangular weight swivel assembly sufficient to send the rotating triangular weight swivel assembly to a second ending position vertically below the fulcrum and midpoint of the partially rotating lever, wherein the rotating triangular weight swivel assembly in conjunction with gravity, produces a force on a crankshaft sufficient to turn a generator and produce electricity;

joining the rotating triangular weight swivel assembly to a swivel ball bearing fulcrum assembly having one or more swivel ball bearings enclosed in a common area wherein the swivel ball bearing fulcrum assembly is adjacent to one or more rotating lever ball bearings at a midpoint fulcrum of the partially rotating lever;

releasing one or more secondary springs and one or more primary springs wherein each secondary spring and each primary spring has a spring constant sufficient to produce a moment arm torque substantially greater than a moment arm torque of the triangular weight swivel assembly;

firing one or more piston switches coupled to a lower portion of the partially rotating lever and firing one or more piston switches coupled to the support structure on the lower portion of the partially rotating lever nearest the fulcrum midpoint; and increasing weight to the rotating triangular weight swivel assembly and increasing length to the partially rotating lever to correspondingly increase the force transferred to the crankshaft and generator.

18. The method of claim 17, further comprising steps for:

slidingly attaching an adjustable ball bearing swivel joint area coupled to one or more triangular over center weight swivel assemblies such that the adjustable ball bearing swivel joint area moves freely along the rotating lever in the direction of the lower end of the rotating lever, until the adjustable ball bearing swivel joint area reaches a stop point at a piston switch.

19. The method of claim 18, further comprising:

delaying the operation of one or more pistons, primary and secondary springs affixed to the rotating lever for a time period equal to the time required for the slidingly attached adjustable ball bearing swivel assembly to travel down the lower end of the rotating lever to the stop point at a piston switch; and engaging the slidingly attached adjustable ball bearing swivel joint area with the one or more pistons, primary and secondary springs to activate and fire the one or more pistons, primary and secondary springs with sufficient force to throw the triangular structure over center.

20. A method of using leverage to produce electricity from a renewable energy vertical generator apparatus, comprising steps for:

rotating two or more triangular weight car harness structure pairs about a pivot point located at a midpoint of one or more support bars for one or more complete revolutions of three hundred sixty (360) degrees;

affixing the two or more triangular weight car harness structure pairs to the one or more support bars by forming a perpendicular intersection between each of at least one or more weight bars and each of the one or more support bars mechanically coupled at a first end closest to each of the one or more support bars and by forming a substantially forty-five (45) degree angle with each of the one or more weight bars and each of the one or more support bars to form each of the triangular weight car harness structure frames;

attaching a track to capture a weight car device having two or more wheels to move along the track for each of the triangular weight car harness structures, wherein the two or more wheels moving along the track are enclosed between two parallel tracks adjacent to the two or more wheels at all times during the triangular weight car harness structure during one or more revolutions;

simultaneously firing one or more pistons and releasing one or more catch releases adjacent to each of the one or more weight car devices to start the one or more weight car devices traveling along the track and applying force to each of the one or more triangular weight car harness structure pairs to begin a rotation about the pivot point located at the midpoint of the one or more support bars;

coupling the one or more support bars with the two or more triangular weight car harness structure pairs to a drive axel of a generator, a timing assembly having one or more points and one or more rotors, to produce electricity from the generator proportional to the speed of the drive axel, weight of the two or more triangular weight car harness structure pairs, force generated from the one or more firing pistons adjacent to each of the weight car devices, and the spring constant on each of the triangular weight car harness structure pair track assembly; and forming a base frame assembly having a triangular shape with sufficient strength to support the weight of a vertical generator apparatus and vertical leverage generator assembly having two or more triangular weight car harness structure pairs on opposite, one hundred-eighty (180) degrees of each of the one or more support bars.

21. The method of claim 20, further comprising steps for:

capturing one or more weighted car devices for one or more full revolutions in three hundred sixty degree angular, rotational positions;

coupling one or more wheels of one or more weighted car devices on a top of the one or more weighted car devices and one or more wheels on the bottom of the one or more weighted car devices with one or more affixed axels and one or more track lengths, such that the one or more wheels on the bottom and the one or more wheels on the top are located between the wheels and the track length; and propelling the weighted car device along the track length by allowing the one or more top wheels and the one or more bottom wheels to rotate freely about an axel affixed to the weighted car device.

22. The method of claim 21, further comprising steps for:

capturing a weighted car device configuration in all inverted, upright and three hundred sixty degree angular rotational positions, wherein two or more sets of wheels envelope a track length having one or more wheels above the track length and one or more wheels below the track length; and coupling the two or more sets of wheels to the weighted car device by one or more axels allowing the two or more sets of wheels to freely rotate and propel the weighted car device along the track length.

23. The method of claim 22, further comprising:
rotating one or more additional harness track pairs operating on different Z-planes along multiple points of a common drive axel providing electricity to a common generator.

24. The method of claim 23, wherein the one or more additional rotating harness track pairs operate at substantially the same speed but are offset by thirty degrees or more from a first rotating harness track pair.

25. A partially rotating leverage generator apparatus, comprising:
one or more lever devices each pivoting about a midpoint fulcrum at an angle not to exceed forty-five degree from a horizontal position,
one or more weighted devices freely pivoting about a common cylinder adjacent to the one or more lever devices midpoint fulcrum such that the one or more weighted devices move from a first position on the lever device over-center of the lever device to a second position in response to a first set of pistons, springs and fuel cell energy inputs and wherein the one or more weighted devices reverse direction in response to a second set of pistons, springs and fuel cell energy inputs to move from the second position on the lever device and return over center at the midpoint of the lever device to the first position to complete a full cycle of travel, thereby transferring two or more forces proportional to the energy input to a common crankshaft, wherein the two or more forces from each of the one or more weighted devices are sufficient to turn the crankshaft at a constant speed and turn a generator.

26. The partially rotating leverage generator apparatus of claim 25, further comprising:
two or more partially rotating levers applying about one thousand to three thousand (3,000) watts to two or more electric linear actuators wherein the ratio of energy output generated to energy input less efficiency losses for each electric linear actuator is in a range from about 7:1 to about 22:1 when two or more piston switches, pistons and two or more primary, and two or more secondary springs, combine to move a weight of at least 10,000 pounds a distance of at least ten feet from a point equidistant along each of the partially rotating levers to each of the partially rotating levers end point, wherein each of the moving weight swivel assemblies produces energy sufficient to turn an axel one foot in one second.

27. The partially rotating leverage generator apparatus of claim 26, further comprising:
four or more sets of two or more partially rotating levers applying at least three thousand (3,000) watts to two or more electric linear actuators wherein the ratio of energy output generated to energy input less efficiency losses for each electric linear actuator is about a minimum of 22:1 when two or more piston switches, pistons and two or more primary, and two or more secondary springs, combine to move a weight of at least 10,000 pounds a distance of at least ten feet from a point equidistant along each of the partially rotating levers to its end point, wherein each of the moving weight swivel assemblies produces energy sufficient to turn an axel at a minimum speed of one foot per second.

28. A leverage generator device, comprising:
one or more high energy linear actuators operating in response to one or more fuel cell inputs, and each activating a set of one or more piston switches, one or more pistons, and releasing one or more springs of a sufficient spring constant to transfer a high energy force to propel one or more weighted devices over a midpoint of one or more partially rotating levers to transfer energy to a generator.

29. The leverage generator device of claim 28, wherein the one or more high energy linear actuators operating in response to one or more fuel cells is an electric linear actuator having an integrated linear motion system with a roller screw mechanism for converting electric motor power into linear motion to turn a roller screw device.

30. The leverage generator device of claim 29 wherein the electric linear actuator is configured to be coupled to a closed-loop servo process control system to provide positioning feedback from one or more sensors.

31. The leverage generator device of claim 29 wherein the ratio of energy output generated to energy input less efficiency losses of the leverage generator device is at least 7:1 when 3,000 watts are applied to the electric linear actuator having a rating of at least 7,000 pounds continuous force, to apply a force on one or more weighted devices of 10,000 pounds wherein the one or more weighted devices travel a distance of at least twenty feet to a point at about ten feet from the midpoint of the one or more partially rotating levers in less than one second and wherein the one or more weighted devices produces sufficient energy to turn an axel one foot in one second.

* * * * *